US012617715B2

(12) United States Patent　　　　(10) Patent No.:　US 12,617,715 B2
Nasir et al.　　　　　　　　　　　　　(45) Date of Patent:　　　May 5, 2026

(54) MORTAR COMPOSITIONS

(71) Applicant: Imam Abdulrahman Bin Faisal University, Dammam (SA)

(72) Inventors: Muhammad Nasir, Dammam (SA); Walid Al-Kutti, Dammam (SA); A. B. M. Saiful Islam, Dammam (SA); Khalid Sager Alotaibi, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 320 days.

(21) Appl. No.: 18/447,767

(22) Filed: Aug. 10, 2023

(65) Prior Publication Data

US 2025/0051226 A1　　Feb. 13, 2025

(51) Int. Cl.
| | | |
|---|---|---|
| *C04B 7/02* | (2006.01) |
| *C04B 14/06* | (2006.01) |
| *C04B 24/34* | (2006.01) |
| *C04B 28/04* | (2006.01) |
| *C04B 38/00* | (2006.01) |

(52) U.S. Cl.
CPC .............. *C04B 7/02* (2013.01); *C04B 14/06* (2013.01); *C04B 24/34* (2013.01); *C04B 28/04* (2013.01); *C04B 38/0054* (2013.01); *C04B 2201/50* (2013.01)

(58) Field of Classification Search
CPC ......... C04B 47/02; C04B 14/06; C04B 28/04; C04B 38/0054; C04B 2201/50
See application file for complete search history.

(56) References Cited

U.S. PATENT DOCUMENTS

| | | | |
|---|---|---|---|
| 4,482,384 A | 11/1984 | Miller | |
| 5,545,297 A * | 8/1996 | Andersen ............... | B29C 43/38 264/102 |

| | | | | |
|---|---|---|---|---|
| 2020/0055775 A1 * | 2/2020 | Silva | ..................... | C04B 24/122 |
| 2020/0109089 A1 * | 4/2020 | Saleem | ................. | C04B 14/303 |
| 2022/0017418 A1 * | 1/2022 | Akono | .................. | C04B 14/386 |
| 2023/0219850 A1 * | 7/2023 | Kaiser | .................. | C04B 28/006 106/677 |

FOREIGN PATENT DOCUMENTS

| | | |
|---|---|---|
| CN | 106082857 A | 11/2016 |
| CN | 109503000 A | 3/2019 |
| CN | 112390580 A | 2/2021 |
| JP | 2019-167273 A | 10/2019 |

OTHER PUBLICATIONS

Mbugua et al.; Effect of Gum Arabic karroo as aWater-Reducing Admixture in Concrete; Materials 9, 80; Jan. 28, 2016; 16 Pages.
Brzyski et al.; The Influence of Gum Arabic Admixture on the Mechanical Properties of Lime-Metakaolin Paste Used as Binder in Hemp Concrete; Materials 14; Nov. 10, 2021 ; 22 Pages.
Wang et al.; Mechanical and morphological properties of highly dispersed carbon nanotubes reinforced cement based Materials ; Journal of Wuhan University of Technology-Mater. Sci. Ed. 28, 82-87; Feb. 8, 2013; 10 Pages; Abstract Only.
Rizwan et al.; Response of self-consolidating cement paste systems containing Acacia Nilotica Gum as an organic admixture; Construction and Building Materials, vol. 126; Nov. 15, 2016; Abstract Only; 3 Pages.

* cited by examiner

*Primary Examiner* — Silvana C Runyan
(74) *Attorney, Agent, or Firm* — Oblon, McClelland, Maier & Neustadt, L.L.P.

(57) ABSTRACT

Mortar composition made of ingredients including an Arabic Gum, a sand, and water, which when cured may provide a composition having properties including microcracks from 20 to 500 nm wide and 0.1 to 500 um long, and granules that are bundles of 20 to 1000 microfilaments in the form of cylinders. The mortar composition may combine a useful combination of one or more features selected from initial setting time, mortar flow, compressive strength when cured, flexural strength when cured and volume of permeable voids.

18 Claims, 41 Drawing Sheets

| 6/21/2022 | HV | mag □ | WD | |
| 8:59:33 AM | 20.00 kV | 4 000 x | 10.1 mm | 30 μm |
| | | | | IRMC |

MORTAR COMPOSITIONS

STATEMENT REGARDING PRIOR DISCLOSURE BY THE INVENTORS

Aspects of present disclosure were described in an article titled "Evolution of Arabic Gum-based green mortar towards enhancing the engineering properties-Fresh, mechanical, and microstructural investigation" published in Volume 365, Construction and Building Material on Dec. 14, 2022, which is incorporated herein by reference in its entirety.

BACKGROUND

Technical Field

The present disclosure is directed to a cementitious mortar composition, and more particularly, to an Arabic gum (AG)-based cementitious mortar composition, a method of preparation thereof and a cured composition obtained by curing the Arabic gum (AG)-based cementitious mortar composition.

Description of the Related Prior Art

The "background" description provided herein is for the purpose of generally presenting the context of the disclosure. Work of the presently named inventors, to the extent described in this background section, as well as aspects of the description which may not otherwise qualify as prior art at the time of filing, are neither expressly nor impliedly admitted as prior art against the present invention.

Modern concrete construction requires the use of varying types of chemical aids, admixtures, additives, or agents to modify properties of concrete in fresh and hardened states. According to Global Market Insights, the concrete admixture market reached $17.78 billion in 2020, and is estimated to grow to more than $26 billion by the year 2027 at a rate of 6.1% due to rising urbanization and corresponding construction boom. Concrete additives (e.g., admixtures) may include accelerators, retarders, superplasticizers, air-entraining admixtures, viscosity enhancing admixtures, water-resisting admixtures, bonding admixtures, corrosion inhibitors, water-proofing additives, shrinkage mitigating admixtures, and/or coloring agents which are being regularly employed depending on the special conditions of the infrastructure applications. However, commercially available synthetic admixtures pose various technical, environmental, and economic issues. For instance, the chemical admixtures are non-renewable oil-based polymers containing naphthalene- and melamine-based formaldehyde condensates as well as various acids- and phosphorous-based compounds, including lignosulphonates acid, citric acid, carboxylic acid, sodium gluconate, tartaric acid, and nitrile tris triphosphate. These chemical admixtures create environmental pollution from their production, may be hazardous to human health, and the water-soluble compounds in chemical admixtures may leach out and result in land pollution. Technically, some admixtures are unpredictable and may prolong the setting time of concrete; superplasticizers may cause premature stiffening, loss of workability, influence the shrinkage, or creep properties of concrete, and accelerators may cause more evolution of heat or increased risk of cracking.

Economically, admixtures may require importation from other countries and are expensive such that approximately 10% of the total cost of construction may be spent during importation; they also have a shelf-life of below 1 year and are required to be stored at specific conditions.

To mitigate the techno-economic and ecological threats posed by chemical admixtures, research has shifted towards incorporating sustainable and alternative admixtures sourced from agro-industrial wastes and natural minerals. Mineral admixtures have been reported successful by utilizing fly ash, silica fume, ground granulated blast furnace slag, date palm/oil fuel ashes, rice husk ash, metakaolin, sugar cane bagasse ash, cow dung ash, bentonite clay, crushed rubber, coconut/groundnut shell, stone dust, and marble powder. Likewise, several bio-based admixtures might provide comparable technical benefits to those of chemical admixtures [H. Faqe, H. Dabaghh, A. Mohammed, Natural admixture as an alternative for chemical admixture in concrete technology: A review, J. Duhok Univ. (2) (2020) 301-308]. Alternative raw materials that could be used as an admixture include cypress tree extract, extract of water hyacinth, blue gum extract, natural rubber latex, black gram, molasses, palm liquor material, albumen and yolk of hen eggs, eggshell, jaggery powder, aloe vera extract, and *Opuntia Ficus-indica*.

Arabic Gum (AG)-E414, is a natural water-soluble solid substance of great nutritional, industrial, and economic value. AG is secreted from the stems and branches of two types of *acacia* trees: *Acacia senegal* or *Acacia seyal*. The AG tree is native to arid regions of the Arabian Peninsula, and approximately 500 of its species exist in sub-tropical and sub-Saharan parts of Africa, Asia, Australia, Europe, and America. It is a spiny tree having a trunk diameter of about 30 cm and grows up to 7-15 m in height. The Saudi company Azila Gum has planted about 15,000 hectare (ha) of *Senegal acacia* trees on degraded land in Dahra in the Djolof region. According to a report by the UN, despite the total world AG exports being estimated at 102,000 tonnes, huge resources of the AG belt remain unutilized. AG has many commercial uses in food, textile, cosmetic, pharmaceutics, and other industries as a natural thickening agent, flavor, emulsifier, stabilizer, binder and adhesive, filtration and fracturing agent, and a cellulose derivative.

Satti and Ahmed [S. A. A. Satti, Y. H. Ahmed, Use of Gum Arabic (*Acacia Seyal*) As Concrete Admixture: 2nd Conference Proceedings Civil Engineering 2018, 2018] explored the potency of *Acacia seyal* in the hot climate conditions of Sudan. They found that incorporation of 0.8% dosage of the AG results in a reduction of water content in the range of 7.5-11.5% without compromising the workability of mortar and concrete with only 7 min of prolongation of final setting time. Their AG satisfied all the requirements of BS EN 934-2:2009 for both the set accelerator and water-reducing admixtures. Likewise, it was found that AG is compatible with the African hot climate conditions as it can enhance the compressive strength and resistance to chloride penetration when the concrete is exposed to 40° C. [R. Mbugua, S. Wanjala, J. Ndambuki, *Acacia* Karroo as Potential Admixture for Hot African Weather, RILEM Bookseries (2020)]. The inclusion of AG in concrete enhances the flow characteristics as it possesses a dispensing effect upon interaction with cement grains. It is also capable of decreasing the shear rate and apparent viscosity of a cement mixture, thereby increasing the fluidity [C. Zhao, Q. Zhao, Y. Zhang, M. Zhou, The Effect of Gum Arabic on the Dispersion of Cement Pastes, 2015]. This phenomenon is evident due to the sizeable presence of sepiolite [$Mg_4Si_6O_{15}(OH)_2 \cdot 6H_2O$] fibers in the AG, which is well-known to enhance the rheology of the fresh mortar or concrete. Admixing AG in concrete mixes is reported to yield dense concrete. For instance, a value of 2537 to 2842 kg/m$^3$ corresponding to the densities of normal to heavy-weight concrete was observed. This is attributed to the pore-filling effect provided by the AG in the cement matrix as well as increased precipitation of the osumilite [KMg$_2$Al(Si$_{10}$Al$_2$)O$_{30}$]— a dense mineral, during the hydration reaction [A. U. Elinwa, G. Abdulbasir, G. Abdulkadir, Gum Arabic as an admixture for cement concrete production, Constr. Build. Mater. 176 (2018)]. Water absorption capacity of concrete prepared with AG is reported to be very low with 0.5% AG dosage and, beyond this limit, a fourfold increase was recorded. This was confirmed by Elinwa and Umar [A. U. Elinwa, M. Umar, X-ray diffraction and microstructure studies of gum Arabic cement concrete, Constr. Build. Mater. 156 (2017)] by detecting mordenite and palygorskite phases in their synthesized specimens. The structure of these two minerals is characterized as highly porous [E. Galan, Properties and applications of palygorskite-sepiolite clays, Clay Miner. 31 (1996); and D. Tunega, A. Zaoui, Understanding of bonding and mechanical characteristics of cementitious mineral tobermorite from first principles, J. Comput. Chem. 32 (2011) 306-314]. An addition of 0.5% dosage of the AG is reported to increase the cube compressive strength by 29 to 39% as compared to the control specimens. The increased compressive strength is ascribed to the formation of osumilite and tobermorite minerals, whose structure systems are hexagonal and monoclinic crystals, respectively, and resembles the C—S—H phase formed in the hydration of Portland cement [A. U. Elinwa, M. Umar, X-ray diffraction and microstructure studies of gum Arabic cement concrete, Constr. Build. Mater. 156 (2017), incorporated herein by reference in its entirety; and E. Galan, Properties and applications of palygorskite-sepiolite clays, Clay Miner. 31 (1996)]. Further, sepiolite, mordenite, and wollastonite [CaSiO$_3$] minerals are also responsible for strength development. It is reported that wollastonite enhances both the magnitude of compressive and flexural strengths of concrete.

Commercially available admixtures pose socio-economic and techno-ecological challenges. Although the use of green additives, such as AG, is known in the construction industry, there still exists a need to develop mortar compositions with improved engineering properties, in a cost-effective and environmentally friendly manner (lesser carbon footprint). Accordingly, an object of the present disclosure is to develop a cementitious mortar composition using an environmentally friendly additive—AG. The cementitious mortar composition including AG used in defined percentages, imparts improved mechanical properties compared to mortar compositions without AG and can effectively be used as an alternative to conventional admixtures.

SUMMARY

In an exemplary embodiment, a cementitious mortar composition is described. The cementitious mortar composition includes an ordinary Portland cement, an Arabic Gum in the amount of 0.1 to 2% by weight of the ordinary Portland cement, a sand in the amount of 150% by weight of the ordinary Portland cement, and water in the amount of 40% by weight of the ordinary Portland cement. A cured sample obtained by curing the cementitious mortar composition for at least 2 days has a porous structure. The porous structure includes one or more microcracks from 20 to 500 nanometers (nm) wide and 0.1 to 500 micrometers (μm) long, wherein the cured sample has granules from 1 to 20 μm in diameter, wherein the granules are bundles of microfilaments with a length from 0.2 to 5 μm, and wherein the bundles have 20 to 1000 microfilaments, wherein the microfilaments are in the form of cylinders.

In some embodiments, the cured sample has a range of micropores from 1 to 200 μm in diameter.

In some embodiments, the cementitious mortar composition includes Arabic Gum in an amount of 0.75 to 1.5% by weight of the ordinary Portland cement, wherein the cementitious mortar composition has an initial setting time of 280 to 430 minutes, which is 100 to 200% greater than a comparative mortar composition that is the same as the cementitious mortar composition but does not contain Arabic Gum, wherein the initial setting time is tested according to ASTM C191.

In some embodiments, the cementitious mortar composition includes Arabic Gum in an amount of 0.75 to 1.5% by weight of the ordinary Portland cement, wherein the cementitious mortar composition has a final setting time of 320 to 465 minutes, which is 100 to 200% greater than a comparative mortar composition that is the same as the cementitious mortar composition but does not contain Arabic Gum, wherein the final setting time is tested according to ASTM C191.

In some embodiments, the cementitious mortar composition includes Arabic Gum in an amount of 0.75 to 1.5% by weight of the ordinary Portland cement, wherein the cementitious mortar composition has a mortar flow of 28 to 47% greater than a comparative mortar composition that is the same as the cementitious mortar composition but does not contain Arabic Gum, wherein the mortar flow is determined according to ASTM C230.

In some embodiments, the cementitious mortar composition includes Arabic Gum in an amount of 0.75% by weight of the ordinary Portland cement, wherein the cured sample has a compressive strength value of 32 MPa to 53 MPa in a timeframe of 7 to 56 days, which is 12 to 32% greater than a comparative sample obtained by curing a comparative mortar composition that is the same as the cured sample but does not contain Arabic Gum.

In some embodiments, the cementitious mortar composition includes Arabic Gum in an amount of 0.75% by weight of the ordinary Portland cement, wherein the cured sample has a flexural strength value of 4 MPa to 7 MPa in a timeframe of 7 to 56 days, which is 14 to 31% greater than a comparative sample obtained by curing a comparative mortar composition that is the same as the cured sample but does not contain Arabic Gum.

In some embodiments, the cementitious mortar composition includes Arabic Gum in an amount of 0.75% by weight of the ordinary Portland cement, wherein the cured sample has a volume of permeable voids of 16% to 14% in a timeframe of 28 to 56 days, which is 15 to 20% less than a comparative sample obtained by curing a comparative mortar composition that is the same as the cured sample but does not contain Arabic Gum, wherein the volume of permeable voids is tested according to ASTM C642-13.

In some embodiments, the cementitious mortar composition includes Arabic Gum in an amount of 0.75% by weight of the ordinary Portland cement, wherein the cementitious mortar composition has a Ca:Si molar ratio of 6.

In some embodiments, carbon is present in an amount of 0.01 to 1.3% by weight of the composition, oxygen is present in an amount of 34 to 39% by weight of the composition, sodium is present in an amount of 0.5 to 1% by weight of the composition, magnesium is present in an amount of 0.9 to 1.7% by weight of the composition, aluminum is present in an amount of 1.4 to 2.3% by weight of the composition, silicon is present in an amount of 5 to 8% by weight of the composition, sulfur is present in an amount of 4 to 8% by weight of the composition, chlorine is present in an amount of 0.1 to 0.3% by weight of the composition, potassium is present in an amount of 0.7 to 1.6% by weight of the composition, calcium is present in an amount of 40 to 45% by weight of the composition, and iron is present in an amount of 2 to 5% by weight of the composition.

In some embodiments, the cementitious mortar composition includes Arabic Gum in an amount of 0.75% by weight of the ordinary Portland cement and wherein the cured sample has a range of micropores from 1 to 100 μm in diameter.

In some embodiments, the cementitious mortar composition includes Arabic Gum in an amount of 0.75% by weight of the ordinary Portland cement and wherein the cured sample has a range of microcracks from 20 to 200 nm wide and 0.1 to 300 μm long.

In some embodiments, the cementitious mortar composition includes Arabic Gum in an amount of 0.75% by weight of the ordinary Portland cement, wherein the cementitious mortar composition has a content of calcium-silicate-hydrate is 85 to 87% composition based on a total composition of calcium-silicate-hydrate and portlandite.

In some embodiments, the cementitious mortar composition includes Arabic Gum in an amount of 0.75% by weight of the ordinary Portland cement, wherein the cementitious mortar composition has a content of portlandite is 13 to 15% composition based on the total composition of calcium-silicate-hydrate and portlandite.

In some embodiments, the cementitious mortar composition may be in the form of a cube, a prism, and a paste, wherein the cube has a dimension of 50 millimeters (mm)× 50 mm×50 mm and the prism has a dimension of 40 mm×40 mm×160 mm.

In some embodiments, the cured sample is aged from 2 to 60 days.

In some embodiments, the Arabic Gum includes sodium in an amount of 0.4 to 0.8 milligrams (mg), calcium in an amount of 0.1 to 0.4 grams (g), magnesium in an amount of 5.5 to 6.0 g, potassium in an amount to 3.0 to 3.5 g, iron in an amount of 0.01 to 0.1 mg, dietary fiber in an amount to 88 to 90% by weight, total ash in an amount to 2 to 4% by weight, and reducing sugar in an amount to 0.5 to 1% by weight based on a total weight of the Arabic Gum.

In some embodiments, the ordinary Portland cement includes CaO in an amount of 64.3 to 64.8% by composition, $SiO_2$ in an amount of 21.5 to 22.5% by composition, $Al_2O_3$ in an amount of 5.6 to 5.8% by composition, $Fe_2O_3$ in an amount of 3.6 to 3.8% by composition, $K_2O$ in an amount of 0.25 to 0.45% by composition, MgO in an amount 1.8 to 2.3%, and $Na_2O$ in an amount of 0.15 to 0.25% by composition based on a total composition of the ordinary Portland cement.

In some embodiments, the cementitious mortar composition is made by a process by dissolving the Arabic Gum in water to form an Arabic Gum-containing solution; mixing the ordinary Portland cement, the Arabic Gum-containing solution, sand, and water according to ASTM C150 to form a paste mixture and a mortar mixture; casting the mortar mixture; and curing the mortar mixture.

In some embodiments, the cementitious mortar composition is adapted for a use selected from the use group consisting of superplasticizer, retarder, pore-filling, crack-bridging, and strength enhancing agents.

These and other aspects of non-limiting embodiments of the present disclosure will become apparent to those skilled in the art upon review of the following description of specific non-limiting embodiments of the disclosure in conjunction with the accompanying drawings. The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure (including alternatives and/or variations thereof) and many of the attendant advantages thereof will be readily obtained as the same becomes better understood by reference to the following detailed description when considered in connection with the accompanying drawings, wherein.

DETAILED DESCRIPTION

Figure 1:
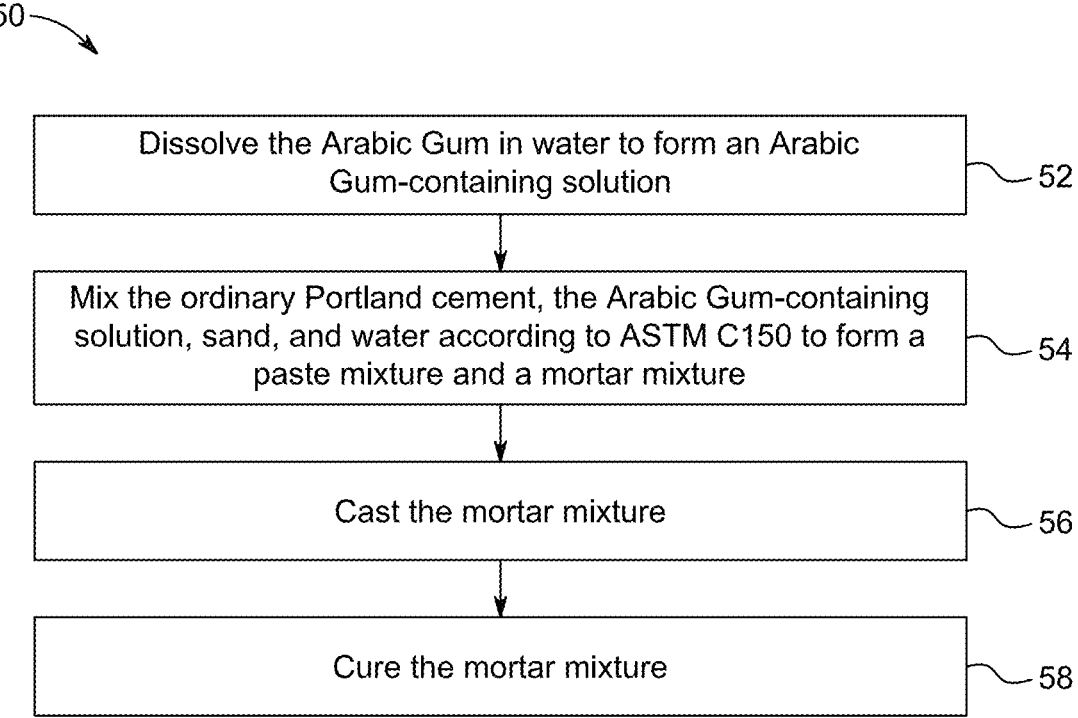
FIG. 1 is a flowchart depicting a method of forming a cementitious mortar composition, according to certain embodiments.

In the following description, it is understood that other embodiments may be utilized, and structural and operational changes may be made without departure from the scope of the present embodiments disclosed herein.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all embodiments of the disclosure are shown.

In the drawings, like reference numerals designate identical or corresponding parts throughout the several views. It may be noted that any reference to elements in the singular may also be constructed to relate to the plural and vice-versa without limiting the scope of the disclosure to the exact number or type of such elements unless set forth explicitly in the appended claims. Further, as used herein, the words "a," "an" and the like generally carry a meaning of "one or more," unless stated otherwise.

Furthermore, the terms "approximately", "approximate", "about," and similar terms generally refer to ranges that include the identified value within a margin of 20%, 10%, or preferably 5%, and any values therebetween.

The use of the terms "include," "includes", "including," "have," "has," or "having" should be generally understood as open-ended and non-limiting unless specifically stated otherwise.

As used herein, the term "concrete" means a composite material in either a cured or an uncured state that includes a cementitious binder material comprising cement (with or without supplementary cementing materials, such as blast furnace slag, fly ash, limestone fines, silica fume, and the like), mineral aggregate (e.g., rocky material, sand, loose stones, and the like), and water.

As used herein, the term "admixture" refers to an additive used to amend the characteristics of concrete, mortar, or other building materials.

As used herein, the term "cement" refers to a composition or substance with one or more constituents that is capable of binding materials together. The term includes reference to a dry, pre-set composition unless the context clearly dictates otherwise.

As used herein, "particle size" may be thought of as the length or longest dimension of a particle.

As used herein, the term "casting operation" refers to a manufacturing process where a liquid material is usually transferred into a mold containing a hollow cavity of the desired shape, and then allowed to undergo solidification.

As used herein, the term "setting time" refers to the time that cement takes to harden and become stable once it has been mixed with water.

As used herein, the term "flow test" refers to the test for determining the workability of mortar mix.

As used herein, the term "compressive strength" refers to the test used to measure mechanical strength.

As used herein, the term "flexural strength test" refers to the test that measures the tensile strength of concrete by determining the force needed for bending a beam of concrete material and determining the resistance to flexing or stiffness of a material.

As used herein, the term "volume of permeable voids (VPV) test" refers to a test that is a measure of the inter-connected void space in the concrete (i.e., capillary pores, gel pores, air voids, and microcracks) that can absorb water following normal water immersion and successive boiling in water.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%. Further, with respect to cementitious binder material, the dry weight basis is used; that is, the wt. % does not include any water added to set the cementitious binder material. With respect to the total concrete or mortar composition, the content of various components may be expressed in terms of kg of said component per m³ of the total mortar composition, and because the mortar composition includes water, the content recited as kg/m$^3$ is in terms of a wet basis (the amount of water is included).

Aspects of the present disclosure are directed to a cementitious mortar composition or "composition" utilizing Arabic Gum (AG) as a green additive. A control mix, in the absence of AG, and five AG-based mixes were developed by varying the AG content in the range of 0 to 1.5% by weight of the cement. The flow, setting time, compressive and flexural strengths, and volume of permeable voids (VPV) were evaluated. The results were also complimented by means of various analytical techniques, such as Scanning Electron Microscopy (SEM), Energy Dispersive Spectroscopy (EDS) analysis, Fourier Transform Infrared (FTIR) spectroscopy, and X-ray Diffraction (XRD) analysis. The composition of the present disclosure exhibits a linear increase in the flow and setting time, with an increase in the AG content, which is attributed to lubricating and retarding effects, respectively. However, a dosage of 0.75 wt. % was considered the suitable dosage for enhancing the overall engineering properties. Under appropriate conditions and concentrations, AG can be beneficially exploited in sustainable infrastructural applications as an alternative to conventional admixtures used as a superplasticizer, retarder, pore-filling, crack-bridging, and strength-enhancing agents.

Embodiments of the present disclosure provide a cementitious mortar composition. According to the first aspect, the present disclosure relates to cementitious mortar composition that includes of (i) cement, (ii) Arabic gum, (iii) sand, and (iv) water. The cement may include hydraulic cement, non-hydraulic cement, or a combination thereof. In an embodiment, the cement includes ordinary Portland cement (OPC), a basic ingredient of concrete, mortar, stucco, and non-specialty grout. OPC is a fine powder produced by heating limestone and clay minerals in a kiln to form clinker, grinding the clinker, and adding small amounts of other materials. Clinker is in the form of nodules and lumps of about 3 to 25 mm in diameter and consists of the minerals alite ($Ca_3SiO_5$), belite ($Ca_2SiO_4$), tricalcium aluminate ($Ca_3Al_2O_6$), and calcium aluminoferrite ($Ca_2(Al,Fe)_2O_5$). Several types of OPC may be employed herein, for example, OPC type I, type II, type III, type IV, or type V, or a combination thereof (in accordance with the ASTM C150 standard). Portland Cement type Ia, type IIa, and/or type IIIc may also be used, which have the same composition as types I, II, and III, respectively, except that an air-entraining agent is ground into the mix (also in accordance with the ASTM C150 standard). In an embodiment, the cement is OPC Type I.

The OPC includes CaO in an amount of 64.3-64.8%, preferably 64.3, preferably 64.4, preferably 64.6, preferably 64.7, preferably 64.8, and more preferably about 64.5% by weight in the composition; $SiO_2$ in an amount of 21.5-22.5%, preferably 21.5, preferably 21.6, preferably 21.7, preferably 21.8, preferably 22.0, preferably 22.1, preferably 22.2, preferably 22.3, preferably 22.4, preferably 22.5, and more preferably about 21.9% by weight in composition; $Al_2O_3$ in an amount of 5.6-5.8%, preferably 5.6, preferably 5.8, and more preferably about 5.9% by weight in the composition, $Fe_2O_3$ in an amount of 3.6-3.8%, preferably 3.6, preferably 3.8, and more preferably about 3.7% by weight in the composition; $K_2O$ in an amount of 0.25-0.45%, preferably 0.25, preferably 0.27, preferably 0.29, preferably 0.31, preferably 0.33, preferably 0.37, preferably 0.39, preferably 0.41, preferably 0.43, preferably 0.45, and more preferably about 0.35 by weight in the composition; MgO in an amount 1.8-2.3%, preferably 1.8%, preferably 1.9%, preferably 2.0%, preferably 2.2%, preferably 2.3%, and more preferably about 2.1% by weight in the composition; $Na_2O$ in an amount of 0.15-0.25%, preferably 0.15, preferably 0.16, preferably 0.17, preferably 0.18, preferably 0.19, preferably 0.21, preferably 0.22, preferably 0.23, preferably 0.24, preferably 0.25, and more preferably about 0.20% by weight in the composition; $C_3S$ in an amount of 50-60%, preferably 51, preferably 53, preferably 54, preferably 56, preferably 57, preferably 59, and more preferably about 55% by weight in the composition; $C_2S$ in an amount of 15-22%, preferably 16, preferably 18, preferably 20, preferably 21, and more preferably about 19% by weight in the composition; $C_3A$ in an amount of 7-12%, preferably 8, preferably 9, preferably 11, and more preferably about 10% by weight in the composition; $C_4AF$ in amount of 5-10%, preferably 6, preferably 8, preferably 9, and more preferably about 7% by weight in the composition. The loss on ignition (LOI) of the composition is from 0.50-1.00%, preferably 0.60-0.70%, and more preferably about 0.65% by weight. The weight percentage, as mentioned herein, is based on the total composition of the OPC.

The cementitious mortar composition includes dune sand as a fine aggregate (FA). The particle size of the FA was 45 μm to 600 μm with a maximum up to 600 μm. Dune sand is an abundant natural material and is found in many parts of the world. Such sand is rich in silica ($SiO_2$) but is in a less reactive form. The FA consisted of about 89% and about 11% of quartz and sulfur, respectively. In a specific embodiment, the cementitious mortar composition includes sand in the amount of 150% by weight of the OPC.

The composition further includes AG. Any amount of AG may be incorporated into the mortar compositions herein, however, typical amounts range from 0.1-2%, preferably 0.75-1.5% by weight of the OPC. In some embodiments, the AG includes sodium in an amount of 0.4-0.8 mg, preferably 0.4, preferably 0.5, preferably 0.7, preferably 0.8, and more preferably about 0.6 mg, calcium in an amount of 0.1-0.4 g, preferably 0.1, preferably 0.2, preferably 0.3, preferably 0.4, and more preferably about 0.25 mg, magnesium in an amount of 5.5 to 6.0 g, preferably 5.5, preferably 5.6, preferably 5.7, preferably 5.8, preferably 5.9, preferably 6.0, and more preferably about 5.85 mg, potassium in an amount to 3.0-3.5 g, preferably 3.1, preferably 3.3, preferably 3.4, and more preferably about 3.2 mg, iron in an amount of 0.01-0.1 mg, preferably 0.01, preferably 0.02, preferably 0.03, preferably 0.04, preferably 0.05, preferably 0.07, preferably 0.08, preferably 0.09, preferably 0.10, and more preferably about 0.6 mg, dietary fiber in an amount to 88-90% by weight, preferably 88, preferably 89, preferably 90, and more preferably about 89.2%, total ash in an amount to 2-4% by weight, preferably 2, preferably 3, preferably 4, and more preferably about 3.2% by weight, and reducing sugar in an amount to 0.5-1% by weight, preferably 0.6, preferably 0.7, preferably 0.8, preferably 0.9, preferably 1, and more preferably about 0.72% by weight based on a total weight of the AG.

The cementitious mortar composition also includes water. The water may be tap water, distilled water, bi-distilled water, de-ionized water, de-ionized distilled water, reverse osmosis water, and/or some other water. In one embodiment, the water is bi-distilled to eliminate trace metals. Preferably the water is bi-distilled, de-ionized, deionized di-stilled, or reverse osmosis water and at 25° C. In some embodiments, water is in the amount of 40% by weight of the OPC.

In some embodiments, the composition comprises carbon in an amount of 0.01-1.3% by weight of the composition, oxygen in an amount of 34-39% by weight of the composition, sodium in an amount of 0.5-1% by weight of the composition, magnesium in an amount of 0.9-1.7% by weight of the composition, aluminum in an amount of 1.4-2.3% by weight of the composition, silicon in an amount of 5-8% by weight of the composition, sulfur in an amount of 4-8% by weight of the composition, chlorine in an amount of 0.1-0.3% by weight of the composition, potassium in an amount of 0.7-1.6% by weight of the composition, calcium in an amount of 40-45% by weight of the composition, and iron in an amount of 2-5% by weight of the composition. In a specific embodiment, when the cementitious mortar composition includes AG in an amount of 0.75% by weight of the OPC, the composition has a Ca to Si molar ratio of 6.

In some embodiments, the composition has a content of calcium-silicate-hydrate of 70-90% based on a total composition of calcium-silicate-hydrate and portlandite. In a specific embodiment, when the cementitious mortar composition includes AG in an amount of 0.75% by weight of the OPC, the composition has a content of calcium-silicate-hydrate of 85-87%, preferably 85, preferably 86, preferably 87, and more preferably about 86.4% based on a total composition of calcium-silicate-hydrate and portlandite. In some embodiments, the composition has a content of portlandite of 10-30% based on a total composition of calcium-silicate-hydrate and portlandite. In a specific embodiment, when the cementitious mortar composition includes AG in an amount of 0.75% by weight of the OPC, the composition has portlandite in a range of 13-15%, preferably 13, preferably 14, preferably 15, and more preferably about 13.6% by weight based on the total composition of calcium-silicate-hydrate and portlandite.

FIG. 1 illustrates a flow chart of a method 50 of preparing the cementitious mortar composition. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes dissolving the Arabic Gum (AG) in water to form an Arabic Gum-containing solution. To prepare the AG-containing solution (AG solution), the AG is dissolved in water, where the concentration of the AG in the AG-containing solution is about 0.1-2%. In some embodiments, the AG was pulverized in a mill and sieved through a mesh, preferably having an ASTM (American Society for Testing and Materials) sieve size of a #100, to help achieve AG of uniform particle size. The sieved AG may be used for preparing the AG-containing solution. In a preferred embodiment, a magnetic stirrer was used for the effective dissolution of the AG. In other embodiments, shaking, mixing, vortexing, sonicating, inverting, and method known in the art may be used for the effective dissolution of the AG. The AG-containing solution may be a homogeneous mixture, a heterogenous mixture, a suspension, and the like. In an embodiment, the AG-containing solution is a homogeneous mixture.

At step 54, the method 50 includes mixing the ordinary Portland cement (OPC), the Arabic Gum-containing solution, sand, and water according to ASTM C150 to form a paste mixture and a mortar mixture. The weight by volume ratio of the OPC to water is in a range of 1:1 to 5:1, preferably 2:1 to 3:1, and more preferably about 2.5:1. the ingredients were added sequentially for a total period of about 5 minutes.

At step 56, the method 50 includes casting the mortar mixture in a mold to form a molded composition. In an embodiment, the cast mortar mixture in the mold were vibrated on a table for a time of 5-30 seconds, preferably 10-20 seconds, and more preferably about 15 seconds. The casting may be performed by any of the conventional methods known in the art.

At step 58, the method 50 includes curing the mortar mixture to form a cured sample of the cementitious mortar composition. The mortar mixture was cured at a temperature range of 15-30° C., preferably 19-25° C., and more preferably about 22° C., for about 40-50 hours, preferably about 48 hours, to obtain the cured composition. The cured sample was further aged to form the cementitious mortar composition. In some embodiments, the sample is aged for 2-60 days, preferably 5-55, preferably 10-50, preferably 15-45, preferably 20-40, preferably 25-35, and more preferably 26-30 days to form the cured sample. In a specific embodiment, the mortar mixture cured for at least 2 days has a porous structure including one or more microcracks. The porous structure may be irregular in form, comprising bumps, ridges, nodules, depressions, divots, and the like on the surface of the porous structure. The porous structure may comprise areas of uniform patches, areas of rough patches, and areas of irregular patches, a combination thereof, and the like. The width of the microcracks is in the range of 20-500 nm. In some embodiments, the width of the microcracks is in the range of 20-200 nm. In a specific embodiment, the cured sample has microcracks with the width of preferably 30-190, preferably 40-180, preferably 50-170, preferably 60-160, preferably 70-150, preferably 80-140, preferably 90-130, preferably 100-120, and preferably 105-110 nm. In some embodiments, the one or more microcracks may comprise varying widths. In some embodiments, the one or more microcracks may have varying widths within a single microcrack. For example, a microcrack may have a width of 30 nm in a first location along the microcrack and a width of 70 nm in a second location along the microcrack and the like. In some embodiments, the length of the microcracks is in the range of 0.1-500 µm. In some embodiments, the length of the microcracks is in the range of 0.1-300 µm. In a specific embodiment, the cured sample has microcracks with the length of preferably 0.1, preferably 0.2, preferably 0.3, preferably 0.4, preferably 0.5, preferably 0.6, preferably 0.7, preferably 0.8, preferably 0.9, preferably 1-290, preferably 10-280, preferably 20-270, preferably 30-260, preferably 40-250, preferably 50-240, preferably 60-230, preferably 70-220, preferably 80-210, preferably 90-200, preferably 100-190, preferably 110-180, preferably 120-170, preferably 130-160, and preferably 140-150 µm. The microcracks may be linear, non-linear, and a combination thereof. In an embodiment, the microcracks may comprise branches. In some embodiments, the microcracks may be in the form of a singular microcrack or a connected network of multiple microcracks. In some embodiments, the microcracks may have breaks or separations of 0.1 to 100 nm. In a specific embodiment, when the cementitious mortar composition includes AG in an amount of 0.75% by weight of the OPC, the cured sample has a range of micropores from 1 to 100 µm in diameter, and a range of microcracks are from 20 to 200 nm wide and 0.1 to 300 µm long. In some embodiments, a density of the microcracks is in the range of 1-50 microcracks per cubic millimeter. In a specific embodiment, the cured sample has microcracks with the density of 1-50, preferably 5-25, and more preferably 10-20 microcracks per cubic millimeter.

In some embodiments, the cured sample has granules from 1-20 µm in diameter that are bundles of microfilaments with a length from 0.2 to 5 µm. The granules may be rounded or comprise irregular edges. The irregular edges may be spiked, jagged, bumpy, smooth, or a combination thereof. In a specific embodiment, the cured sample has granules with diameter sizes of preferably 1, preferably 2, preferably 3, preferably 4, preferably 5, preferably 6, preferably 7, preferably 8, preferably 9, preferably 10-14, preferably 14-18, and preferably 18-20 μm. In an embodiment, the granules comprise varying sizes. For example, a first granule in a sample may have a diameter of 3 μm and a second granule in the sample may have a diameter of 7 μm and the like. In some embodiments, the bundles have 20-1000 microfilaments. In a specific embodiment, the bundles have preferably 20, preferably 30, preferably 40, preferably 50, preferably 60, preferably 70, preferably 80, preferably 90, preferably 100-200, preferably 200-300, preferably 300-400, preferably 400-500, preferably 500-600, preferably 600-700, preferably 700-800, preferably 800-900, and preferably 900-1000 microfilaments. The microfilaments may be arranged in a uniform direction, such as vertical, or may be arranged in multiple directions and the like. In an embodiment, microfilaments may not be in bundles and may be optionally located individually. In an embodiment, the granules comprise varying amounts of microfilaments. For example, a first granule in a sample may comprise 70 microfilaments and a second granule in the sample may comprise 200 microfilaments and the like. In an embodiment, the bundles of microfilaments comprise microfilaments with a length of 0.2 to 5 μm, preferably 0.2, preferably 0.3, preferably 0.4, preferably 0.5, preferably 0.6, preferably 0.7, preferably 0.8, preferably 0.9, preferably 1-2, preferably 2-3, preferably 3-4, and preferably 4-5 μm. The microfilaments are in the form of cylinders. The cylinders may be linear or non-linear. The microfilaments may have varying thicknesses with cylindrical diameters from 1 to 100 nm. In some embodiments, a density of the microfilaments is in the range of 1-10,000 microfilaments per granule. In a specific embodiment, the cured sample has microfilaments in granules with a density of 1-10,000, preferably 50-5000, and more preferably 100-1000 microfilaments per granule.

In some embodiments, the cured sample has a range of micropores from 1-200 μm in diameter. In some embodiments, the cured sample has a range of micropores from 1 to 100 μm in diameter. In a specific embodiment, the cured sample has micropores with diameter size in a range of preferably 2-99, preferably 5-95, preferably 10-90, preferably 15-85, preferably 20-80, preferably 25-75, preferably 30-70, preferably 35-65, preferably 40-60, preferably 45-55, and preferably 50-54 μm. In an embodiment, the micropores comprise varying sizes. For example, a first micropore in a sample may have a diameter of 5 μm and a second micropore in the sample may have a diameter of 70 μm and the like. In some embodiments, the cured sample has a pore density value in the range of 0.3-0.5 mg/m³ and preferably about 0.35-0.45 mg/m³ in a timeframe of 28-56 days.

In some embodiments, the cured sample has a volume of permeable voids of 16-14%, preferably 14.2-15.7%, in a timeframe of 28-56 days. In a specific embodiment, the cured sample has a volume of permeable voids of preferably 15.7%, and preferably 14.2% in a timeframe of 28 and 56 days, respectively, which is 15-20% less than a comparative sample obtained by curing a comparative mortar composition that is the same as the cured sample but does not contain AG. In some embodiments, the cured sample has a density of volume of permeable voids from 2.2-2.6 mg/m³, in a timeframe of 28-56 days. The volume of permeable voids is tested according to ASTM C642-13.

In some embodiments, when the cementitious mortar composition includes AG in an amount of 0.75% by weight of the OPC, the cured sample has a mortar flow of 28-47% greater than a comparative mortar composition that is the same as the cementitious mortar composition but does not contain AG, wherein the mortar flow is determined according to ASTM C230. In a specific embodiment, the cementitious mortar composition has a mortar flow of preferably 28-47%, preferably 29-46, preferably 30-45, preferably 31-44, preferably 32-43, preferably 33-42, preferably 34-41, preferably 35-40, preferably 36-39, and preferably 37-38% greater than a comparative mortar composition that is the same as the cementitious mortar composition but does not contain AG, wherein the mortar flow is determined according to ASTM C230. This is ascribed to the lubricating nature of the AG in aqueous condition, which resists inter-particle frictional forces.

In some embodiments, when the cementitious mortar composition includes AG in an amount of 0.75% by weight of the OPC, the cured sample has a compressive strength value of 32-53 MPa in a timeframe of 7-56 days. In a specific embodiment, the cured sample has a compressive strength value of preferably 32.6, preferably 37.3, preferably 47.1, and 52.5 MPa in a timeframe of 7, 14, 28, and 56 days, respectively. The compressive strength value is 12-32% greater than a comparative sample obtained by curing a comparative mortar composition similar to the cured sample but does not contain AG. There is an insignificant increase in compressive strength in samples prepared with more than 0.75% of AG accredited to the over-dosage resulting in bleeding and segregation in the fresh state of the mortar and negatively influencing the cohesiveness and uniformity of the mortar specimens.

In some embodiments, when the cementitious mortar composition includes AG in an amount of 0.75% by weight of the OPC, the cured sample has a flexural strength value of 4-7 MPa in a timeframe of 7-56 days. In a specific embodiment, the cured sample has the flexural value of preferably 4.3, preferably 4.8, preferably 5.7, and preferably 6.5, in a timeframe of 7, 14, 28, and 56 days, respectively. The flexural strength value is 14-31% greater than a comparative sample obtained by curing a comparative mortar composition similar to the cured sample but does not contain AG. There is a flexural strength retrogression in samples prepared with more than 0.75% of AG accredited to the over-dosage, which caused non-reacted particles and a weaker interfacial transition zone because of the excessive retardation effect.

A linear increase in the flow and setting time was observed, with an increase in the AG content attributed to lubricating and retarding effects, respectively. However, a dosage of 0.75% was considered appropriate for enhancing the overall engineering properties. This mix achieved a compressive strength of 32.6-52.5 MPa and a flexural strength of 4.3-6.5 MPa between 7 and 56 days, respectively. The increased mechanical characteristics in the range of 12-32% compared to the control were attributed to the reduction in the volume of permeable voids of mortar up to 19.6%.

The composition prepared by the present disclosure has an initial setting time of 280-430 minutes and a final setting time of 320-465 minutes, both of which are 100 to 200% greater than a comparative mortar composition that is the same as the cementitious mortar composition but does not contain AG, where the final setting time is evaluated according to ASTM C191. The setting times were linearly extended with an increase in the content of AG. The retarding effect imparted by the AG is accredited to the fact that it contains natural sugar, which has been shown in literature to decrease setting times.

The composition may be in the form of a cube, a prism, and a paste. In some embodiments, the composition is in the form of a cube having a dimension of 50 mm×50 mm×50 mm. In some embodiments, the composition is in the form of a prism having a dimension of 40 mm×40 mm×160 mm.

The composition may comprise a molar ratio of calcium to silicate (Ca/Si) of 5 to 10, preferably 6 to 9, and yet more preferably about 6. In a specific embodiment, when the cementitious mortar composition includes AG in an amount of 0.75% by weight of the OPC, the cured sample has a molar ratio of Ca/Si of about 6.01. A lower molar ratio of Ca/Si in the composition may promote a silicate reorganization and a C—S—H gel formation, which may lead to an increase in strength development of the cementitious mortar composition. An addition of Arabic gum in a preferred amount, about 0.75% by weight of the ordinary Portland cement, may promote the dissolution of portlandite and the hydroxide groups comprising the portlandite and promote the formation of C—S—H gels. The C—S—H gel formation may help to fill the microcracks and micropores in the sample, promote elemental bonding, strengthen an interfacial transition zone, and produce a stronger sample.

The composition may comprise calcium-silicate-hydrate (C—S—H) in an amount of 70-90%, preferably 80-90%, and more preferably 85-90% by weight based on a total weight of calcium-silicate-hydrate and portlandite. A group comprising calcium-silicate-hydrate may include the minerals afwillite, gyrolite, jennite, thaumasite, tobermorite, xonotlite, and the like. The composition may comprise portlandite in an amount of 10-30%, preferably 10-20%, and more preferably 10-15% by weight based on a total weight of calcium-silicate-hydrate and portlandite. Portlandite is a hydroxide-bearing mineral with a formula of $Ca(OH)_2$. Calcium-silicate-hydrate and portlandite may act as binding agents in the cementitious mortar combination. In a specific embodiment, when the cementitious mortar composition includes AG in an amount of 0.75% by weight of the OPC, the cured sample comprises C—S—H in an amount of about 86.4% and portlandite in an amount of about 13.6% by weight based on a total weight of C—S—H and portlandite. An increase in C—S—H formation, and a consequently decrease in portlandite, may lead to a decrease in hydroxyl compounds and an increase in stable Si—O bands in the composition.

In some embodiments, when the cementitious mortar composition includes AG in an amount greater than 0.75% (e.g., 1.5%) by weight of the OPC, microcracks and micropores may form in a greater amount due to the hydration of the sample and an increase in hydroxyl groups in the sample compared to a cementitious mortar composition includes AG in an amount of 0.75% by weight of the OPC.

EXAMPLES

The following examples demonstrate a cementitious mortar composition as described herein. The examples are provided solely for illustration and are not to be construed as limitations of the present disclosure, as many variations thereof are possible without departing from the spirit and scope of the present disclosure.

Materials

Figure 2A:
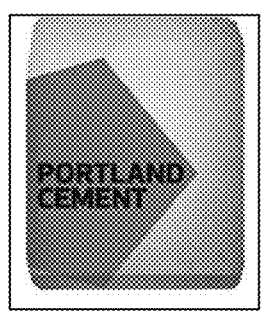
FIG. 2A is a pictorial image of ordinary Portland cement (OPC) used for preparation of the cementitious mortar composition, according to certain embodiments.
Figure 2B:
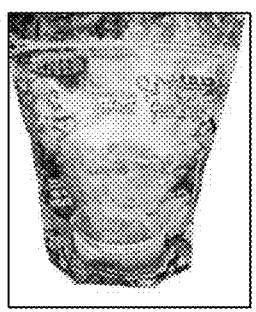
FIG. 2B is a pictorial image of Arabic gum (AG) used for preparation of the cementitious mortar composition, according to certain embodiments.
Figure 2C:
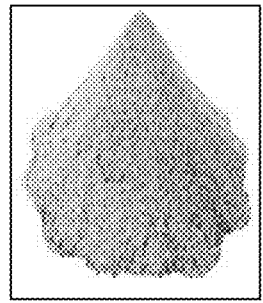
FIG. 2C is a pictorial image of dune sand used for preparation of the cementitious mortar composition, according to certain embodiments.
Figure 2D:
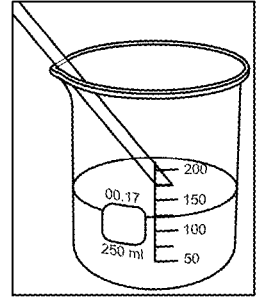
FIG. 2D is a pictorial image of water used for preparation of the cementitious mortar composition, according to certain embodiments.

The types of raw material used, and the procedure of the synthesis of the specimens herewith provided. The cement used was ordinary Portland cement (OPC) or Type I (FIG. 2A). The cement complied with ASTM C-150 specifications. The typical chemical composition of the OPC is summarized in Table 1. The Arabic Gum (AG) was used as an additive in the development of mortar and paste specimens. The edible AG was procured from Elnaser company (FIG. 2B). The AG was used with different dosages ranging from 0% to 1.5% by weight of the cement. The AG was pulverized in the mill and sieved in the laboratory. The material passing ASTM sieve size #100 was utilized in the preparation of mixtures. The rationale for the selection of the dosage of AG is based on outcomes of trial mixes. The chemical composition of AG is provided in Table 2. The type of sand used was dune sand. Dune sand was used as a fine aggregate (FA) in the preparation of the mortar mixes (FIG. 2C). It was procured from the Saudi Ready-mix Co. The maximum particle size of the FA was 600 µm. The FA consisted of 89% quartz and 11% sulfur. The sand-to-cement ratio was fixed at 1.5 in the mixes. The water used for the mixes was normal tap water (FIG. 2D). It was clear and odorless. The water-to-cement ratio was kept constant at 0.4 in the mixes.

TABLE 1

| Chemical composition of OPC | |
|---|---|
| Parameters | Content (%) |
| CaO | 64.5 |
| $SiO_2$ | 21.9 |
| $Al_2O_3$ | 5.7 |
| $Fe_2O_3$ | 3.7 |
| $K_2O$ | 0.35 |
| MgO | 2.1 |
| $Na_2O$ | 0.2 |
| LOI | 0.65 |
| $C_3S$ | 55 |
| $C_2S$ | 19 |
| $C_3A$ | 10 |
| $C_4AF$ | 7 |

TABLE 2

| Chemical composition of the AG. | | | | | | | |
|---|---|---|---|---|---|---|---|
| | | | Parameters | | | | |
| | Na (mg) | Ca (g) | Mg (g) | K (g) | Fe (mg) | Dietary fiber (%) | Total ash (%) | Reducing sugar (%) |
| Content | 0.6 | 0.25 | 5.85 | 3.2 | 0.06 | 89.2 | 3.2 | 0.72 |

Specimen Preparation

Figure 2E:
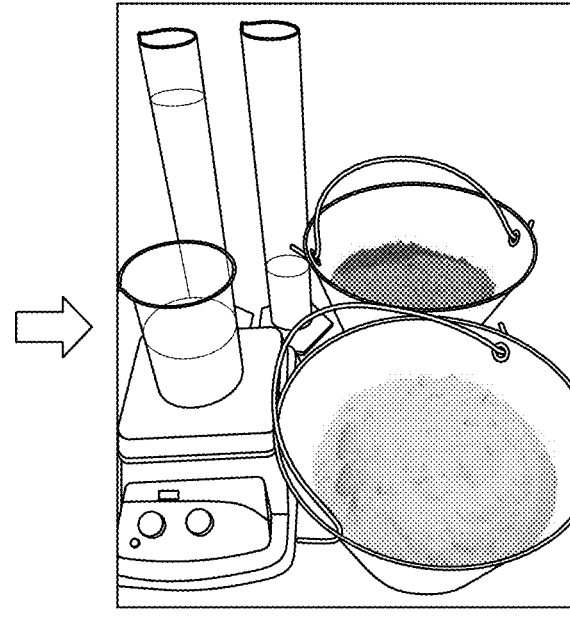
FIG. 2E is a pictorial image depicting a weighted quantity of the OPC, sand, and AG for dissolution in water, according to certain embodiments.

Preparation of AG solution: Prior to the preparation of mixtures, AG solution (AG-containing solution) was prepared by mixing the desired amount of water with the AG powder. A magnetic stirrer was used to dissolve the AG in water effectively (FIG. 2E).

Figure 2G:
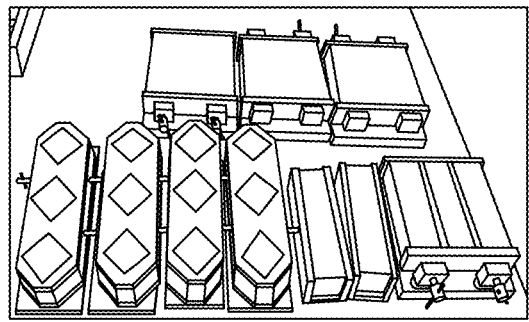
FIG. 2G is a pictorial image depicting a mold filled with various mortar mixtures to prepare the cementitious mortar composition, according to certain embodiments.
Figure 2F:
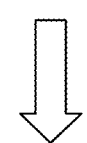
FIG. 2F is a mixer used for the preparation of the cementitious mortar composition, according to certain embodiments.
Figure 2F:
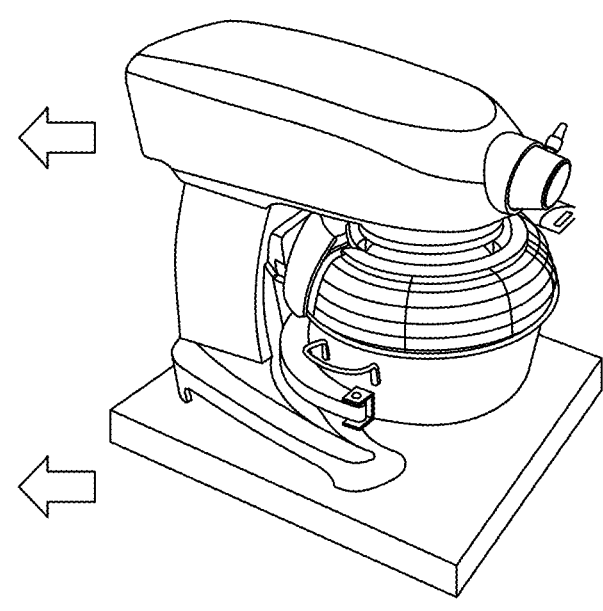

Casting operation: The mixer used for preparing the paste and mortar mixes was of Hobart brand (FIG. 2F). The paste and mortar mixes were prepared in the mixer having a bowl volume of 5 and 20 L, respectively. The ASTM specifications were followed to mix the ingredients sequentially for a total period of about 5 minutes. The mortar samples were cast, filled in molds, and vibrated on a table for a period of about 15 seconds (FIG. 2G). A total of 6 mortar and paste samples were prepared. The total number of mortar specimens prepared was 18 cubes and 12 prisms per batch. Table 3 shows the typical mix proportion.

TABLE 3

| | | Typical mix proportion (kg/m$^3$) | | | |
|---|---|---|---|---|---|
| Mix | OPC | Sand | Water | AG | AG (%) |
| M1 | 767.22 | 1150.83 | 306.9 | 0 | 0 |
| M2 | 767.22 | 1150.83 | 306.9 | 1.91 | 0.25 |
| M3 | 767.22 | 1150.83 | 306.9 | 3.83 | 0.5 |
| M4 | 767.22 | 1150.83 | 306.9 | 5.75 | 0.75 |
| M5 | 767.22 | 1150.83 | 306.9 | 7.67 | 1 |
| M6 | 767.22 | 1150.83 | 306.9 | 11.5 | 1.5 |

Figure 2H:
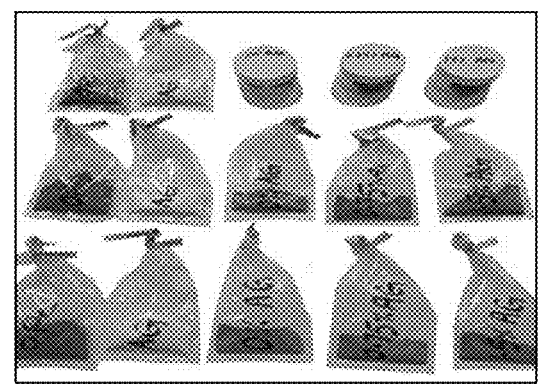
FIG. 2H is a pictorial image depicting raw specimens (raw AG and raw OPC) and paste of various mortar mixtures, namely, M1 (control), M2, M3, M4, M5, and M6 having 0, 0.25, 0.5, 0.75, 1, and 1.5 wt. % of AG, respectively, according to certain embodiments.

Curing technique: The freshly prepared samples were kept at a laboratory temperature to set by covering them with a plastic sheet to avoid loss of moisture and de-molded after about 48 hours. Thereafter, the samples were sealed in plastic bags and kept in a lab environment (22±3° C.) till test ages (FIG. 2H).

Test Methods

The quality of the paste and mortar mixtures was evaluated by conducting a series of representative fresh, mechanical, and microstructural tests by the following test methods as detailed in the subsequent examples.

Figure 3A:
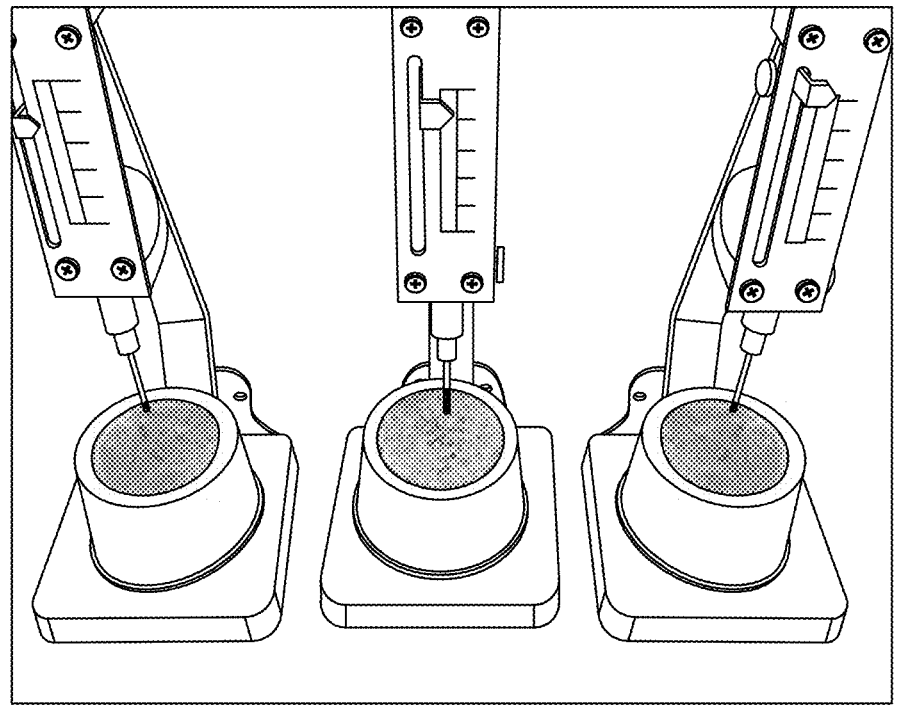
FIG. 3A is a pictorial view of an experimental test set-up for observing setting times of various mortar mixtures, according to certain embodiments.

Setting time: The initial and final setting times determine the hardening and loss of plasticity of a concrete mix, respectively. The setting times of the cement paste were evaluated using Vicat's apparatus, as per ASTM C191. The test set-up includes Vicat's apparatus frame with a moveable plunger and a scale, a glass plate, a conical ring, and a stopwatch. The procedure for determining the setting time was as follows: (1) the time when the cement and water were contacted in the mixture was noted; (2) after preparation of the paste mixture, an approximate shape of a ball from gloved hands was made; (3) the ball was tossed six times keeping six inches apart, the ball was then inserted in the conical ring from the bottom, and the paste was leveled from bottom and top; (4) the initial setting time was measured using a 1 mm Ø needle at an interval of every 15 minutes at different locations until a penetration of <25 mm is achieved and the time was noted; and (5) the final setting time was measured with a separate needle having a circular ring at the tip by taking readings at an interval of every 5 minutes at different locations until the circular impression is not visible by eye on the surface of the paste specimens and the time was noted. The experimental test set-up for observing the setting time for various mortar mixtures is shown in FIG. 3A.

Figure 3B:
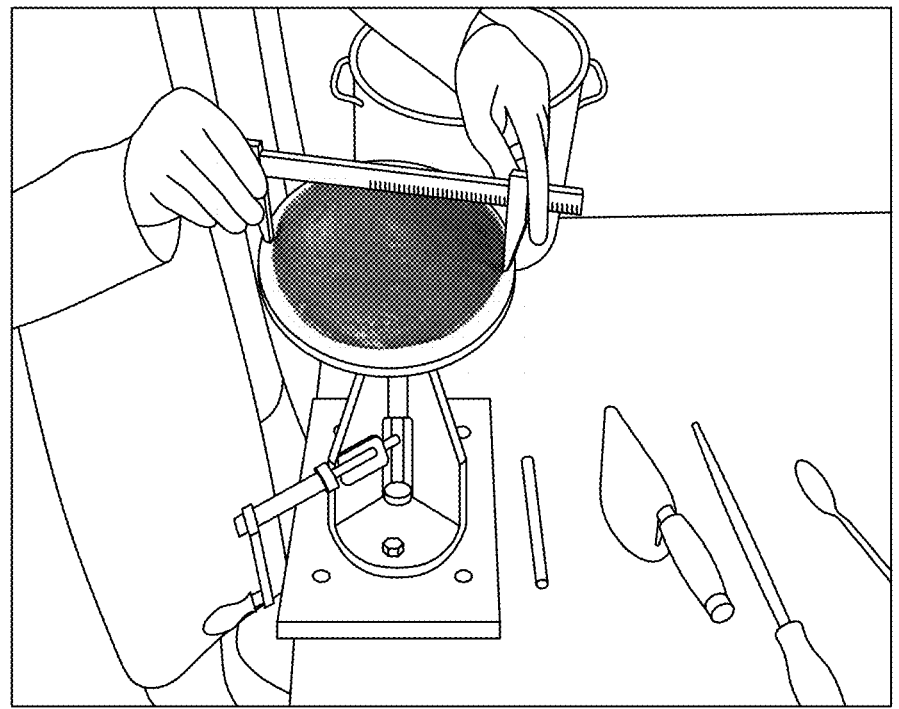
FIG. 3B is a pictorial view of an experimental test set-up for observing the flow of various mortar mixtures, according to certain embodiments.

Flow test: The flow test is a test for determining the workability of mortar mixes. The flow was determined using a flow table, as per ASTM C230. The flow table involved a rotating and lifting table, a conical ring, a tamping rod, and a caliper. The procedure for determining the flow was as follows: (1) the cone was centered on the marked section of the flow table; (2) two layers of freshly mixed mortar were poured into the mold, followed by tamping each layer 25 times; (3) the top surface was leveled with a trowel and excess mortar removed from the mold; (4) the table was then raised, lowered, and rotated 25 times in roughly 15 seconds; and (5) the diameter of the mortar spread was recorded with the caliper. The experimental test set-up for observing the flow test for various mortar mixtures is shown in FIG. 3B.

Figure 3C:
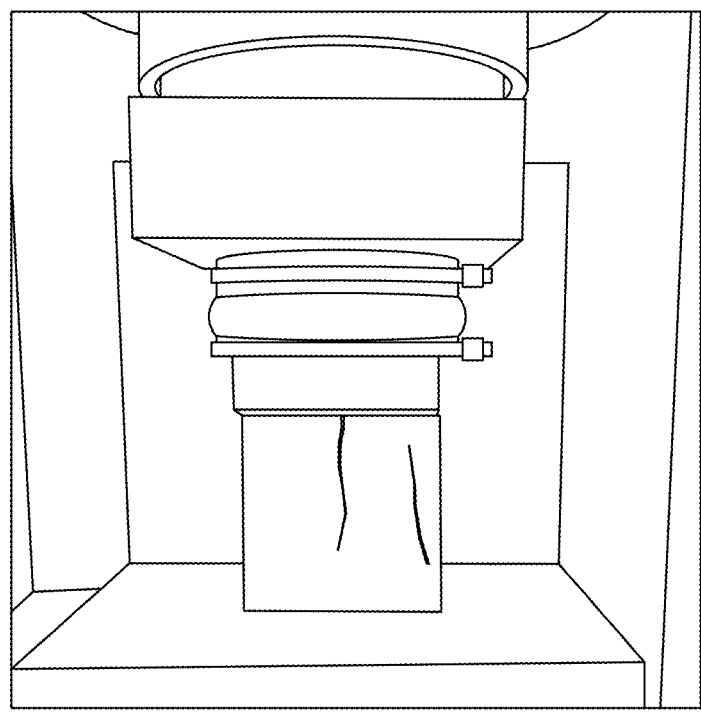
FIG. 3C is a pictorial view of an experimental test set-up for observing compressive strength of various mortar mixtures, according to certain embodiments.

Compressive strength test: The compressive strength test is a common test to measure mechanical strength. It indicates the overall quality of the specimens. 50 mm$^3$ mortar cubes were used for determining the compressive strength. The procedure for evaluating the strength was as follows: (1) the specimens were placed on the center of a cleaned platen; (2) the safety door of the machine was closed; (3) the mode of testing, sample shape, and size were selected; (4) the specimens were compressed using a hydraulic compression testing machine at a uniform loading rate of 0.9 kN/s until failure; and (5) the compressive strength was calculated by dividing the failure load with the surface area of the specimen. The strength was measured at the ages of 7 days, 14 days, 28 days, and 56 days. Three specimens from each batch and each age were evaluated, and their average values were reported. The experimental test set-up for observing the compressive strength of various mortar mixtures is shown in FIG. 3C.

Figure 3D:
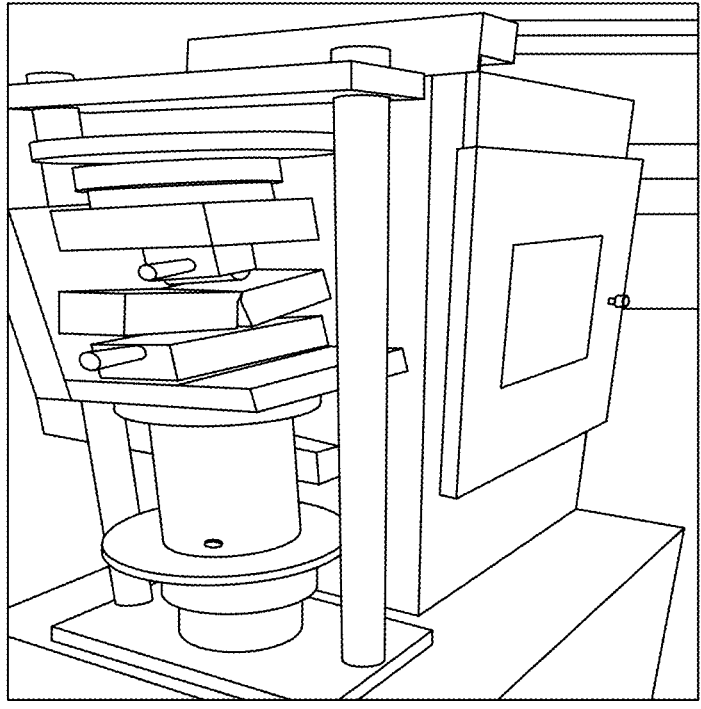
FIG. 3D is a pictorial view of an experimental test set-up for observing flexural strength of various mortar mixtures, according to certain embodiments.

Flexural strength test: Flexural strength (sometimes known as the modulus of rupture) is a bending tensile strength measurement. Mortar prisms of size 40×40×160 mm were evaluated using a flexural testing machine. The prisms were loaded at their center point with uniform loading until the failure occurred. The procedure for determining the flexural strength was as follows: (1) a line on the center of the prism was marked to ensure that there was no eccentricity; (2) the specimen was placed on the supports such that the hand-finished surface of the specimen was not in contact with the loading points; (3) the mode of testing, sample shape, and size were selected; (4) the flexural testing machine ran; and (5) the failure load and the flexural strength displayed by the digital machine was observed. Three specimens were evaluated, and their average values were reported from each batch of the mix at the ages of 7 days, 14 days, 28 days, and 56 days. The experimental test set-up for observing the flexural strength for various mortar mixtures is shown in FIG. 3D.

Volume of permeable voids (VPV) test: 50 mm$^3$ mortar cubes were used to determine the permeable voids after 28 days and 56 days of curing, as per ASTM C642-13. Three specimens were tested, and their average values were reported for each batch and age. The procedure of this test was as follows: (1) the specimens were placed in the oven for 24 h at 110° C., and the oven-dried weight ($W_1$) was measured; (2) the specimens were submerged into the water, and their weight was measured after 48 hours ($W_2$); (3) the specimens were boiled in water for 5 hours, and their surface dry weight was measured ($W_3$); (4) the specimens were attached by a wire, and the apparent mass under the water was recorded ($W_4$); (5) the bulk density dry and apparent density was calculated as follows:

$$\text{Bulk density dry } (\text{kg/m}^3) = [W_1/(W_3 - W_4)] \times \text{density of water}$$

$$\text{Apparent density } (\text{kg/m}^3) = [W_1/(W_1 - W_4)] \times \text{density of water}$$

and (6) the volume of permeable voids was calculated as follows:

$$\text{Volume of permeable voids } (\%) =$$

$$[(\text{Apparent density} - \text{Bulk density dry})/\text{Apparent density}] \times 100$$

Figure 3E:
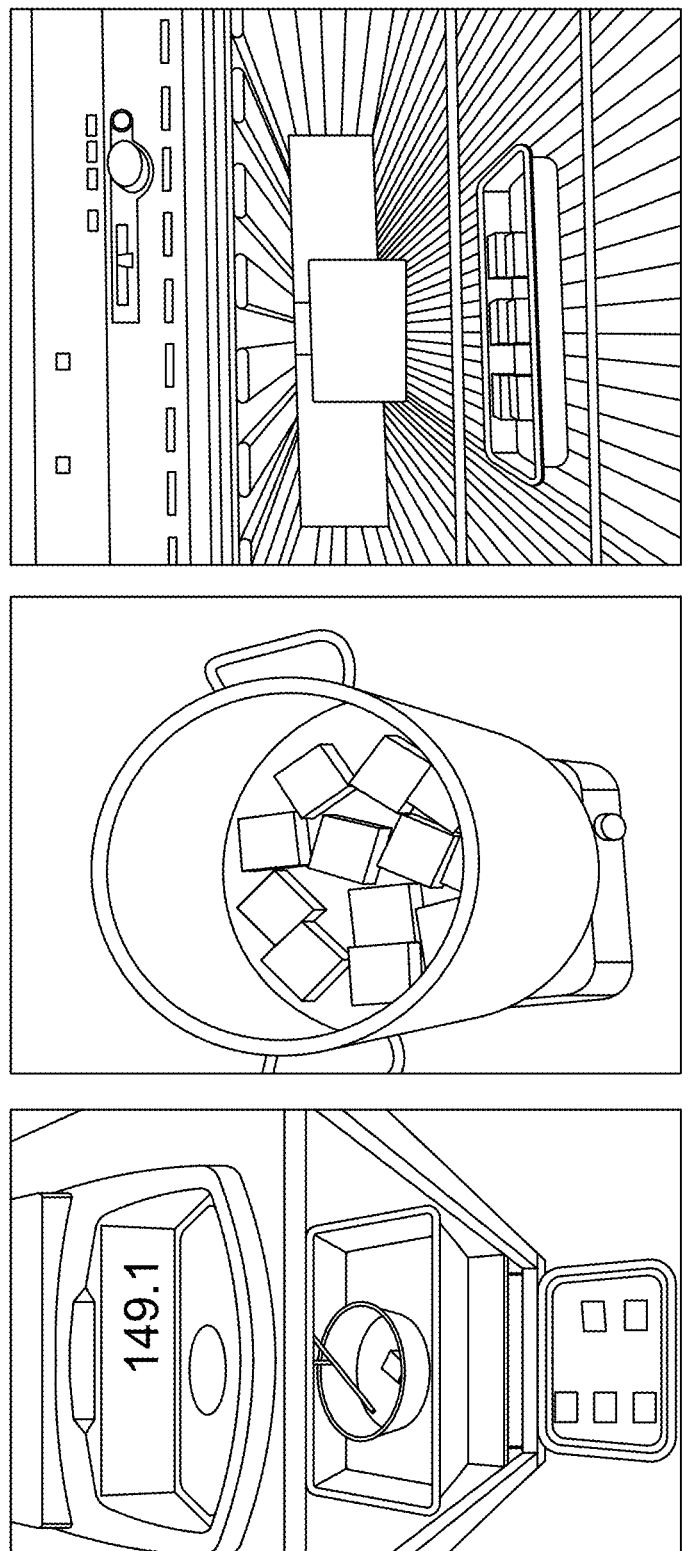
FIG. 3E is a pictorial view of an experimental test set-up for observing water absorption of various mortar mixtures, according to certain embodiments.

The experimental test set-up for observing the water absorption for various mortar mixtures is shown in FIG. 3E.

Figure 3F:
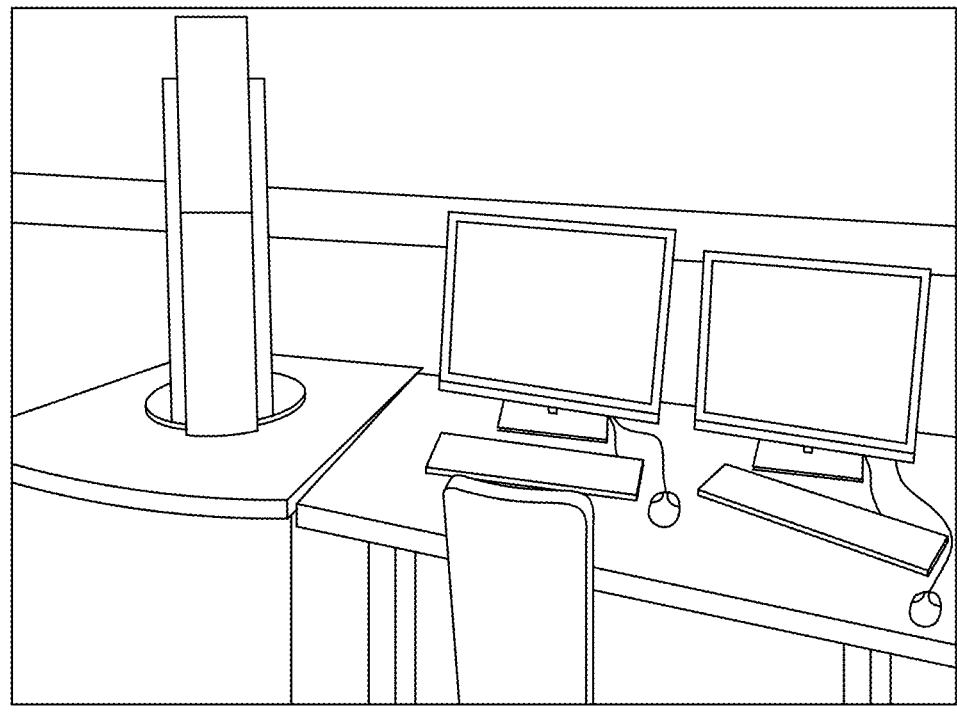
FIG. 3F is a pictorial view of an experimental test set-up for analyzing scanning electron microscopy (SEM) and energy dispersive X-ray spectroscopy (EDS) data for various mortar mixtures, according to certain embodiments.

Scanning Electron Microscopy (SEM) and Energy Dispersive Spectroscopy (EDS): The morphology and the elemental composition analysis of the raw OPC, the raw AG, and the 28 day hydrated paste specimens were conducted by employing an SEM machine coupled with an EDS detector. The microstructural variations were investigated by gold coating the specimens and the following operating conditions were input: high vacuum mode, a physical working distance of ~10 mm, and an accelerated voltage of 20.00 kV. The images were taken at a magnification varied between 100× and 20,000× and a scale range of 1 mm to 5 μm. EDAX APEX software was used for the quantitative measurement of elements and the generation of EDS profiles. The experimental test set-up for performing the SEM-EDS for various mortar mixtures is shown in FIG. 3F.

Figure 3G:
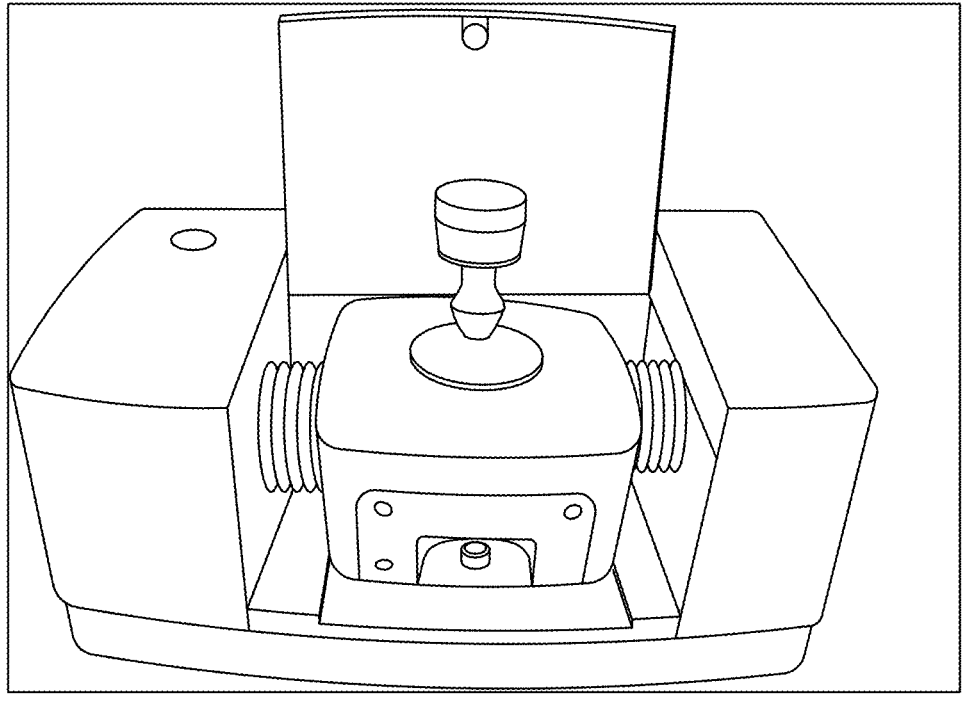
FIG. 3G is a pictorial view of an experimental test set-up for analyzing Fourier-transform infrared spectroscopy (FTIR) data for various mortar mixtures, according to certain embodiments.

Fourier Transform Infra-Red (FTIR) spectroscopy: The bond behavior of the selected paste samples was assessed by SHIMADZU's FTIR machine coupled with IRSpirit spectrophotometer and operated with IRPilot software. The sampling technique used was attenuated total reflection (ATR). The spectrum measurement conditions were as follows: type of function=apodization (Happ-Genzel); wavelength range=400 to 4500 cm$^{-1}$; number of scans=24; and resolution=16 cm$^{-1}$. The spectra were collected using the Multipoint Baseline Correction method. The experimental test set-up for performing the FTIR for various mortar mixtures is shown in FIG. 3G.

Figure 3H:
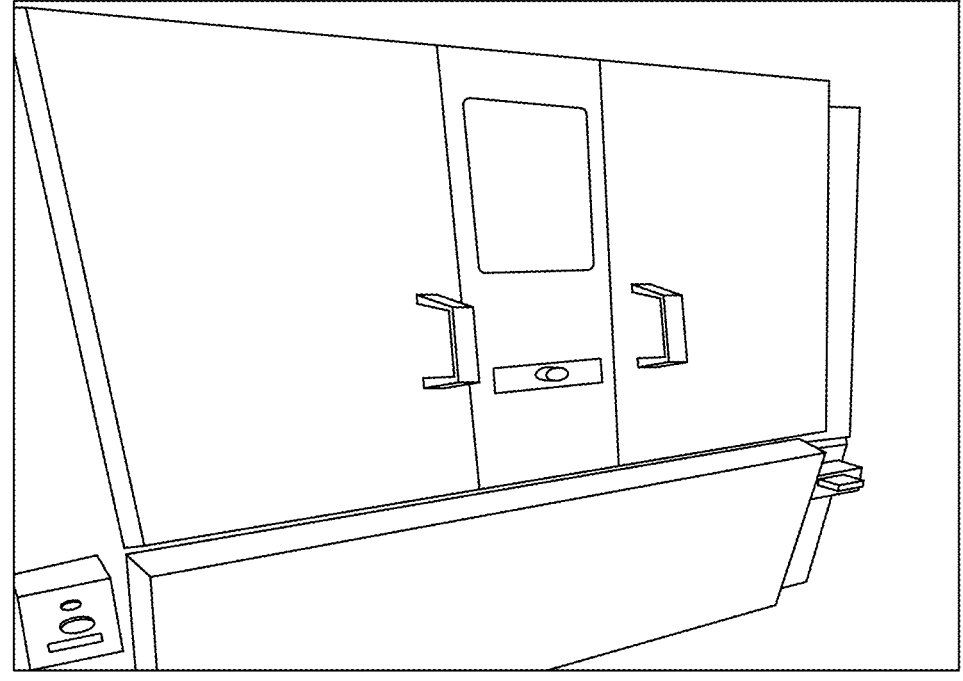
FIG. 3H is a pictorial view of an experimental test set-up for analyzing X-ray diffraction (XRD) pattern for various mortar mixtures, according to certain embodiments.

X-ray Diffraction (XRD) analysis: The quantitative mineralogy and crystallinity of the selected paste samples were assessed by a floor-mounted Rikagu Ultima IV machine coupled with an X-ray diffractometer system and operated with the SmartLab Studio application. The measurement conditions were as follows: X-ray=40 kV, 30 mA; scan speed=4 deg./min.; step width=0.02 deg.; scan range=10 to 70 deg.; Incident silt=1 mm; receiving silt=2 mm; filter=K-beta; and detector=Scintillation counter. The Reference Intensity Ratio (RIR) was used to conduct the quantitative analysis by powder diffraction, and Williamson-Hall method was employed to assess the crystallinity of the emerged phases. The experimental test set-up for performing the XRD for various mortar mixtures is shown in FIG. 3H.

Figure 4:
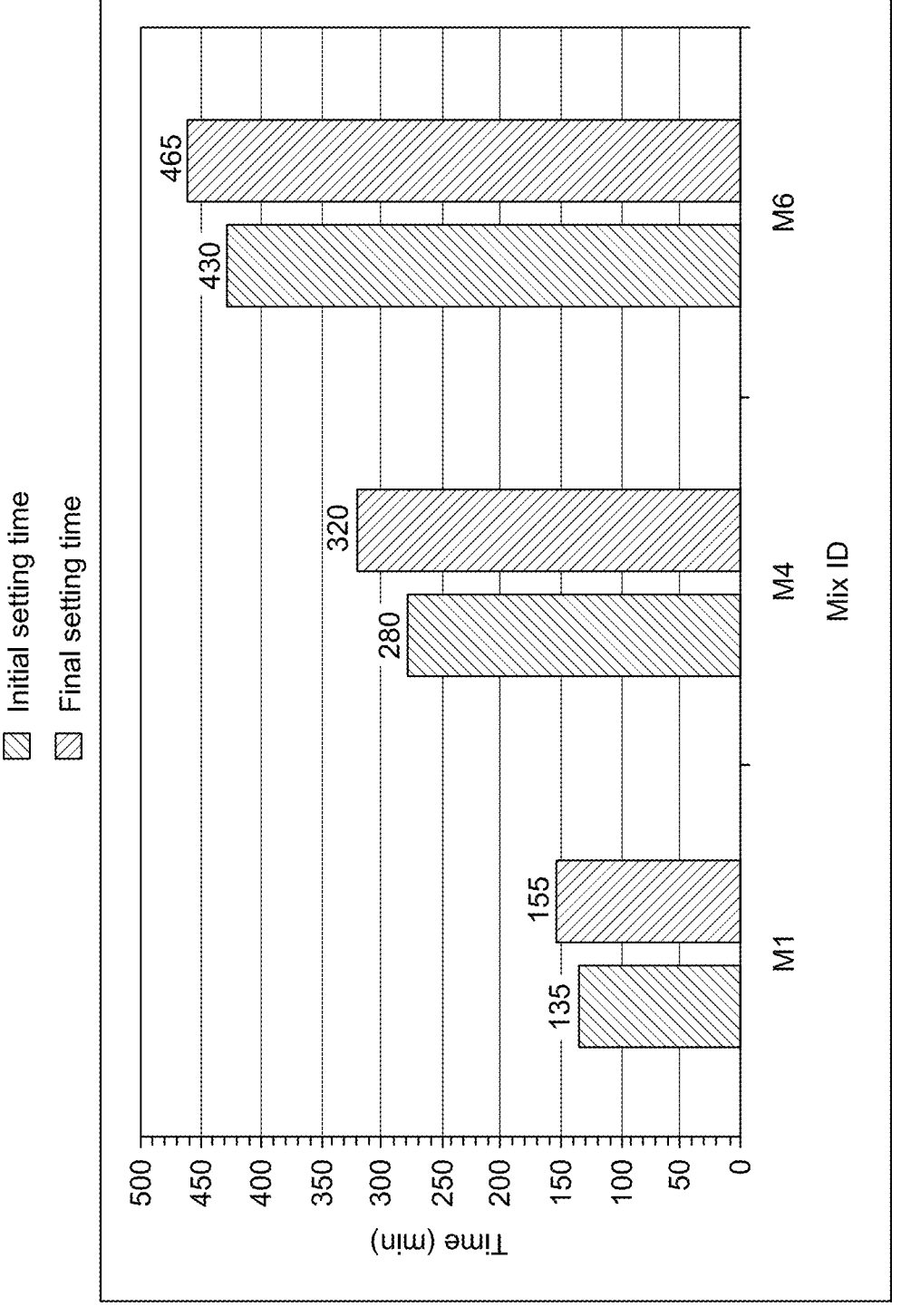
FIG. 4 is a plot showing initial and final setting times for the mortar mixtures, M1, M4, and M6, according to certain embodiments.

FIG. 4 shows the results of the initial and final setting times of the paste mixes or mortar mixes prepared with control (M1, 0% AG), moderate (M4, 0.75% AG), and high dosages of AG (M6, 1.5% AG). The results indicate that the AG directly affects the fresh properties of a concrete mix. The control mix achieved the initial setting time and final setting time after 135 minutes and 155 minutes, respectively. The two mixes with AG, M4 and M6, tended to delay the initial and final setting times such that the initial and final setting times of M4 was 280 and 320 minutes, respectively, whereas it was 430 and 465 minutes, respectively for M6. These times were successfully extended to approximately 100% and 200% using an AG content of 0.75% and 1.5%, respectively. The setting times were linearly prolonged with an increase in the AG content. Ahmad et al. [Ahmad, A. Lawan, M. Al-Osta, Effect of sugar dosage on setting time, microstructure and strength of Type I and Type V Portland cements, Case Stud. Constr. Mater. 13 (2020) e00364, incorporated herein by reference in its entirety] indicates that the negative influence on strength and setting times of Type I and Type IV Portland cement can be restricted by the selection of dosage of sugar in the range of 0.05 to 0.1% by weight of these cements. The trend of progressive increase in the setting times reveals that the AG can be incorporated in the concrete mix as a retarder in place of commercially available retarding agents. Primarily, the AG can be used in hot weather concreting and mass concreting, where the reaction rate may be slowed to enable the concrete to set gradually without exhibiting cracking. Furthermore, the AG may be beneficially used by ready-mix concrete suppliers while transporting the concrete to remote areas. Mohamed et al. [A. M. Mohamed, M. H. Osman, H. Smaoui, M. A. Mohd Ariffin, Durability and microstructure properties of concrete with Arabic gum biopolymer admixture, Adv. Civil Eng. 2018, incorporated herein by reference in its entirety] used AG biopolymers up to 0.9% and manually evaluated the setting time using an InfraTest-brand of apparatus at a temperature of about 25° C., as per the guidelines of ASTM C191. It was also found that the setting time increases with an increase in the dosage of the AG. The initial settings of about 190 and 490 minutes in mixes prepared with 0% and 0.9%, respectively, were recorded. Mbugua et al. [R. Mbugua, R. Salim, J. Ndambuki, Effect of Gum Arabic Karroo as a water reducing admixture in cement mortar, Case Stud. Constr. Mater. 5 (2016), incorporated herein by reference in its entirety] evaluated the setting time of AG Karoo up to 1% using an automatic apparatus in a lab environment, according to EN 196-03 standard. It was found that the initial setting time tends to extend up to a certain extent of AG content, while a negative trend was observed at higher dosages. The outcomes were justified by the fact that a higher amount of powdered AG would require more quantity of water for effective dissolution. It has been reported [R. Mbugua, R. Salim, J. Ndambuki, Effect of Gum Arabic Karroo as a water reducing admixture in cement mortar, Case Stud. Constr. Mater. 5 (2016); A. Peschard, A. Govin, P. Grosseau, B. Guilhot, R. Guyonnet, Effect of polysaccharides on the hydration of cement paste at early ages, Cem. Concr. Res. 34 (2004), incorporated herein by reference in its entirety] that the retardation depends on the tricalcium aluminate (C$_3$A) content and its reactivity with the calcium sulfate in the cement. Perhaps because the hydration products, along with C$_3$A, tend to absorb the AG before the reaction between the C$_3$A and the calcium sulcate. Another justification for the prolonged setting time is the decrease in the rate of ettringite formation, which leads to the production of calcium-silicate-hydrate (CSH) gel in the aftermath of the reaction of gypsum with water.

Figure 5:
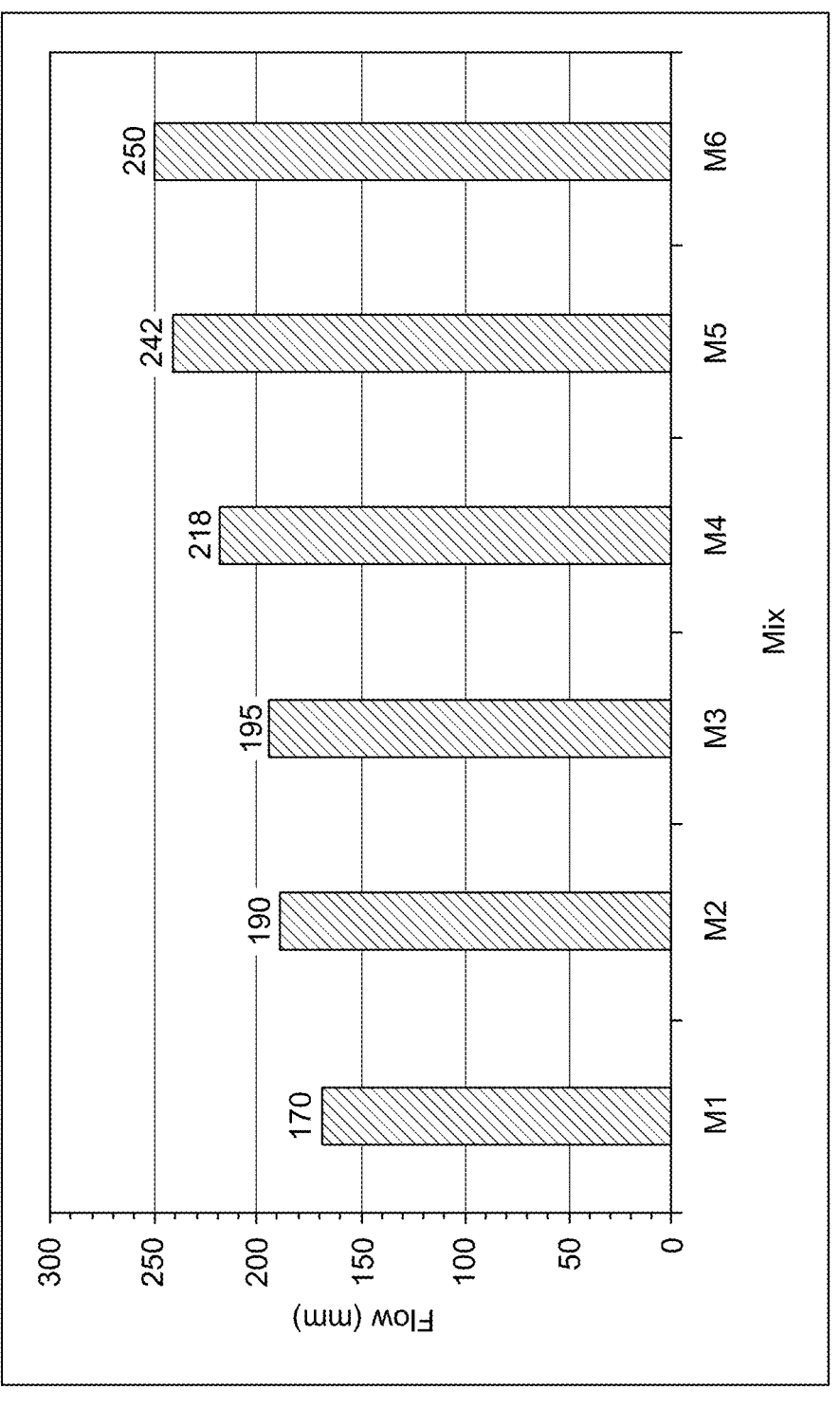
FIG. 5 is a plot showing a variation in flow of various mortar mixtures, according to certain embodiments.

Flow test measures the horizontal spreads that cement mortar experiences. FIG. 5 shows the flow of control mix (M1) and AG-based mortar mixes prepared with five different dosages of AG at a constant water to cement ratio (M2-M6). Each bar indicates the average of three readings with a standard deviation of ±7 mm. The control mix resulted in a flow of 170 mm in diameter. The AG functioned as a water-reducing admixture or superplasticizer, which enhanced the workability of the mortar mixes proportional to the AG content. The workability was successfully improved by 28.4% and 47% using the AG content of 0.75% and 1.5%, respectively. This is attributed to the lubricating nature of the AG in aqueous conditions, which resist the inter-particle frictional forces. Therefore, the AG can be used in the development of self-compacting concrete (SCC) to minimize manpower, eradicate the use of vibrators, and fill the formwork effectively, particularly when there is congested reinforcement in the structural element. The AG can also be considered a useful means to enhance the pumpability of the mixes during the concreting operation and ultimately cut short the energy and cost of construction. In this vein, Athman et al. [C. M. Athman, S. O. Abuodha, T. Nyomboi, Use of gum Arabic as a superplasticizer in self-compacting concrete, Int. J. Innov. Sci. Modern Eng. 5 (2018), incorporated herein by reference in its entirety] have developed self-compacting concrete (SCC) using AG as a superplasticizer. A similar result trend was observed by other researchers [A. M. Mohamed, M. H. Osman, H. Smaoui, M. A. Mohd Ariffin, Durability and microstructure properties of concrete with arabic gum biopolymer admixture, Adv. Civil Eng. 2018, incorporated herein by reference in its entirety] when AG biopolymers were used in the range of 0 to 1.1% dosage. A flow value of 120 mm was reported in the control mix, which was linearly increased up to 0.7% of AG content and, thereafter, increased exponentially with 1.1% of AG content. It was concluded that the increment in flow values with respect to the AG content is ascribed to the inherent rheological and viscous nature of the AG, which also imparted the emulsifying effect. Mbugua et al. [R. Mbugua, R. Salim, J. Ndambuki, Effect of Gum Arabic Karroo as a water reducing admixture in cement mortar, Case Stud. Constr. Mater. 5 (2016), incorporated herein by reference in its entirety] reported a 19% increment in flow values was found with an increase in AG content in the range of 0.4 to 0.7%. Beyond this range, a fluidity of above 70% was evident. It was explained that the grain of cement usually forms clusters within which the water is entrapped in the absence of water-reducing admixtures. AG tends to adsorb onto the periphery of the cement particles, which allows them to disperse homogeneously in the mixture, thereby reducing the inter-particle friction forces, minimizing internal stresses, and enhancing the flow mobility.

Figure 6:
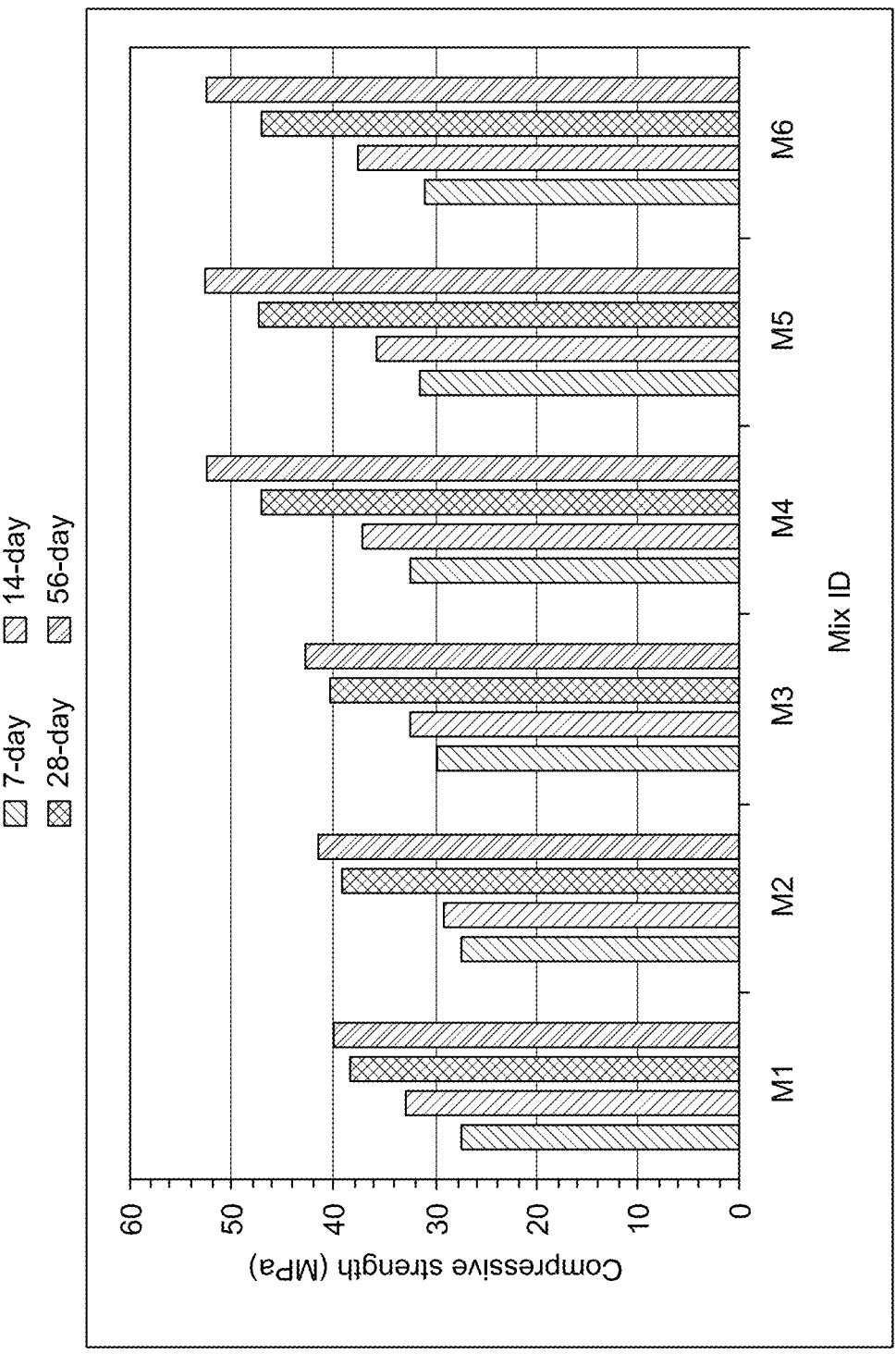
FIG. 6 is a plot showing a variation in compressive strength as a function of time, for various mortar mixtures, according to certain embodiments.

FIG. 6 shows the compressive strength development in control and AG-based mortar specimens. Each bar indicates the average of three readings with a standard deviation of ±5 MPa. As expected, the strength increased with an increase in the curing time period in all mixes. The compressive strength tended to increase with an increase in the AG dosage up to 0.75% (M4). Thereafter, the compressive strength gained was insignificant. Therefore, M4 is considered as an appropriate mix for achieving the highest compressive strength with a minimum amount of AG. Noted, as opposed to the control mix, that the rate of gain in compressive strength at early ages was slow, whilst the gain was most pronounced after 14 days of curing, just like a secondary hydration reaction occurs in pozzolanic material. AG-based mixes require more curing time to complete the hydration reaction and to attain adequate strength due to the retarding effect of the AG. The maximum early-age and later-age compressive strength in M4 at 7 days, 14 days, 28 days, and 56 days of curing were observed as 32.6 MPa, 37.3 MPa, 47.1 MPa, and 52.5 MPa, respectively. These strength values are 18.9%, 12.6%, 22.1%, and 31.2% more than that achieved in the same time in the control mix. This indicates that the compressive strength can be beneficially increased in the range of 12-32% by incorporating an AG dosage of 0.75%. The support for an increase in strength by the addition of the AG can be attributed to the varying particle size, which imparts a pore filling effect and leads to the formation of more and/or dense hydration products, which may have compacted the microstructure of the mortar specimens. This hypothesis was supported by carrying out advanced microstructural tests and is explained in further examples. Moreover, the insignificant gain or reduction in strength in mixes prepared with more than 0.75% of AG is ascribed to the over-dosage of the AG, which resulted in bleeding and segregation in the fresh state of the mortar and negatively influenced the cohesiveness and uniformity of the mortar specimens, as noticed by visual inspection of freshly prepared mixes. This was supported elsewhere by means of measuring the bleeding of AG-based binders by varying AG content from 0 to 1%. It was found that the appropriate AG content of 0.8% resulted in the lowest bleeding (94% lower than the control), while that with AG content of 1% enhanced the bleeding rate. According to the results, the excessive AG content increases the rate of de-flocculation, which turns the mix waterier in nature. These results are in close agreement with that reported elsewhere [R. Mbugua, R. Salim, J. Ndambuki, Effect of Gum Arabic Karroo as a water-reducing admixture in cement mortar, Case Stud. Constr. Mater. 5 (2016), incorporated herein by reference in its entirety]. Authors [S. Venkatraman, V. Ramasamy, Hydration Effect of Gum Arabic and Guar Gum Powder on Strength Parameters of Concrete, Carib. J. Sci. 53 (2019) 1724-1733, incorporated herein by reference in its entirety] investigated the impact of AG by adding 0 to 1% of AG. It was found that 0.75% dosage of the AG was appropriate, which resulted in the compressive strength of about 27 to 37 MPa between the ages of 7 to 28 days. Elinwa et al. [A. U. Elinwa, G. Abdulbasir, G. Abdulkadir, Gum Arabic as an admixture for cement concrete production, Constr. Build. Mater. 176 (2018), incorporated herein by reference in its entirety] also found that the appropriate dosage of the AG for enhancing the compressive strength is in the range of 0.5 to 0.75%, which yields the compressive strength of 29.5% to 39.5% more than the control 150 mm$^3$ cubic specimens. It was hypothesized that the increase in strength in AG-based specimens was due to the formation of minerals like osumulite and tobermorite whose structure is similar to the C—S—H gel formed in the hydration of Portland cement. A study found that the formation of wollastonite mineral tends to enhance both the compressive and flexural strengths [R. Mathur, A. K. Misra, P. Goel, R. Mathur, A. K. Misra, P. Goel, Influence of wollastonite on mechanical properties of concrete, J. Sci. Ind. Res. (India) 66 (2007), incorporated herein by reference in its entirety]. It has been reported that the increase in compressive strength with an increase in the AG content of up to 0.7% is ascribed to the increase in the density of the specimens.

Figure 7:
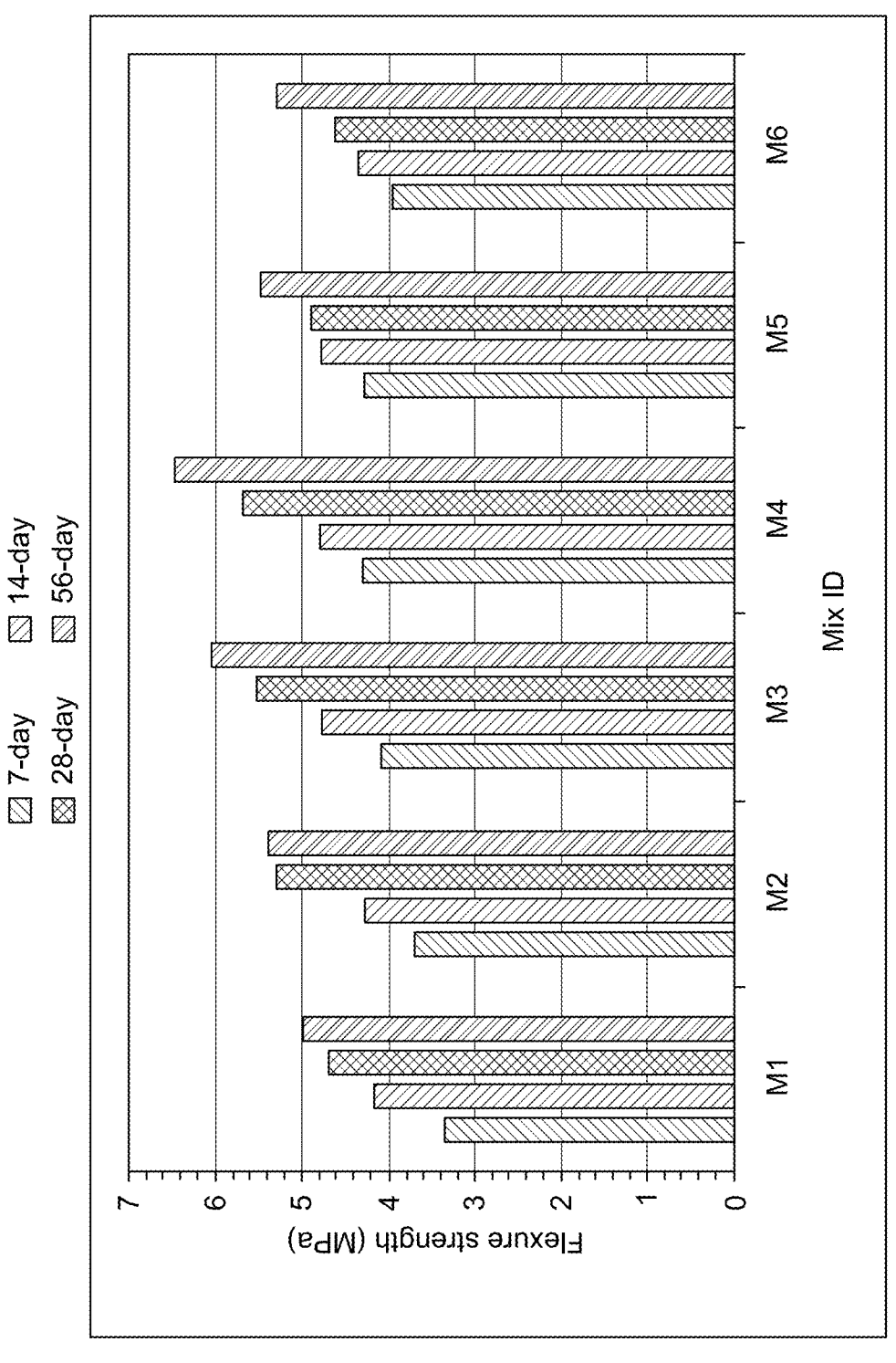
FIG. 7 is a plot showing a variation in flexural strength as a function of time, for various mortar mixtures, according to certain embodiments.

FIG. 7 shows the flexural strength development in control and AG-based mortar specimens. Each bar indicates the average of three readings with a standard deviation of ±0.5 MPa. The flexural strength increased with an increase in the curing period in the mixes. The flexural strength tended to increase with an increase in the AG dosage up to 0.75% (M4), as was in the trend observed in the compressive strength data; however, the strength retrogression was more pronounced for flexural strength in specimens prepared with more than 0.75% dosage of the AG than it was in compressive strength trends for the mortar mixes. Therefore, M4 is considered an appropriate mix for achieving the highest flexural strength with a minimum amount of AG. The maximum early-age and later-age flexural strength in M4 at 7 days, 14 days, 28 days, and 56 days of curing were observed as 4.3 MPa, 4.8 MPa, 5.7 MPa, and 6.5 MPa, respectively. These strength values are 28.3%, 14.2%, 21.2%, and 30% more than achieved in the same time as the control mix. This indicates that the flexural strength can be beneficially increased in the range of 14-31% by incorporating the AG dosage of 0.75%. The reasoning for the increase in strength by the addition of the AG is attributed to the improved interfacial transition zone (ITZ) between the cement grains and the sand. However, the overdosage may have caused non-reacted particles to remain and a weaker ITZ due to a retardation effect, which led to the strength retrogression. The strength retrogression was more pronounced in flexural data as compared to the compression test results pattern because the bonds between the solid ingredients of the mortar are impaired due to the non-homogeneous mixture and non-uniform formation of hydration products. Further, the particles of the AG are irregulartextured and coarser in nature, which provides a bridging effect up to a certain dosage and thereafter acts as a filler. Authors [M. K. Rustum, K. M. Oweed, Investigation the effect of arabic gum on the physical and mechanical properties of ordinary cement mortar, J. Eng. Sustain. Develop. 24 (Special) (2020) 417-424, incorporated herein by reference in its entirety] reported that the optimum flexural strength is achieved when AG dosage of 0.5 to 0.7% was used. An AG dosage of 0.5 to 0.7% yielded 11% more flexural strength than control specimens due to viscosity modifying effects aided by the AG. The AG provides stability and cohesiveness of the microstructure of the developed mortar. The decrease in mechanical strength, including the flexural strength, was reported to be due to a water retention effect when excessive AG content is incorporated in the mix, which prolongs the hydration reaction of $C_3S$ and $C_3A$.

Figure 8:
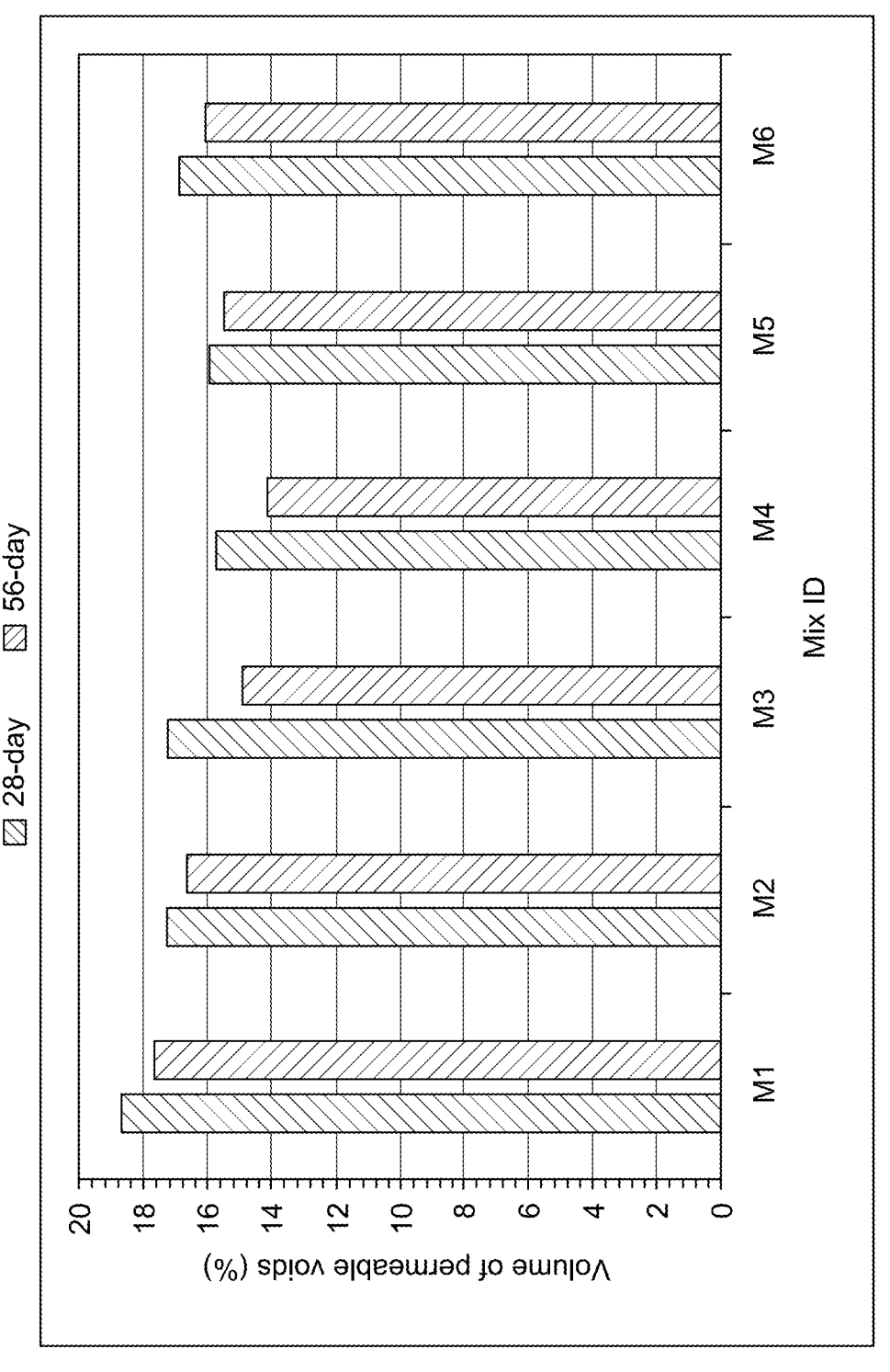
FIG. 8 is a plot showing a variation in volume of permeable voids (VPV) as a function of time, for various mortar mixtures, according to certain embodiments.

FIG. 8 shows the volume of permeable voids (VPV) in control and AG-based mortar specimens. Each bar indicates the average of three readings with a standard deviation of ±0.8%. As expected, a reverse trend of VPV was observed as compared to the mechanical strength data. The VPV values tended to decrease with an increase in the curing period regardless of the AG content; however, the VPV values decreased with an increase in the AG dosage up to 0.75% (M4). A negative trend, or an increase in the VPV values, was evident in specimens prepared with more than 0.75% dosage of the AG. Therefore, VPV results support that M4 is an appropriate mix for achieving the highest mechanical strength and lowest voids with a minimum amount of AG. The minimum 28 day and 56 day VPV values in M4 were recorded as 15.7% and 14.2%, respectively. These VPV values are 16% and 19.6% less than that achieved in the control mix cured for the same time. This indicates that the microstructure of the mortar matrix can be beneficially improved by incorporating the AG dosage of 0.75%, which enhances the durability of the mortar by resisting the penetration of aggressive species into the cement matrix.

Figure 9A:
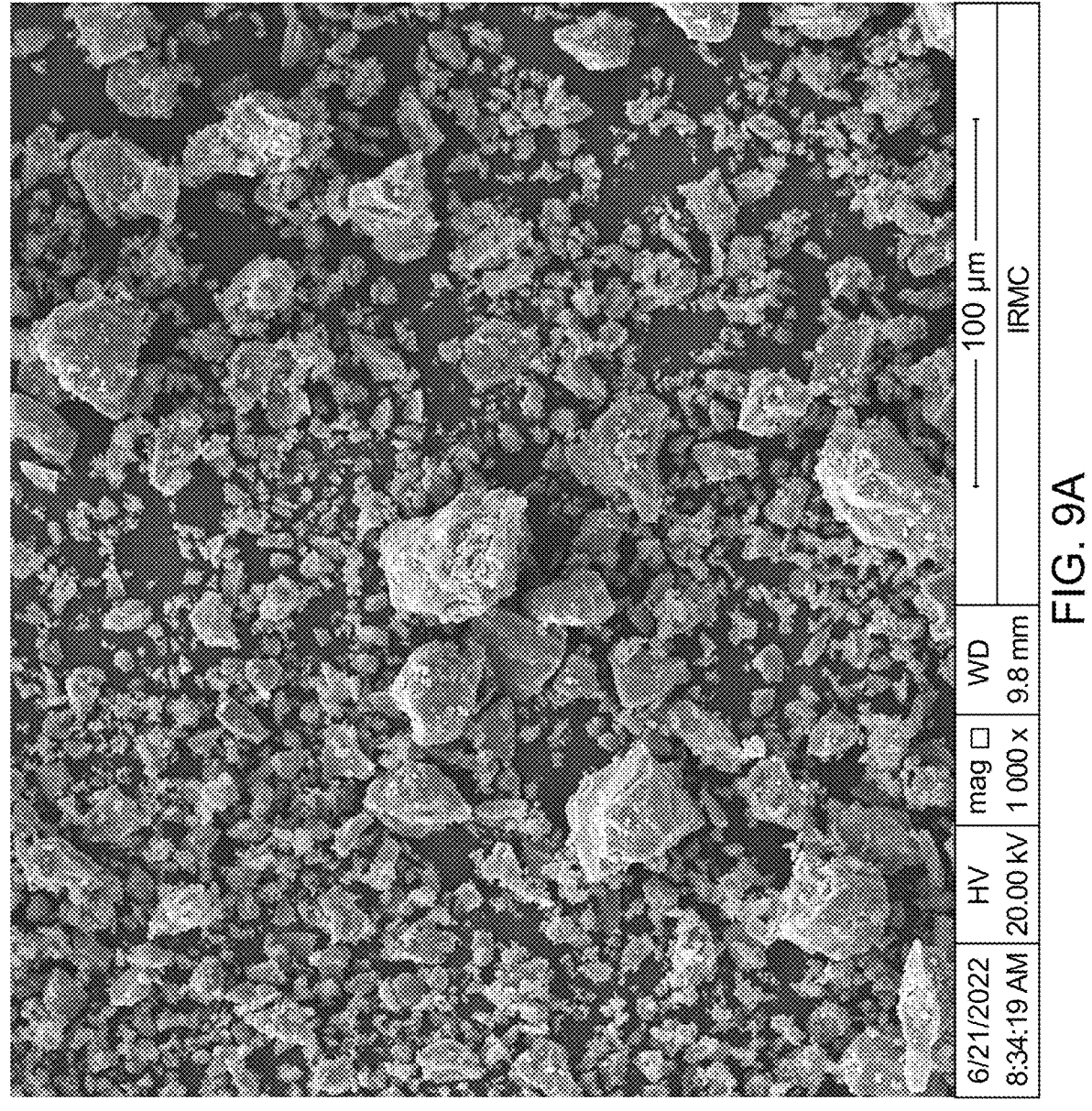
FIG. 9A and FIG. 9B shows the SEM micrographs of raw OPC, at different magnifications, according to certain embodiments.
Figure 9B:
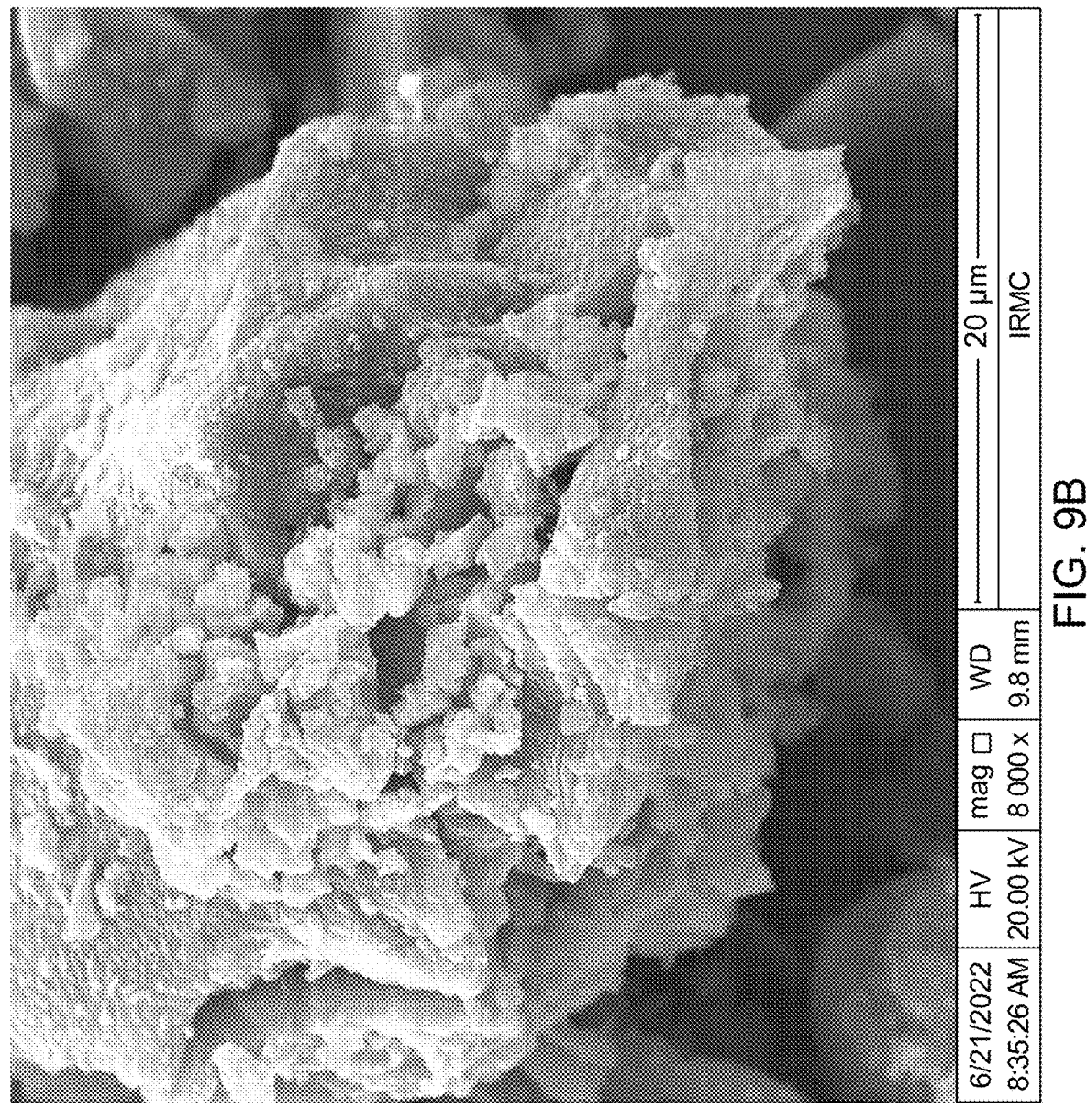
Figure 9C:
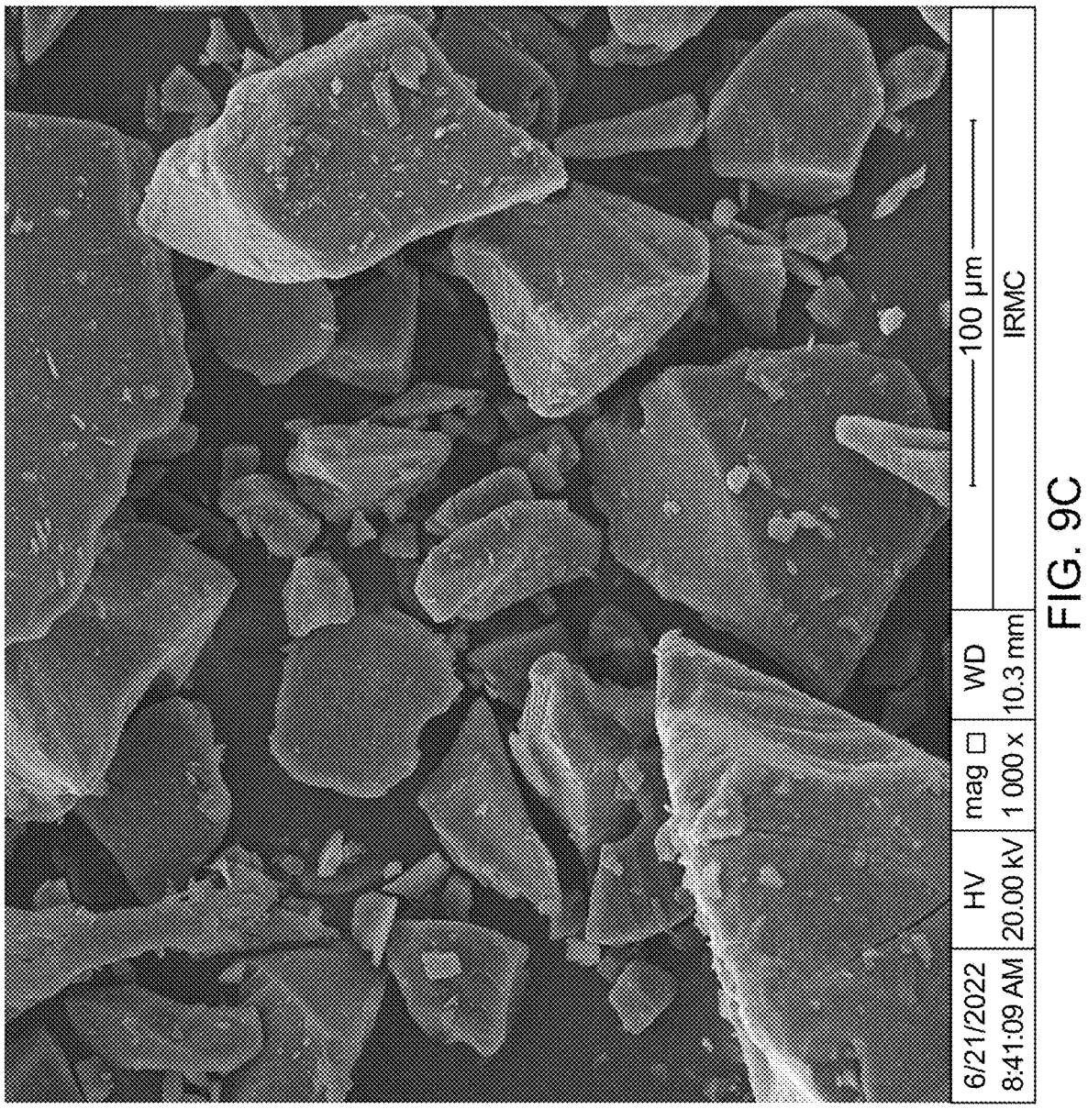
FIG. 9C and FIG. 9D show SEM micrographs of raw AG, at different magnifications, according to certain embodiments.
Figure 9D:
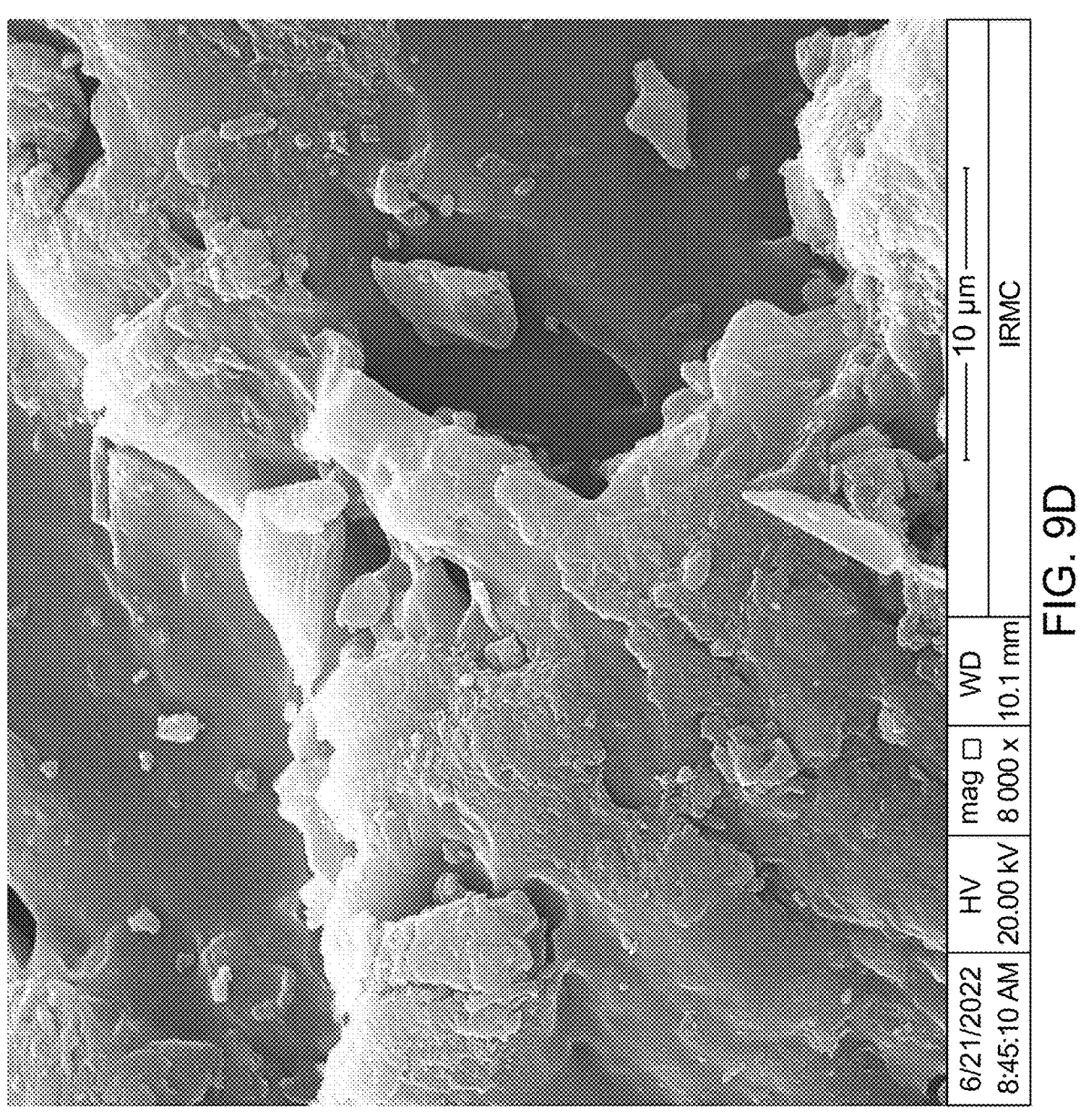
Figure 10A:
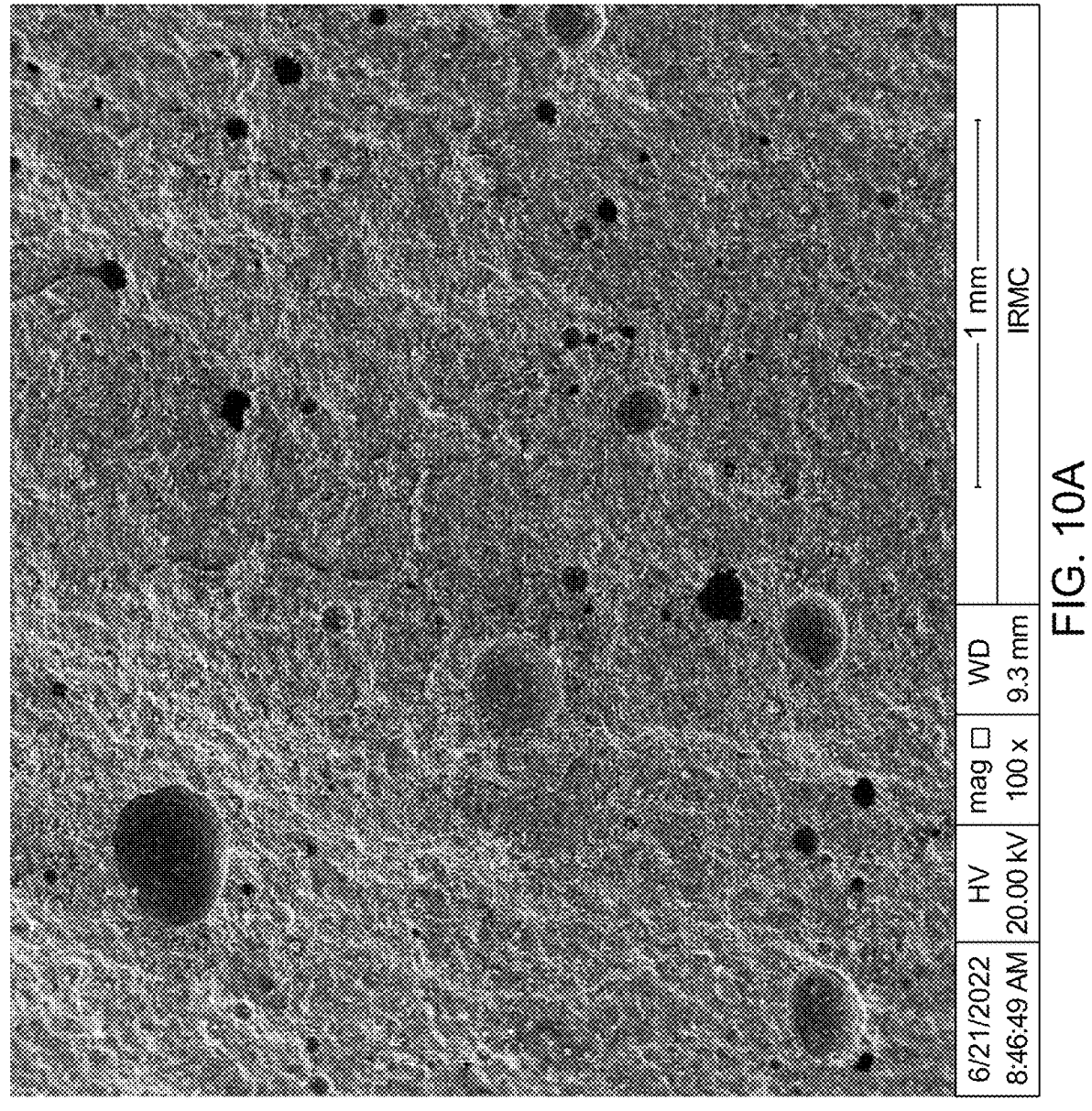
FIG. 10A-FIG. 10F show the SEM images of the mortar mixture M1 captured at a scale of 1 mm, 300, 100, 50, 30, and 5 μm, respectively, according to certain embodiments.
Figure 10B:
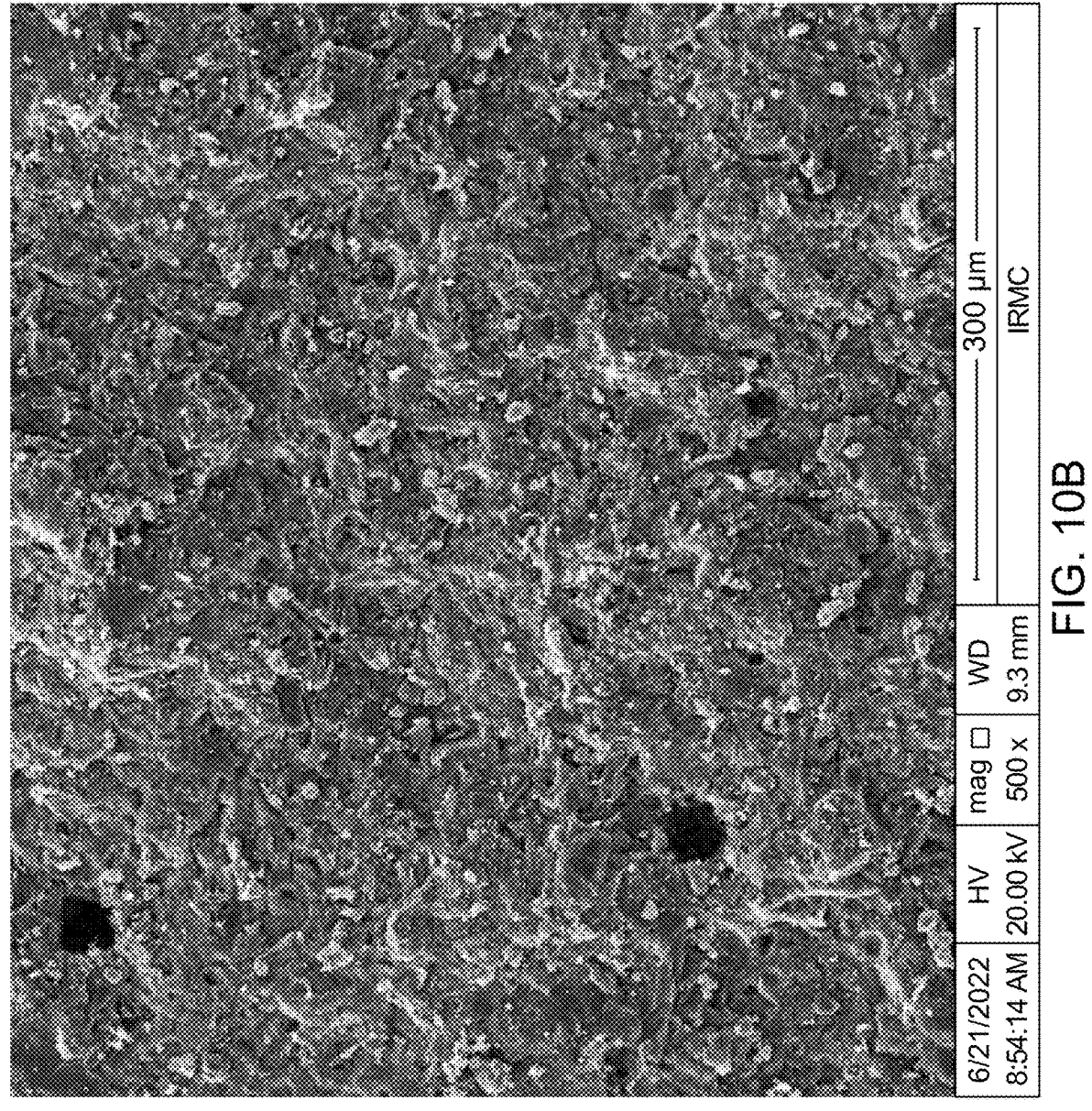
Figure 10C:
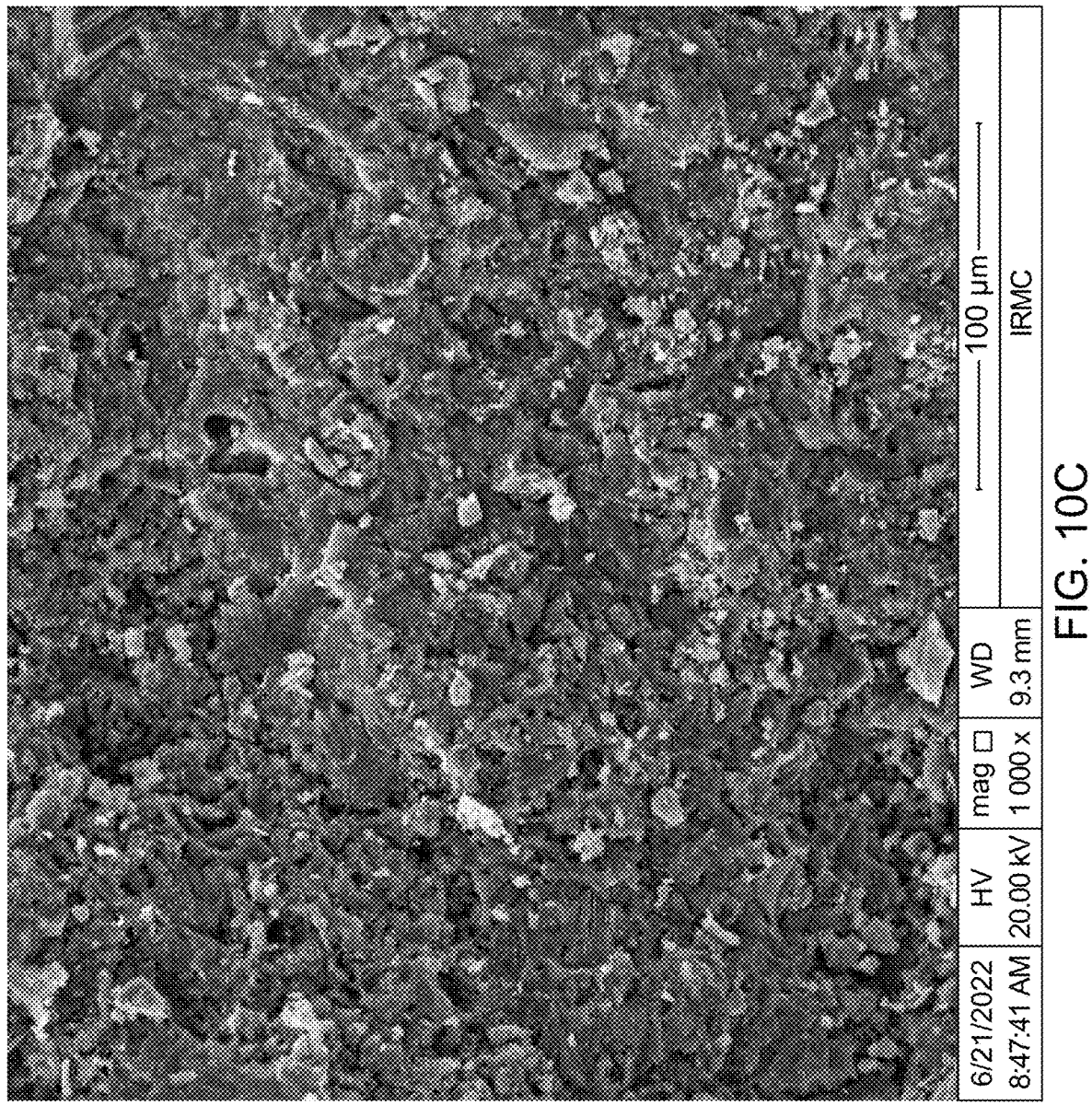
Figure 10D:
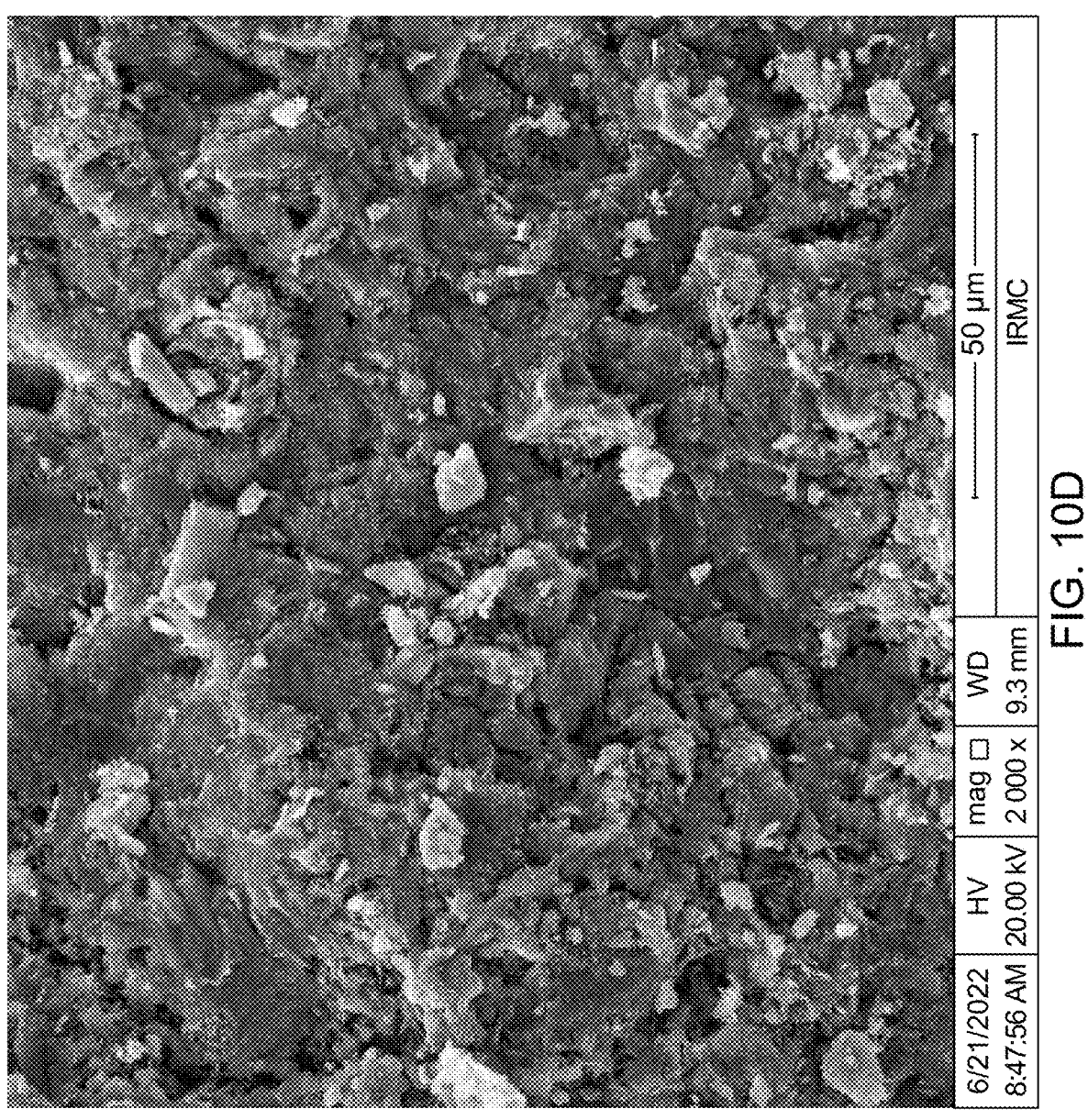
Figure 10E:
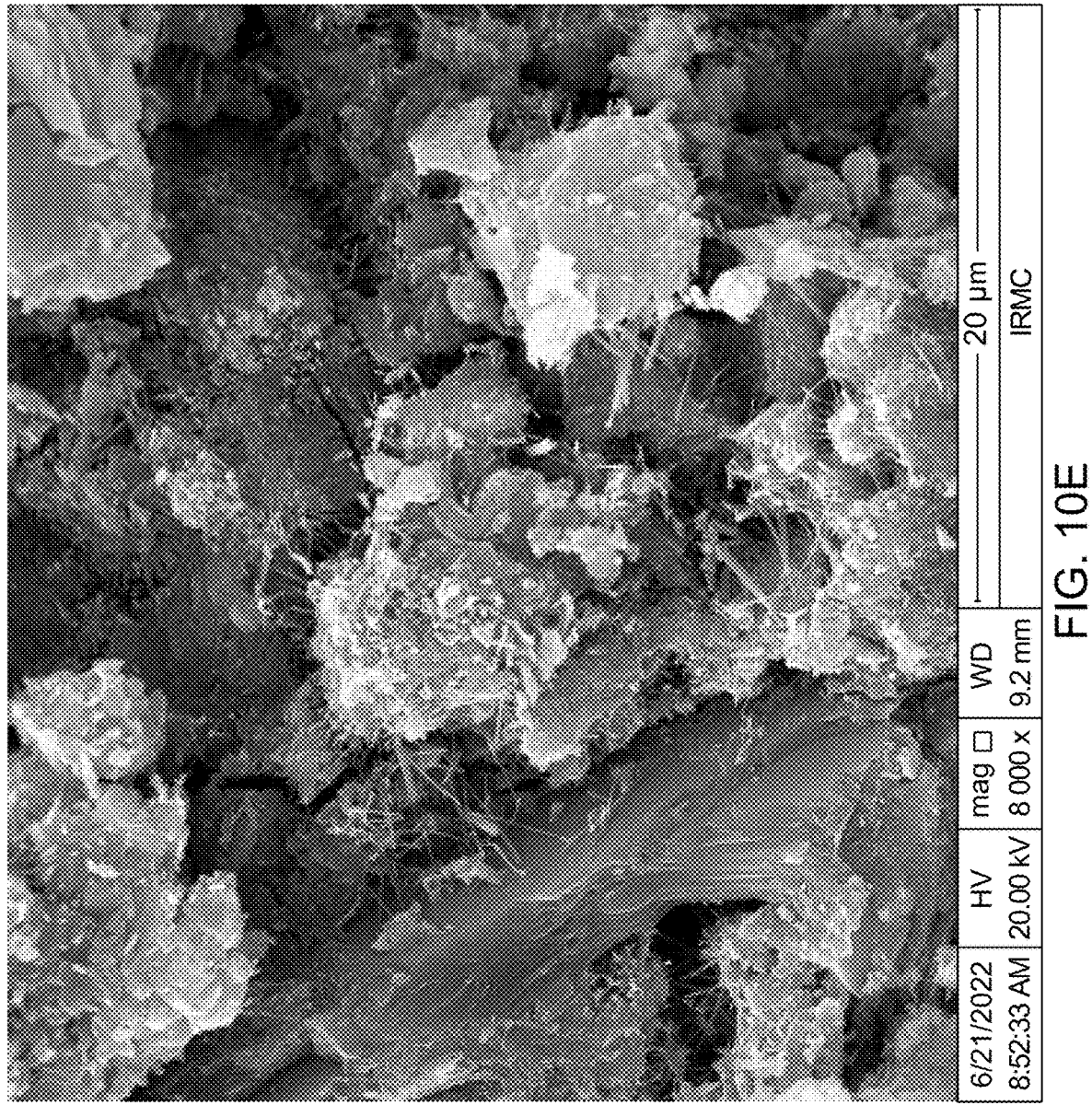
Figure 10F:
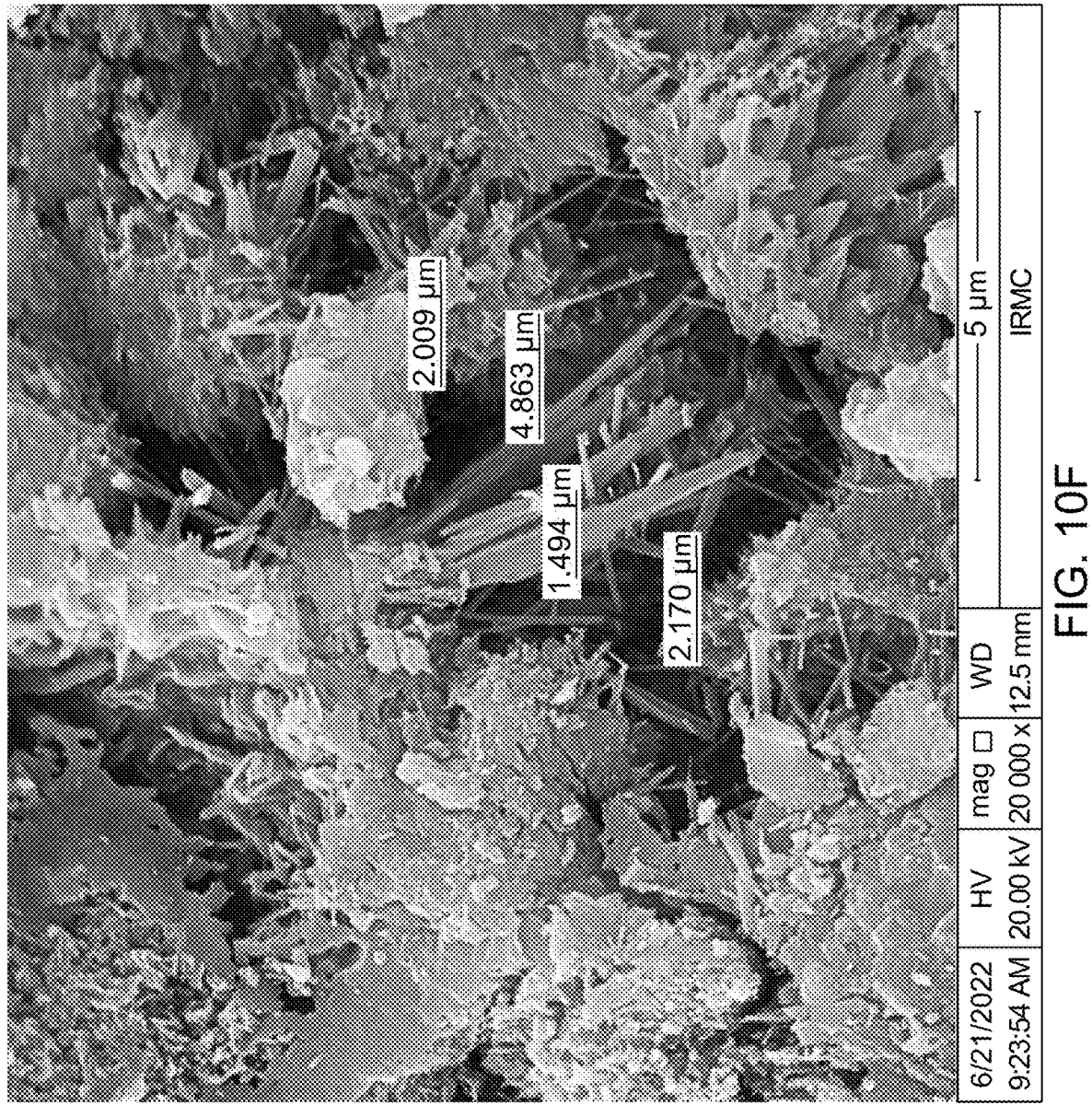
Figure 10G:
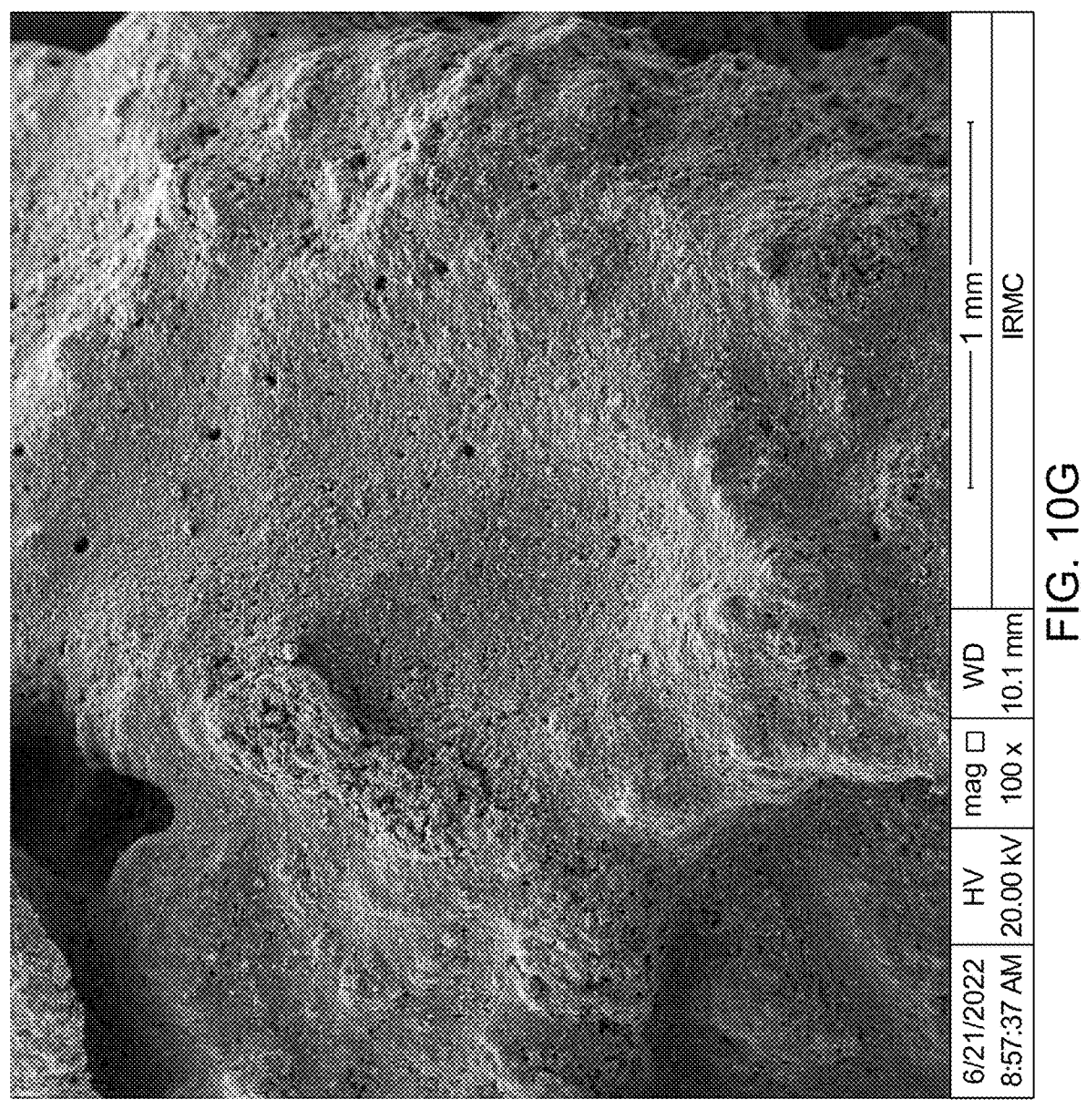
FIG. 10G-FIG. 10L show the SEM images of the mortar mixture M4 captured at a scale of 1 mm, 300, 100, 50, 30, and 5 μm, respectively, according to certain embodiments.
Figure 10H:
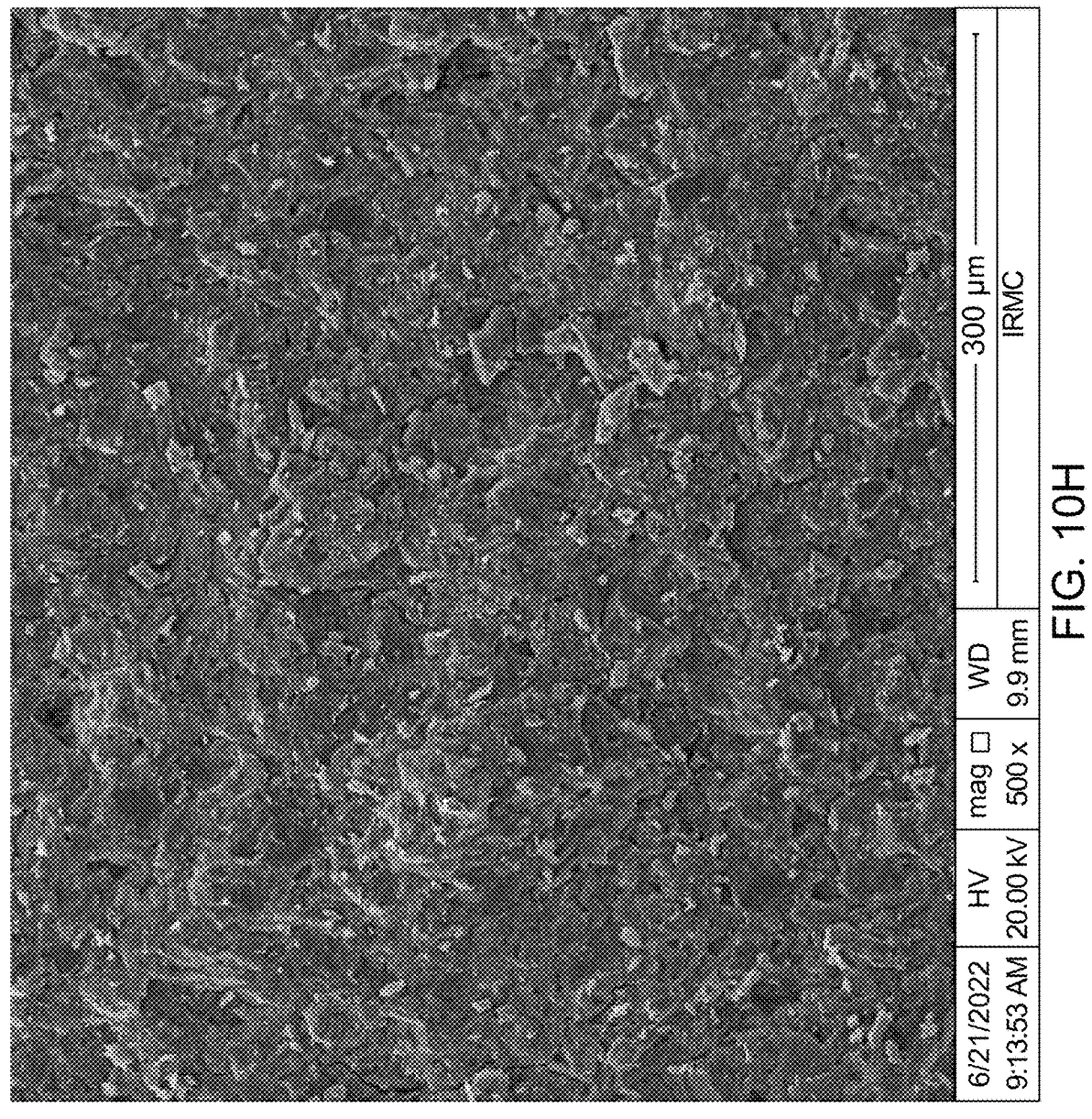
Figure 10I:
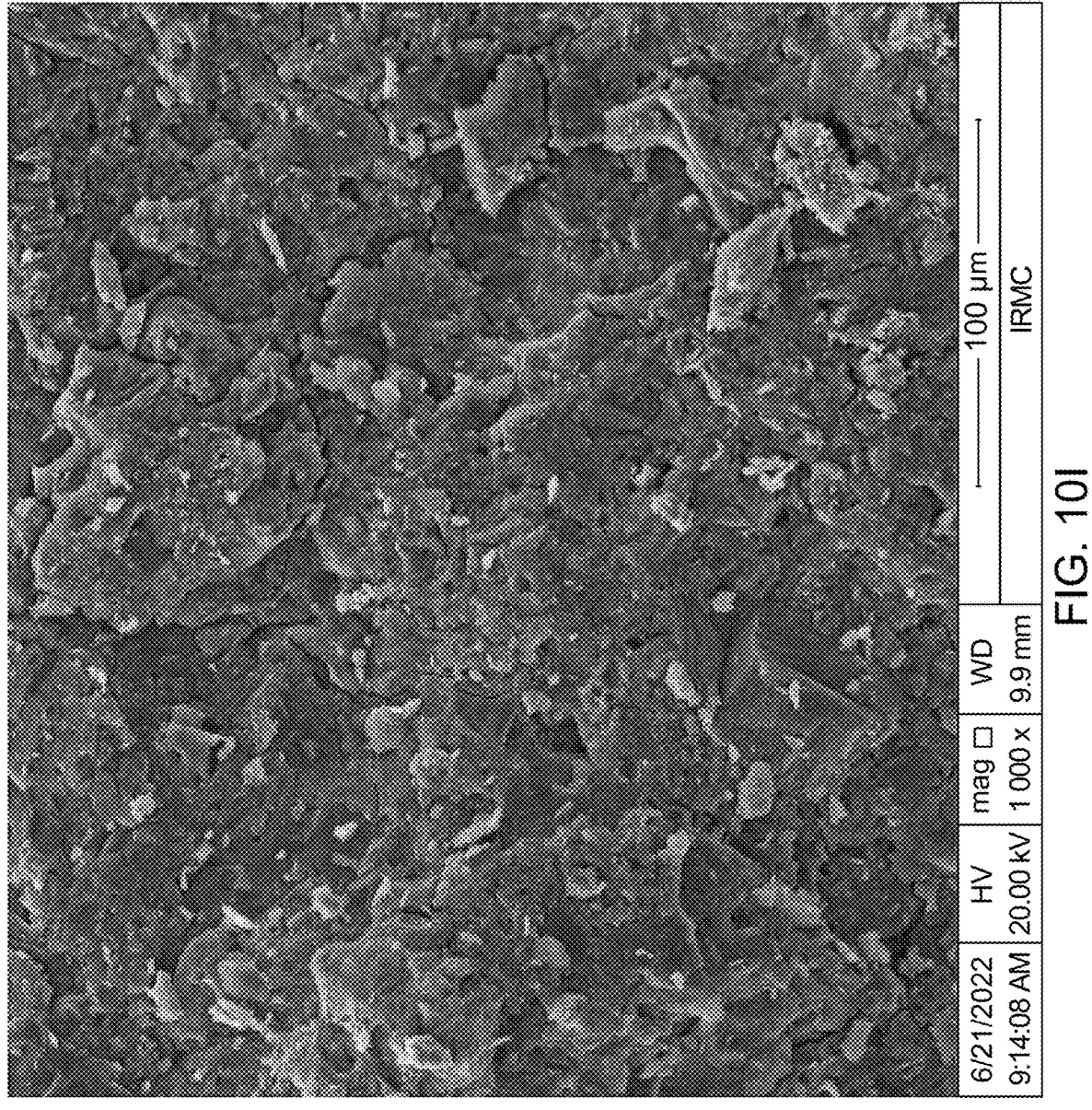
Figure 10J:
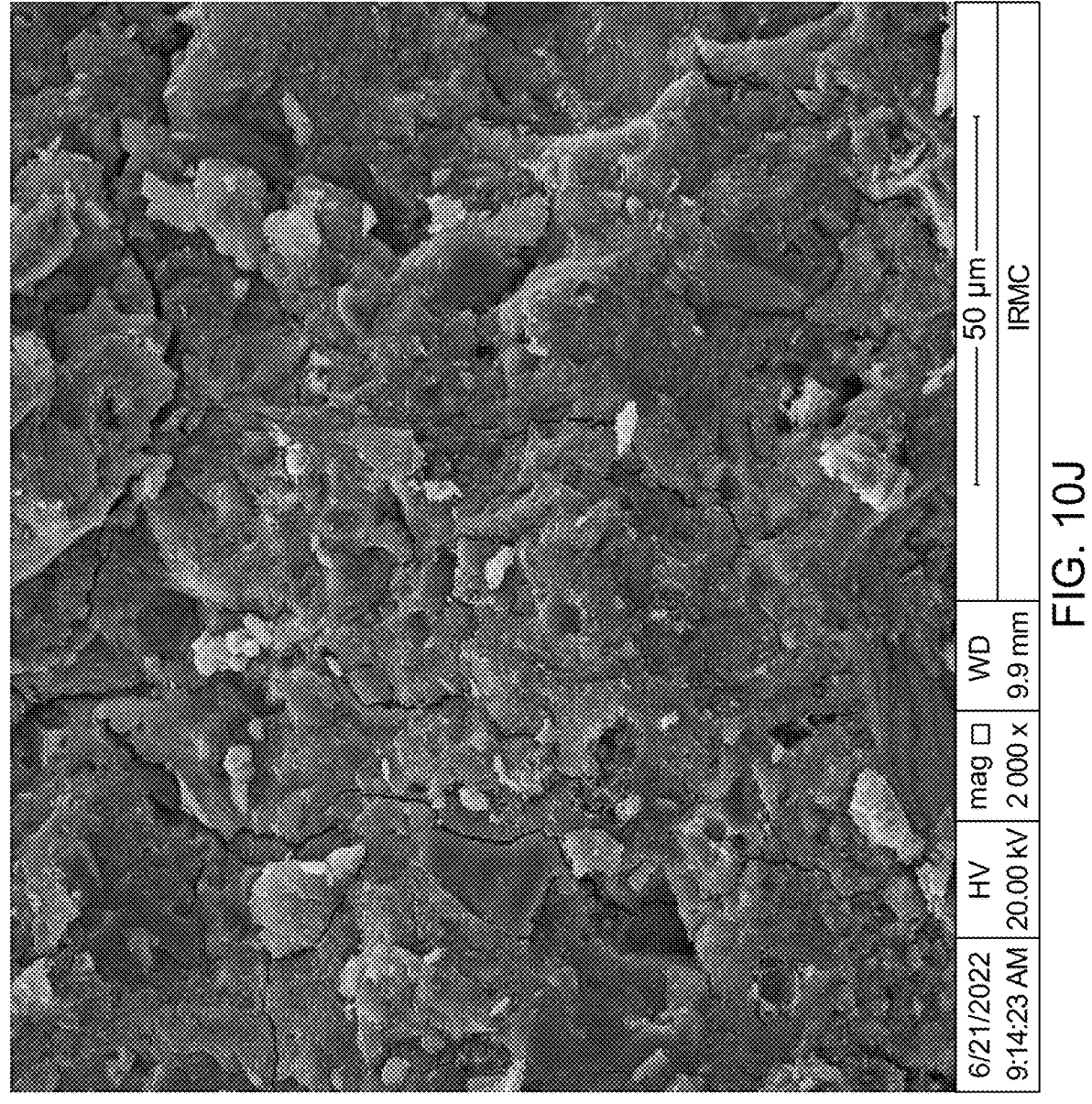
Figure 10K:
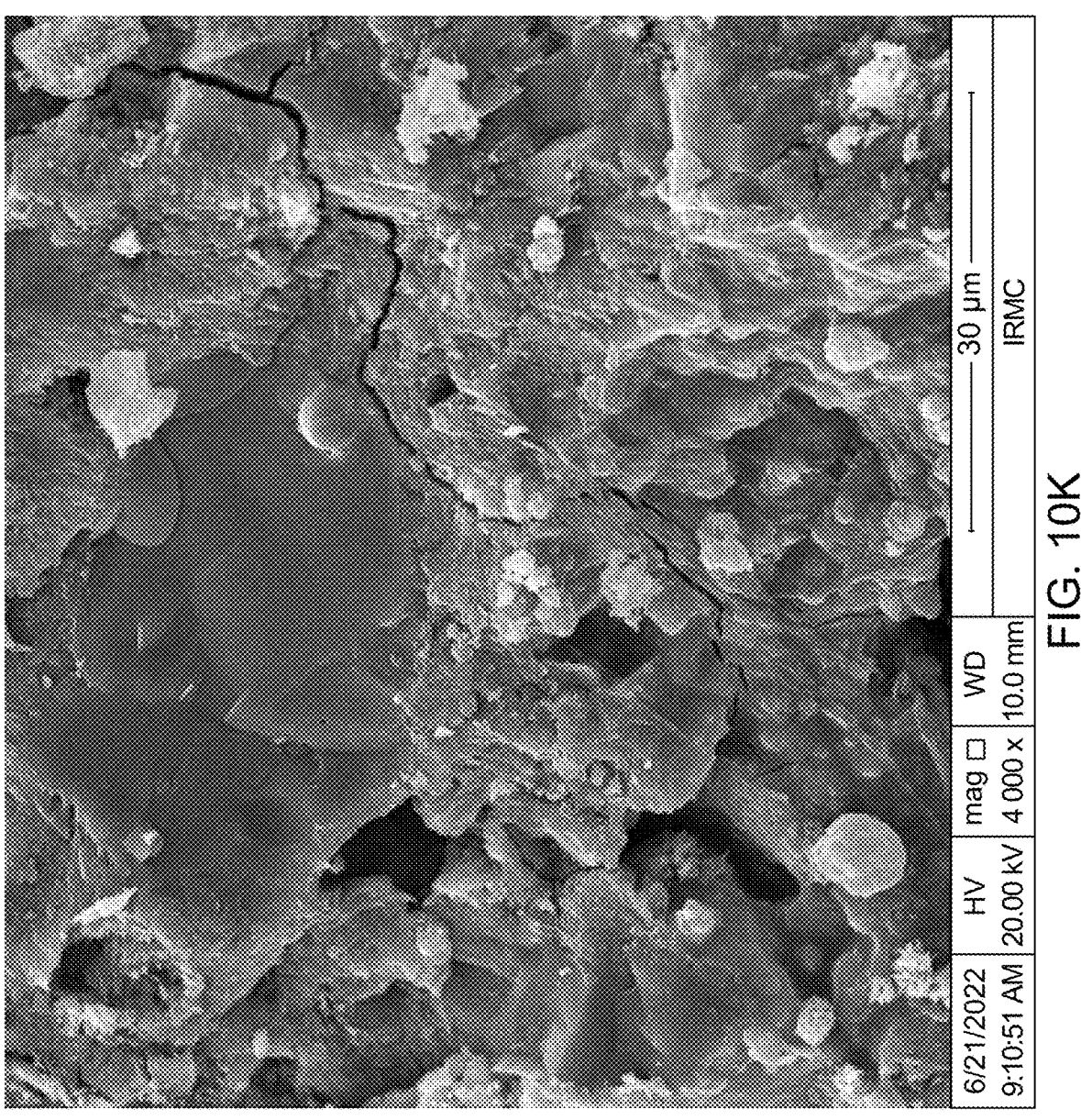
Figure 10L:
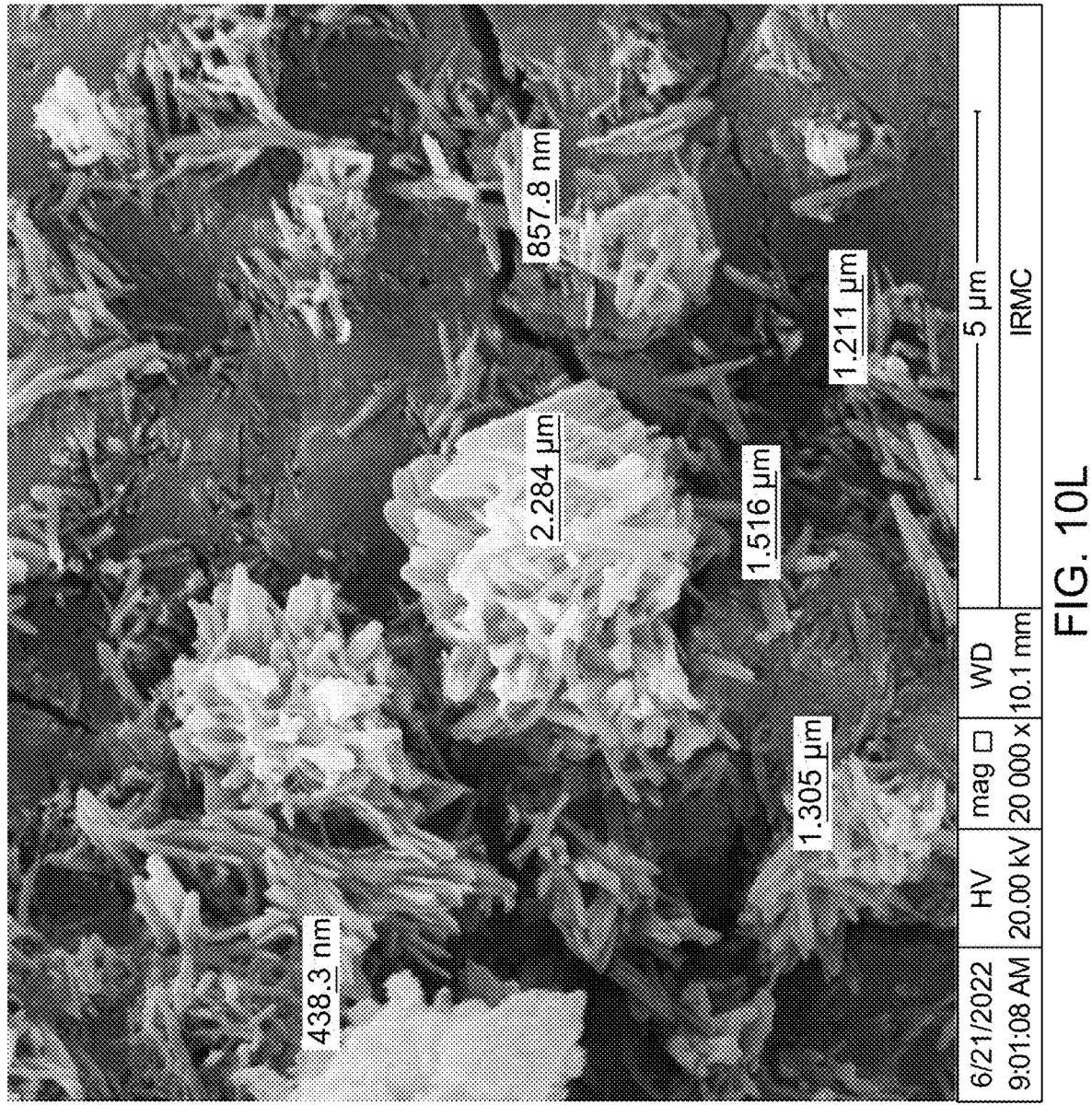
Figure 10M:
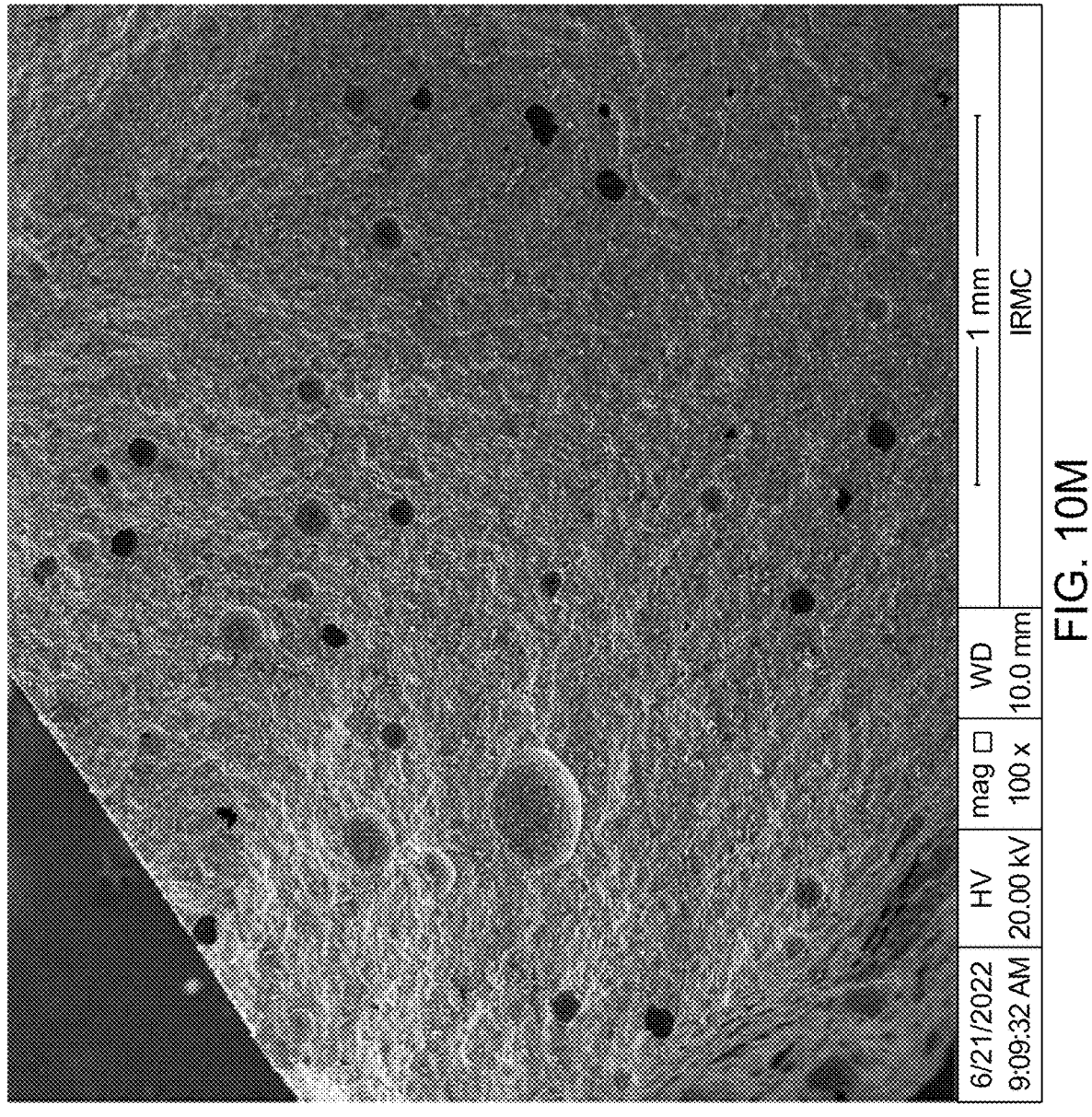
FIG. 10M-FIG. 10R show the SEM images of the mortar mixture M6 captured at a scale of 1 mm, 300, 100, 50, 30, and 5 μm, according to certain embodiments.
Figure 10N:
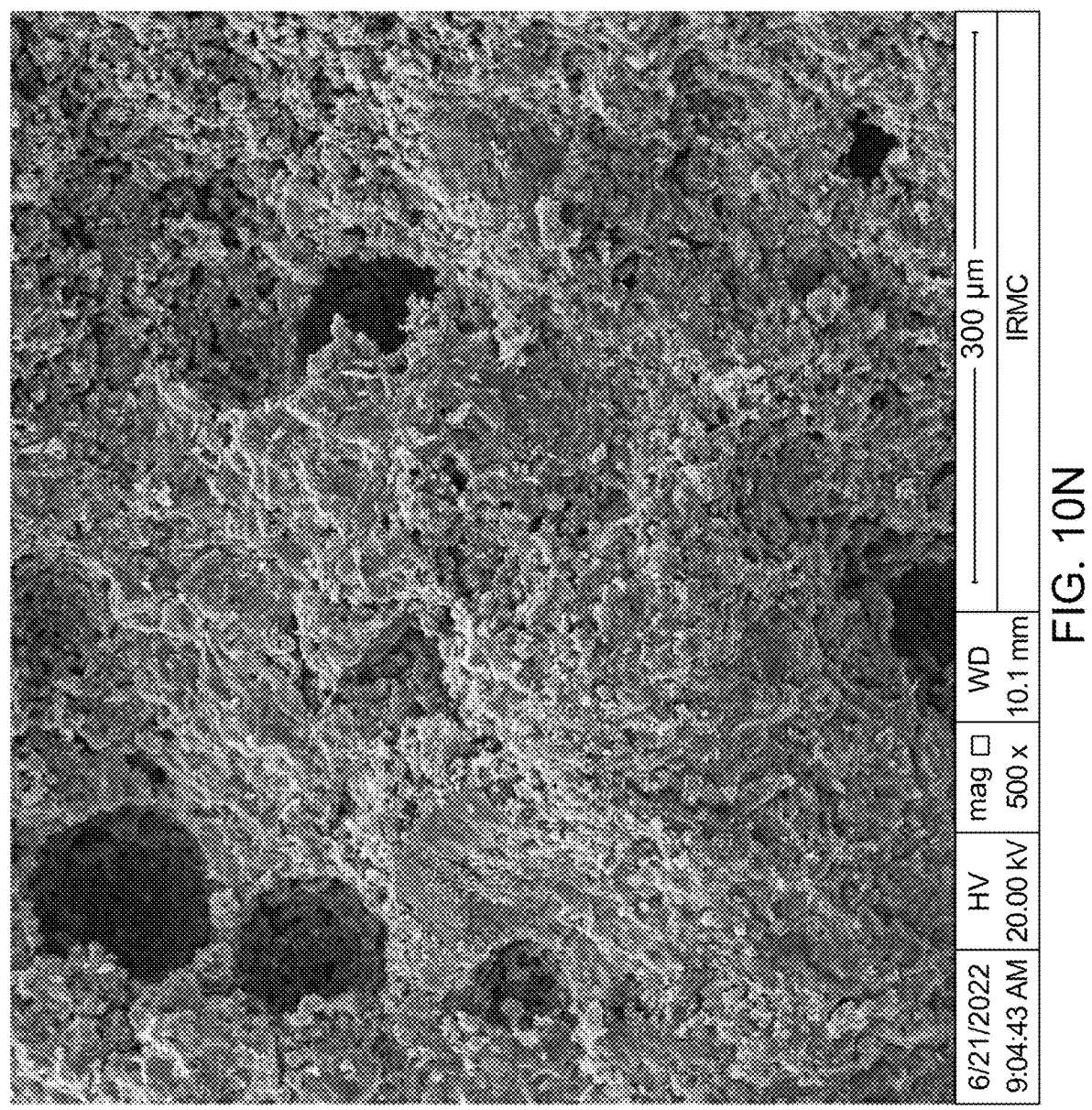
Figure 10O:
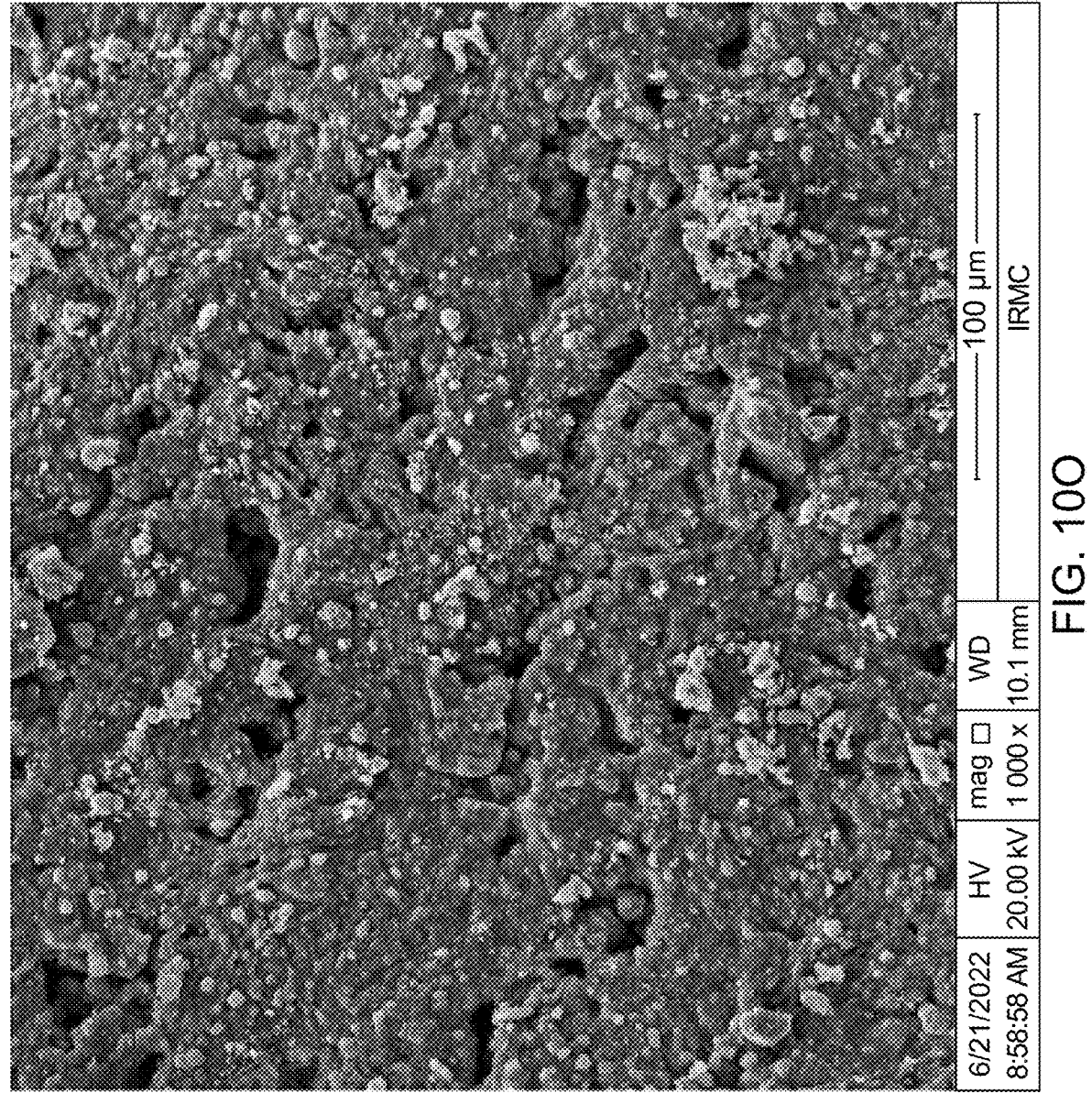
Figure 10P:
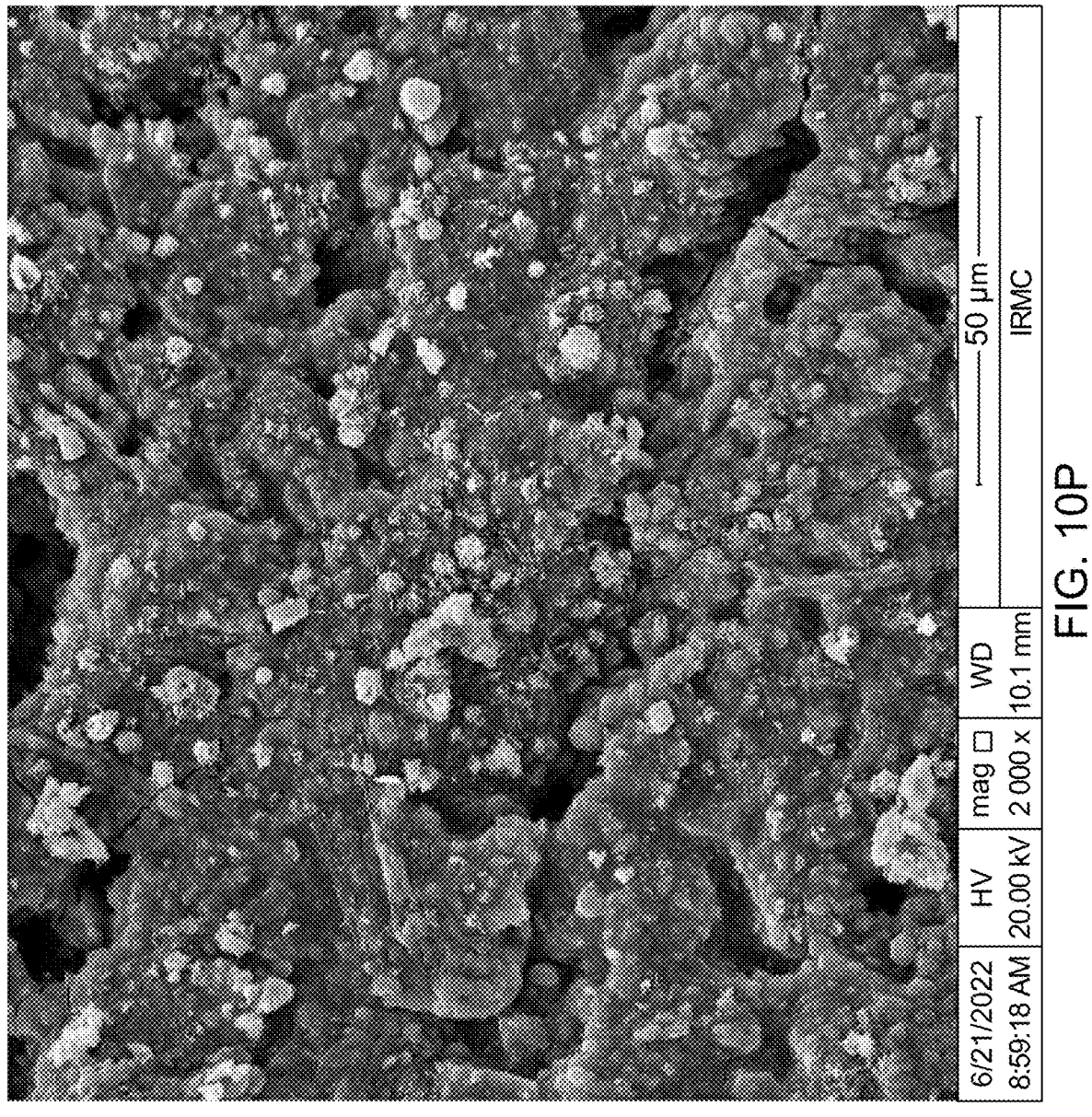
Figure 10Q:
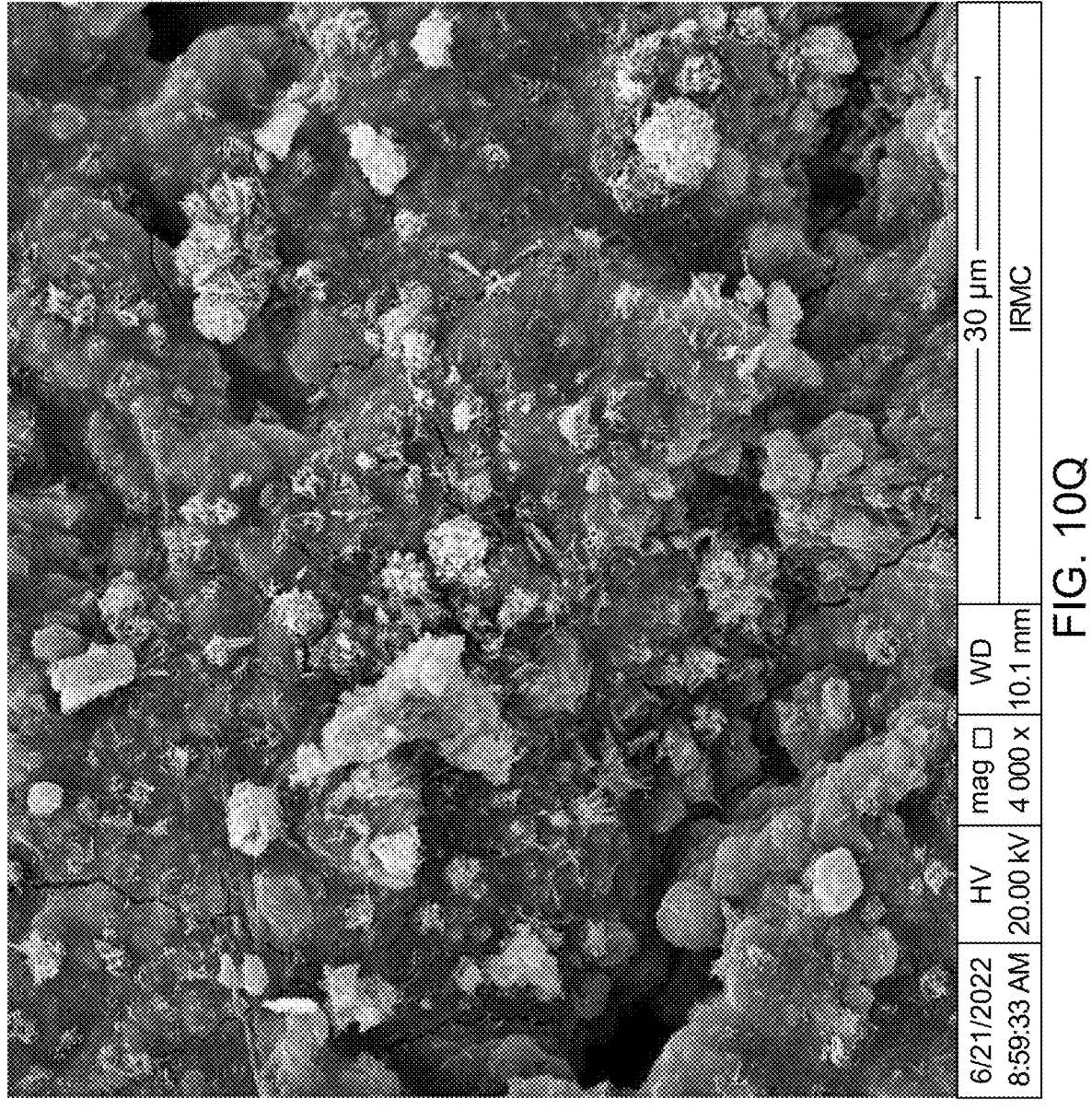
Figure 10R:
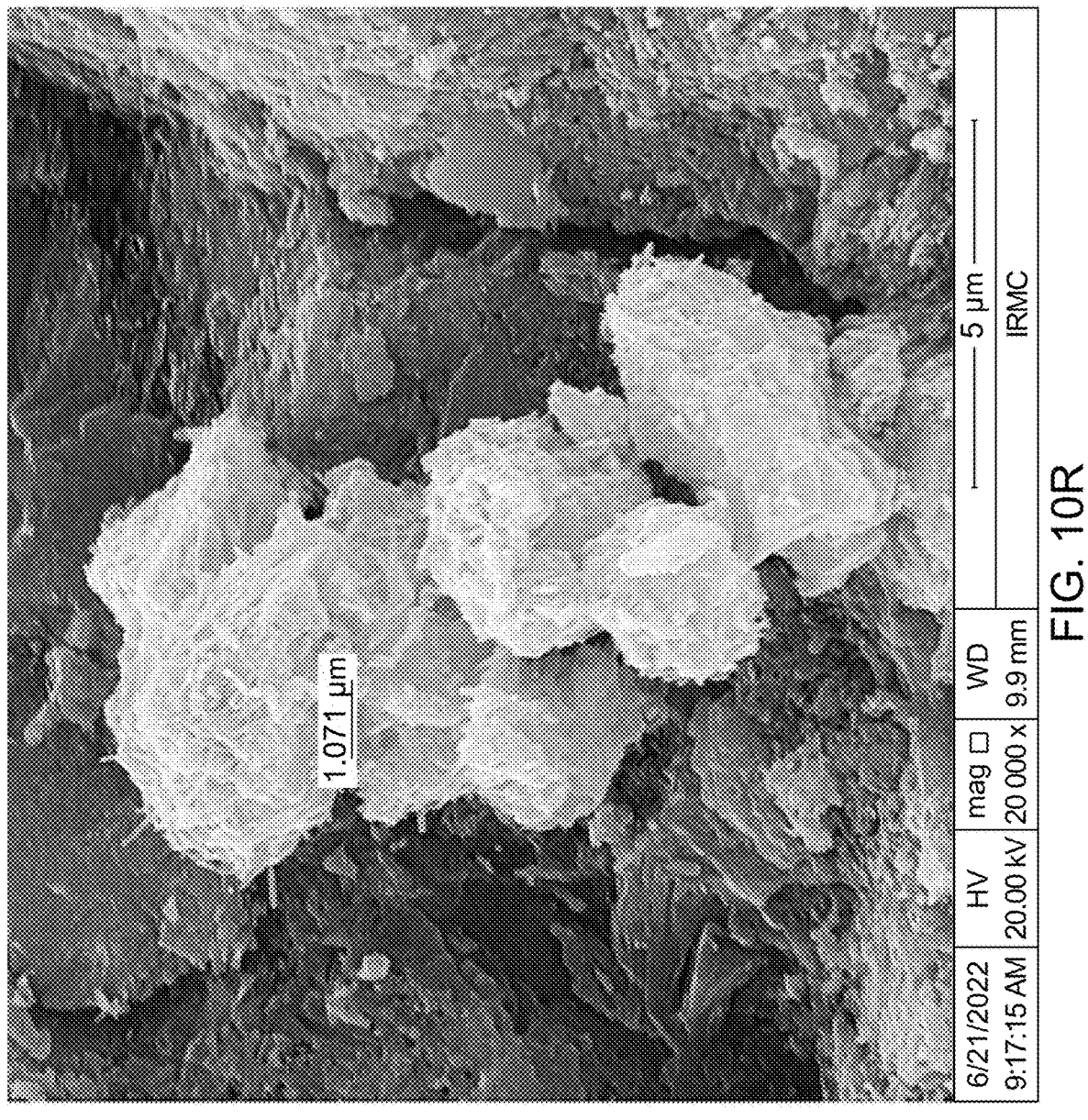
Figure 11A:
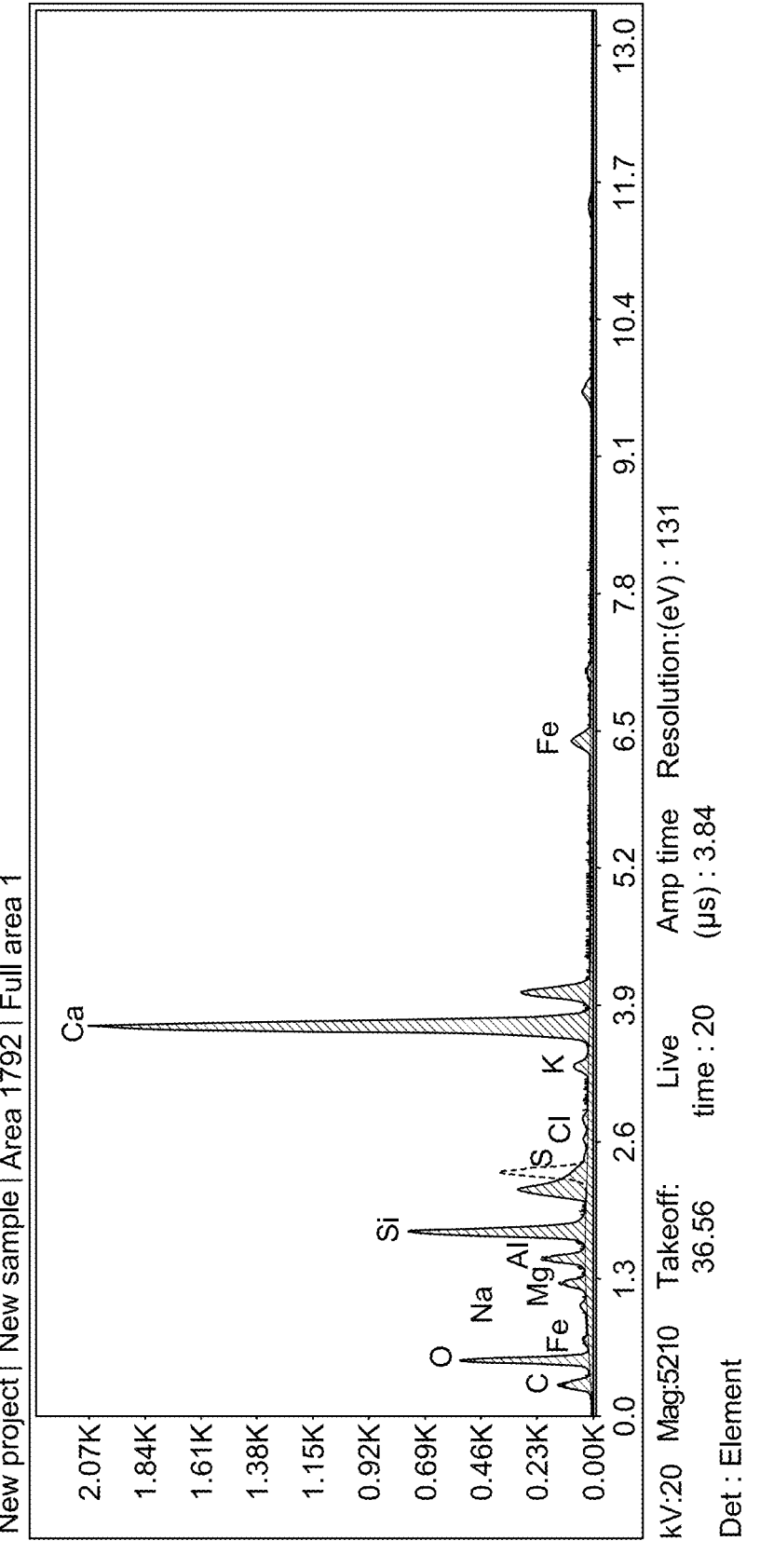
FIG. 11A shows EDS profile of the raw OPC, according to certain embodiments.
Figure 11B:
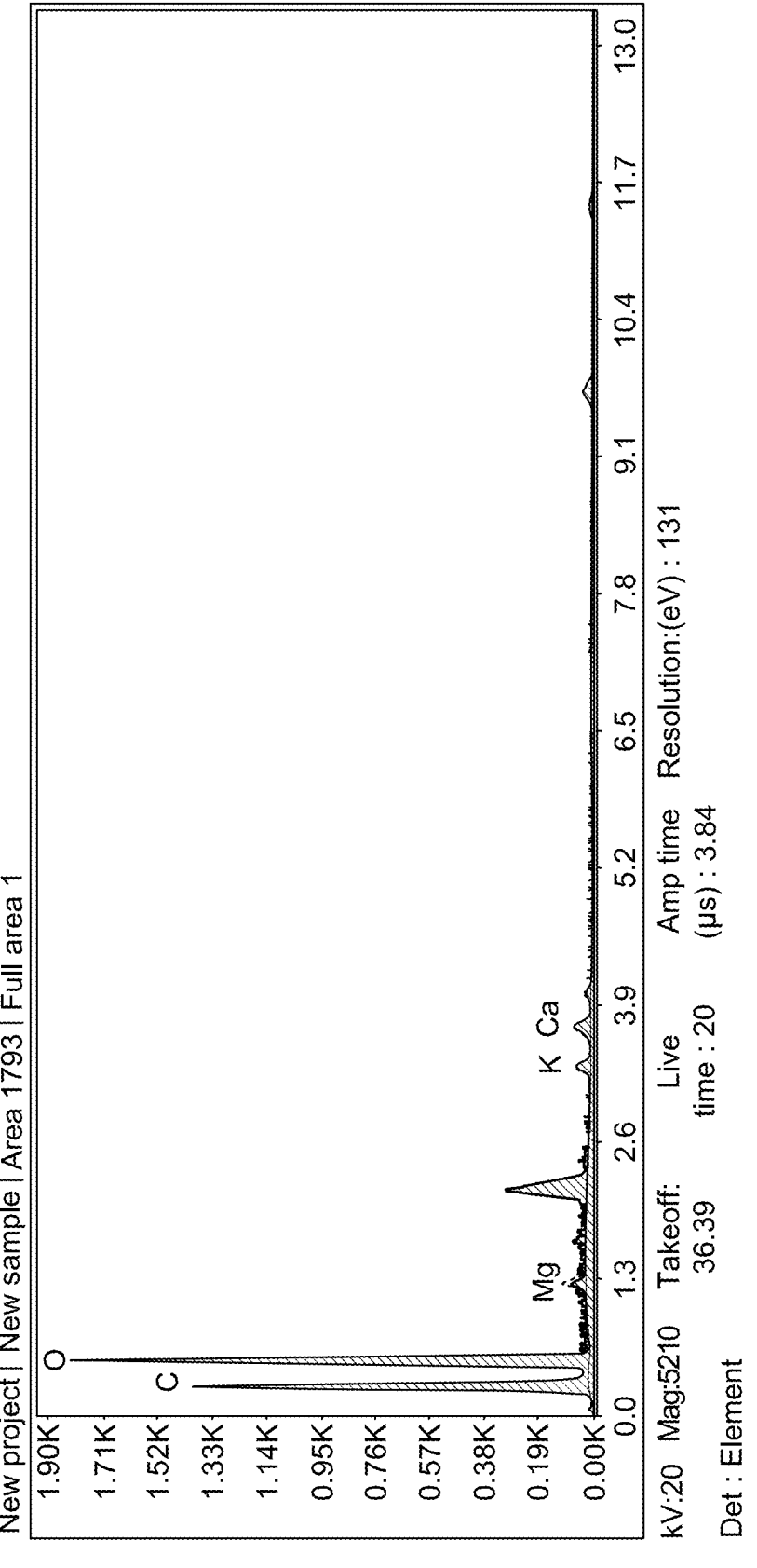
FIG. 11B shows EDS profile of the raw AG, according to certain embodiments.
Figure 11C:
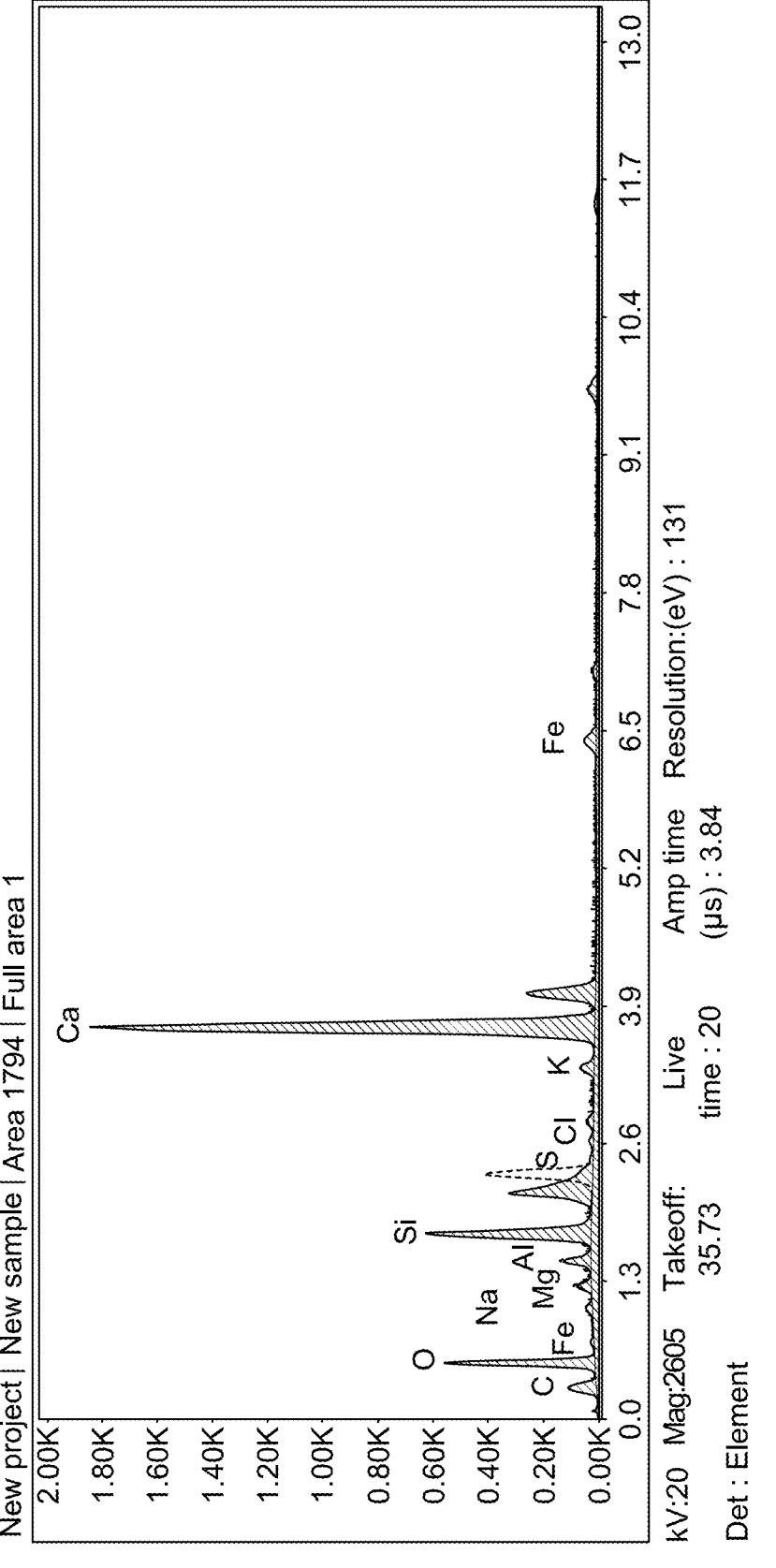
FIG. 11C shows EDS profile of the mortar mixture M1, according to certain embodiments.
Figure 11D:
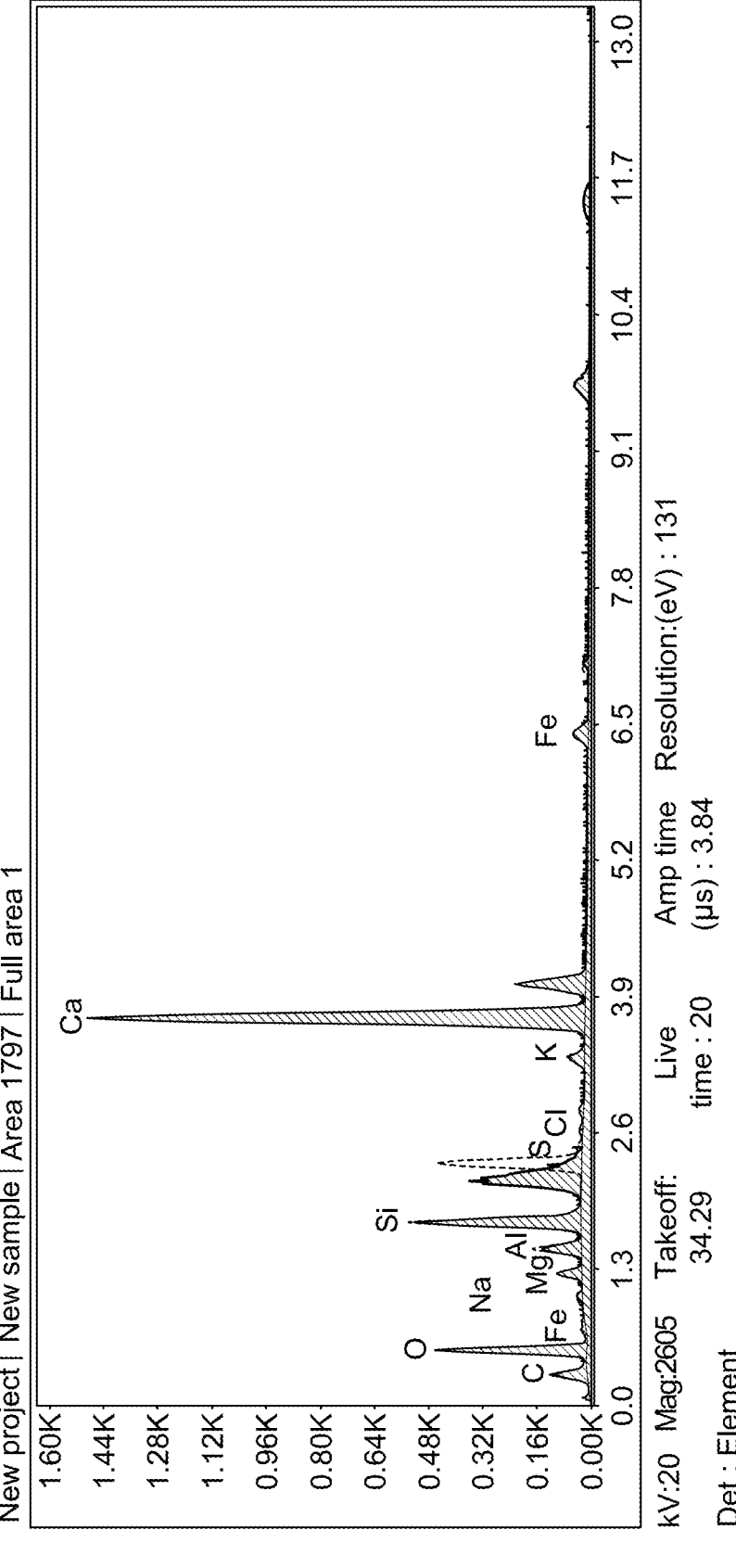
FIG. 11D shows EDS profile of the mortar mixture M4, according to certain embodiments.
Figure 11E:
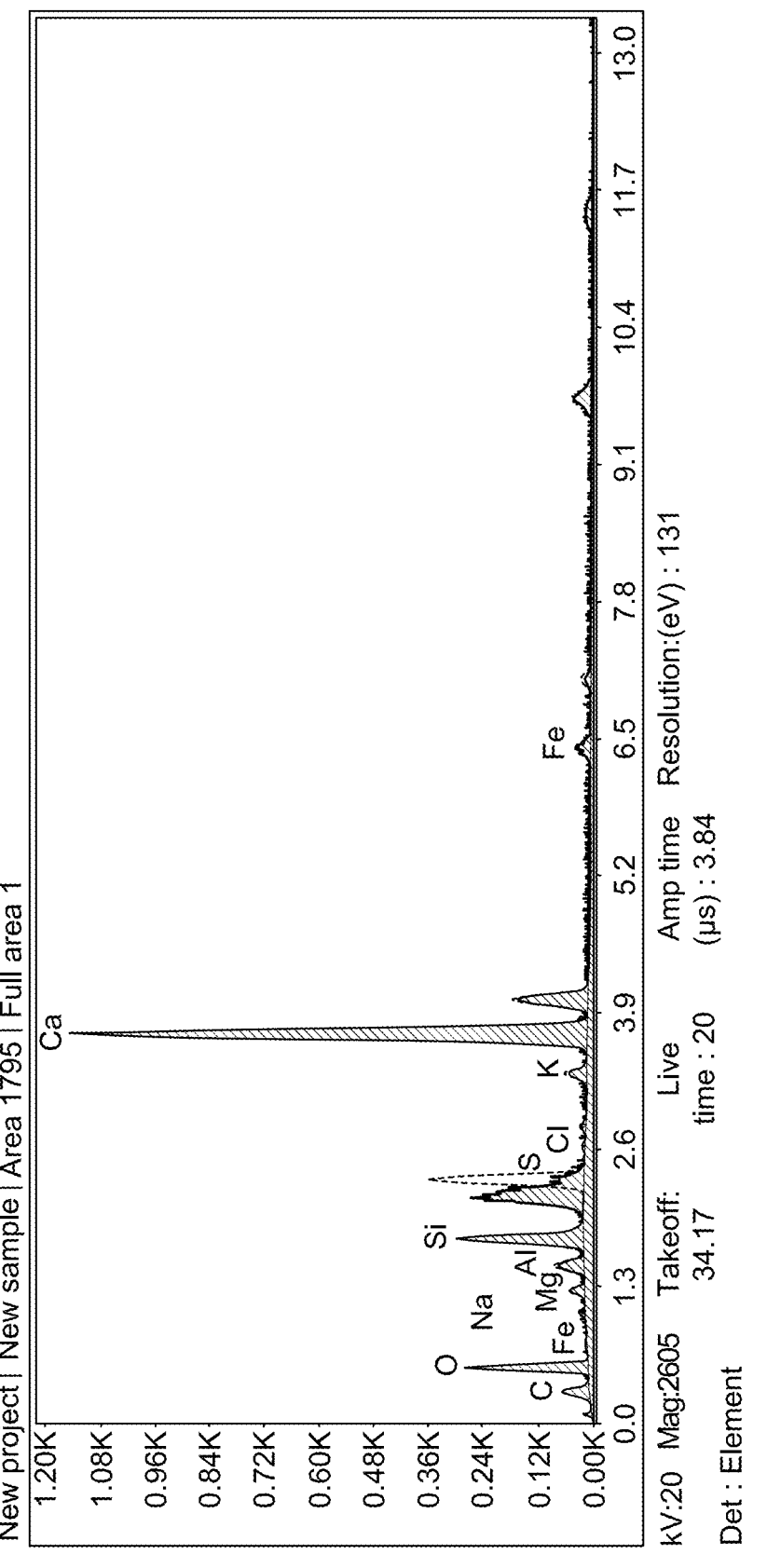
FIG. 11E shows EDS profile of the mortar mixture M6, according to certain embodiments.

FIG. 9 shows the micrographs obtained from the Scanning Electron Microscopy (SEM) on the raw OPC (FIG. 9A and FIG. 9B) and raw AG specimens (FIG. 9C and FIG. 9D). In general, the microstructure of both the raw materials indicated that their texture is irregular, and the particle size varies significantly. Among them, the grains of OPC is finer than that of AG, whilst sizeable variation existed in the grain size of AG compared to the OPC, as noticeable from the micrographs captured at 100 μm scale with a magnification of 1000×.

FIGS. 10A-10F shows SEM images of the M1 specimen (paste) captured at a scale of 1 mm, 300, 100, 50, 30, and 5 μm, respectively; FIGS. 10G-10L shows SEM images of the M4 specimen (paste) captured at a scale of 1 mm, 300, 100, 50, 30, and 5 μm, respectively; and FIG. 10M-10R shows SEM images of the M6 specimen (paste) captured at a scale of 1 mm, 300, 100, 50, 30, and 5 μm, respectively. Upon close observation, the microstructures of the M4 specimen, prepared with 0.75% dosage of AG, were most dense, followed by M1 and M6, in decreasing order of efficiency. The set of micrographs of M4 specimens was more compact and consisted of traces of micro-pores and micro-cracks attributed to the gluing nature of the AG, which helps fill the cavities and fissures and strengthen the ITZ leading to a strong matrix. However, the high AG content caused clusters of the OPC grains and formed to envelop the ingredients, thereby keeping them more unreactive, insufficiently dissolved, and preventing binding interactions. High AG content disabled the ingredients from forming a uniform and more hydrated product, which caused the proliferation of visible cracks and porosity. Mbugua et al. [R. Mbugua, R. Salim, J. Ndambuki, Effect of Gum Arabic Karroo as a water-reducing admixture in cement mortar, Case Stud. Constr. Mater. 5 (2016), incorporated herein by reference in its entirety] confirmed a reduction in the rate of hydration of cement in specimens prepared with a high dosage of AG by means of thermogravimetric analysis (TGA). Based on the microstructural analysis, it is postulated that the appropriate dosage of AG is to be used in the synthesis of construction products as a strength and durability enhancing agent which enables effective dissolution of the cementitious material and improves the skeletal matrix of the construction products. Mohamed et al. [A. M. Mohamed, M. H. Osman, H. Smaoui, M. A. Mohd Ariffin, Durability and microstructure properties of concrete with arabic gum biopolymer admixture, Adv. Civil Eng. 2018, incorporated herein by reference in its entirety] conducted SEM analysis to examine the micropores and void structure. The micrographs detected dense C—S—H gel in the AG-based binders as compared to the control specimens. It was reasoned that the formation of dense microstructure is attributed to the emulsifying characteristic of the AG, which allows the AG to fill the cavities in the specimens. It was also reported that due to the reaction of AG in cementitious composites, the $Al(OH)_2$ content is decreased, which may cause the reduction in porosity and permeability of concrete, leading to improved resistance to carbonation. On the other hand, the filler-effect imparted by the AG was revealed by Elinwa et al. [A. U. Elinwa, G. Abdulbasir, G. Abdulkadir, Gum Arabic as an admixture for cement concrete production, Constr. Build. Mater. 176 (2018), incorporated herein by reference in its entirety] from a cross-polarized micrographic investigation. Moreover, Rustum and Oweed [M. K. Rustum, K. M. Oweed, Investigation the effect of Arabic gum on the physical and mechanical properties of ordinary cement mortar, J. Eng. Sustain. Develop. 24 (Special) (2020) 417-424, incorporated herein by reference in its entirety] compared the SEM micrographs of the control and optimum AG-based binders. They found visible gaps and pores between the crystals in the former, whereas such gaps and pores largely disappeared in the microstructure of the latter binders.

FIG. 11 shows the elemental profile and Table 4 summarizes the elemental composition of raw and paste specimens (M1, M4 and M6) obtained by EDS analysis. The major elements found in the raw OPC (FIG. 11A) and the raw AG (FIG. 11B) by EDS analysis (Table 4) correlate with the chemical composition obtained from X-ray fluorescence (XRF) or other analyses (Tables 1 and 2). The major elements found in mortar mixture M1, M4, and M6 are depicted in FIGS. 11C, 11D, and 11E, respectively.

TABLE 4

| Elemental composition data. | | | | | |
|---|---|---|---|---|---|
| | Weight (%) | | | | |
| Element | Raw OPC | Raw AG | M1 | M4 | M6 |
| C | 0.01 | 34.82 | 0.01 | 0.02 | 1.21 |
| O | 34.34 | 61.7 | 38.32 | 37.15 | 34.11 |
| Na | 0.58 | — | 0.69 | 0.6 | 0.88 |
| Mg | 1.55 | 1.19 | 1.01 | 1.41 | 0.94 |
| Al | 2.15 | — | 1.51 | 2.11 | 1.52 |
| Si | 7.51 | — | 6.69 | 6.82 | 5.16 |
| S | 4.61 | — | 5.33 | 6.84 | 7.48 |
| Cl | 0.21 | — | 0.19 | 0.17 | 0.21 |

TABLE 4-continued

| | | Elemental composition data. | | | |
|---|---|---|---|---|---|
| | | | Weight (%) | | |
| Element | Raw OPC | Raw AG | M1 | M4 | M6 |
| K | 0.95 | 0.91 | 0.78 | 0.97 | 1.51 |
| Ca | 44.02 | 1.37 | 42.78 | 40.98 | 43.92 |
| Fe | 4.06 | — | 2.69 | 2.93 | 3.06 |

The elemental composition of the synthesized paste specimens tended to change compared to that present in the raw materials. The major elements present in the AG (Table 2), including Ca, Cu, Fe, K, Mg, Mn, Na, and Zn undergo phase transformation during the hydration reaction and produce minerals that contributes to the strength skeleton, as supported by X-ray and SEM analysis. However, in this case, the major role is evidently played by the Ca/Si molar ratio embedded in the cementitious composite matrix. For instance, the Ca/Si molar ratio was found to be 6.39, 6.01, and 8.51 in M1, M4, and M6 specimens, respectively. The decrease of the Ca/Si molar ratio in M4 is an indicator of more silicate reorganization and more C—S—H gel formation and leads to more strength development in the specimen. This is also corroborated in the outcomes of the X-ray analysis. This agrees with the in-depth microstructural characterization carried out by Kunther et al. [W. Kunther, S. Ferreiro, J. Skibsted, Influence of the Ca/Si ratio on the compressive strength of cementitious calcium-silicate-hydrate binders, J. Mater. Chem. A Mater. 5 (33) (2017) 17401-17412, incorporated herein by reference in its entirety] by synthesizing neat C—S—H monoliths to assess the impact of Ca/Si ratio and correlating with the compressive strength data obtained up to 90 days of hydration. As per the report, there exists an inverse relationship between the strength of C—S—H paste specimens and the Ca/Si ratio such that specimens prepared with a low Ca/Si ratio exhibit better dispersion of the OPC resulting in a dense microstructure with minimal porosity. Pelisser et al. [F. Pelisser, P. J. P. Gleize, A. Mikowski, Effect of the Ca/Si molar ratio on the micro/nanomechanical properties of synthetic CSH measured by nanoindentation, J. Phys. Chem. C 116 (32) (2012) 17219-17227, incorporated herein by reference in its entirety] also investigated the influence of the molar ratio of Ca/Si (0.7-2.1) present in synthesized C—S—H on the micro- and nano-mechanical characteristics employing the nanoindentation technique. It was again seen that decreasing the Ca/Si ratio reduced the micro- and nano-porosity, yielding a high modulus of elasticity and an increment in the density of the cementitious matrix.

Figure 12:
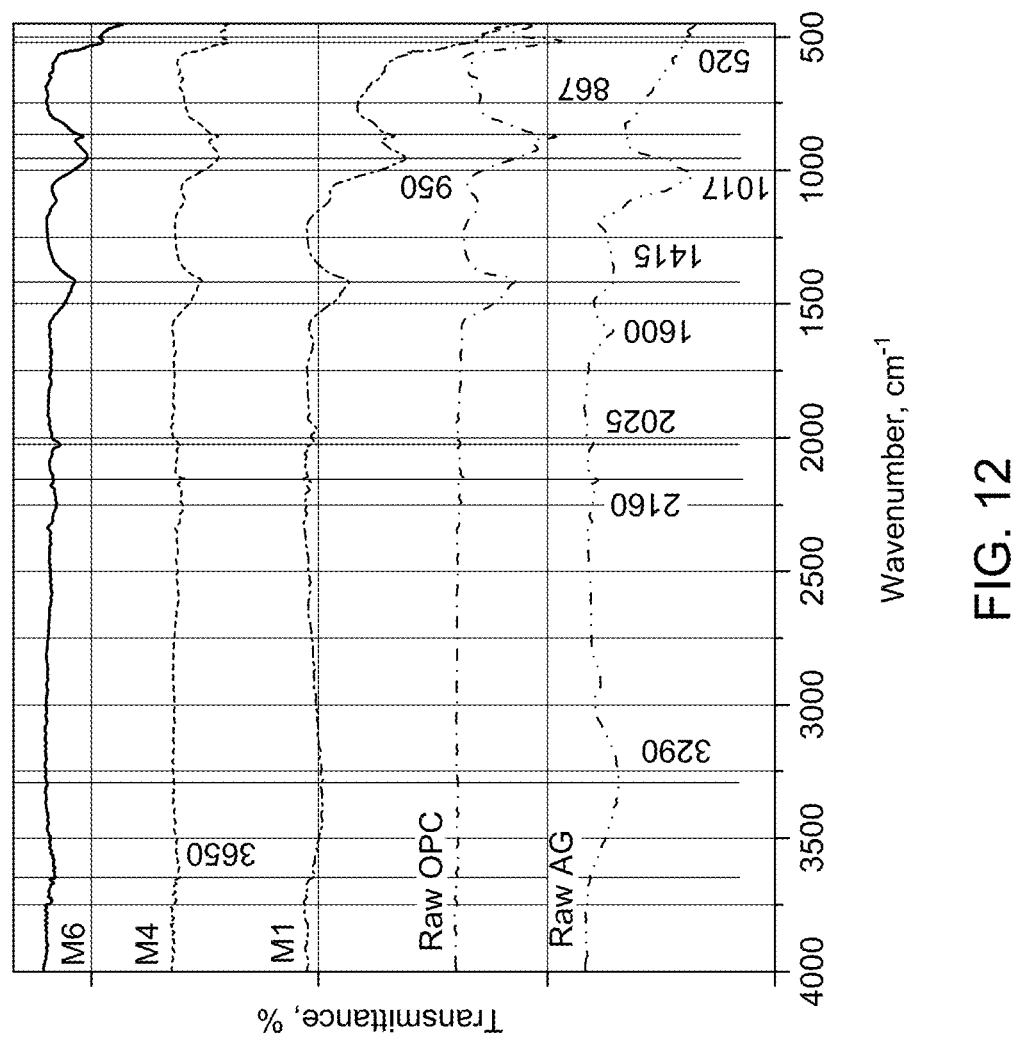
FIG. 12 shows the FTIR spectra of the raw AG, the raw OPC, and the mortar mixtures M1, M4, and M6, according to certain embodiments.

FIG. 12 shows the FTIR spectra of raw AG, raw OPC, and the selected paste specimens. The region between 950 and 1100 cm$^{-1}$, as well as around 520 cm$^{-1}$, is associated with Si—O stretching. A deep band at 1017 cm$^{-1}$ was detected in the raw AG. The band shifted to a lower wavenumber of 950 cm$^{-1}$ in paste specimens, which is ascribed to the polymerization of the SiO$_2$ during the process of de-calcification. The magnitude of the Si—O band was found to be comparable based on the IR spectra. The stretching vibrations of O—H bands at 3650 cm$^{-1}$ exists in the greatest amount in M1, followed by M6 and then M4. In addition, the O—H— or capillary H$_2$O bands appeared at around 1600 cm$^{-1}$ in M1 specimens after the reaction, which confirms an existence of portlandite. The results of FTIR analysis indicate that there was more dissolution of the cement particles when AG was used in an appropriate dosage of 0.75%, which consequently consumed the portlandite and enhanced the inter-particle bonding necessary for the increment of macroscopic strength development. The trend of hydroxyl compounds detected in paste specimens correlates with the findings of portlandite in quantitative X-ray analysis.

Figure 13:
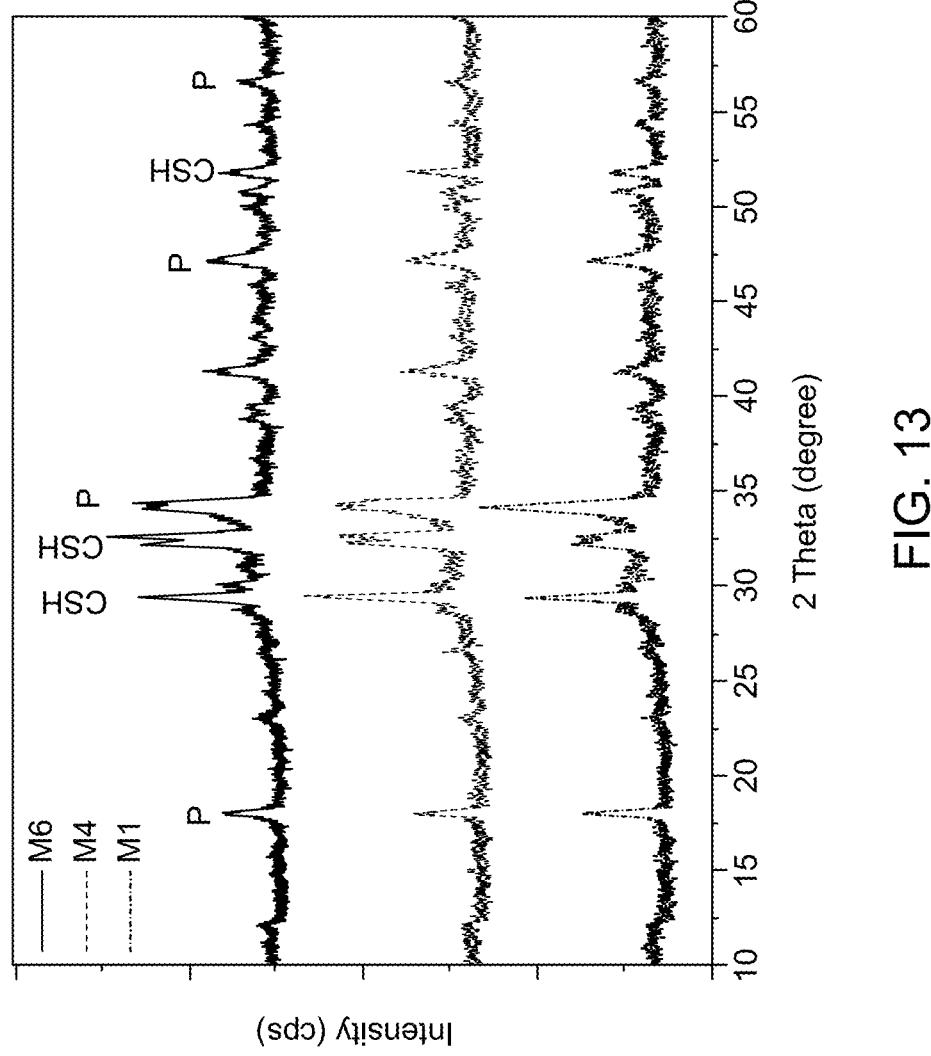
FIG. 13 shows XRD pattern of the mortar mixtures M1, M4, and M6, according to certain embodiments.

FIG. 13 shows the X-ray diffractogram (XRD) of the selected paste specimens. Multiple peaks of hexagonal hatrurite whose structural composition resembles calcium-silicate-hydrate (C—S—H) (DB card number 01-086-0402) at 29.4, 32.1, and 51.9° 2θ and portlandite (Ca(OH)$_2$) (DB card number 01-070-5492) at 17.96, 34.3, 47, and 56.5° 2θ were identified. These phases are the result of the hydraulic reaction and are attributed to the gain in strength of the developed mortar specimens. Nonetheless, the variation among the strength data (FIG. 6) is attributed to the crystallinity or amorphosity of the emerged compounds such that the higher the crystallinity of the portlandite, the lower will be the C—S—H formation. This was supported by the quantitative XRD analysis. Accordingly, the content of C—S—H and portlandite, respectively, was found to be 73.8% and 26.2% in M1; 86.4% and 13.6% in M4; 82.1% and 17.9% in M6. This is also evident from the close observation of the low-intensity peaks of portlandite and relatively high-intensity peaks of C—S—H manifested in M4 compared to the counterparts. This affirms the notion developed in SEM, EDS, and FTIR analysis that the appropriate dosage of the AG fosters the dissolution of the OPC grains, eventually yielding better engineering properties compared to the counterparts.

To conclude, Arabic Gum (AG) was used as an additive to the production of the Portland cement-based sustainable mortar by incorporating the AG in the range of 0 to 1.5% by weight of the cement. The representative fresh, mechanical, and microstructural properties of the AG-based mortar were investigated and compared with the conventional control mix. The following conclusions could be supported from the findings:

1. The setting times linearly prolonged with an increase in the AG content, which acted as a retarder. The control mix achieved the initial setting time and final setting time after 135 min and 155 minutes, respectively. These times were extended approximately 100% and 200% of that of the control mix by using the AG content of 0.75% and 1.5%, respectively. The retarding effect imparted by the AG is because it contains natural sugar.

2. The flow of mortar linearly increased with an increase in the AG content, which acted like a water-reducing admixture or superplasticizer. The workability was enhanced by 28.4% and 47% of that of the control mix using the AG content of 0.75% and 1.5%, respectively.

3. The compressive strength increased with an increase in the AG dosage up to 0.75% (M4). Thereafter, the strength gain was insignificant. The maximum early-age and later-age compressive strength in M4 at 7 days, 14 days, 28 days, and 56 days of curing were observed as 32.6 MPa, 37.3 MPa, 47.1 MPa, and 52.5 MPa, respectively. These strength values are 18.9%, 12.6%, 22.1%, and 31.2% more than that achieved in the control mix. This indicates that the compressive strength can be increased in the range of 12 to 32% by incorporating the AG dosage of 0.75%.

4. The flexural strength increased with an increase in the AG dosage up to 0.75% (M4). Thereafter, the flexural strength retrogression was evident. The maximum early-age and later-age flexural strength in M4 at 7 days, 14 days, 28 days, and 56 days of curing was observed as 4.3 MPa, 4.8 MPa, 5.7 MPa, and 6.5 MPa, respectively. These strength values are 28.3%, 14.2%, 21.2%, and 30% more than that achieved in the control mix. This indicates that the flexural strength can be beneficially increased in the range of 14 to 31% by incorporating the AG dosage of 0.75%.

5. The results of the volume of permeable voids (VPV) in control and AG-based mortar specimens were well-correlated with the findings of strength data and confirmed that the M4 is an appropriate mix for achieving the highest mechanical strength and lowest voids with a minimum amount of AG. The minimum 28 days and 56 days VPV values in M4 were recorded as 15.7% and 14.2%, respectively. These VPV values are 16% and 19.6% less than that achieved in the control mix.

6. The microstructural analysis revealed a low Ca/Si ratio of 6.01, diminishing hydroxyl compounds, stable Si—O bands, and an increased crystalline content of C—S—H (86.4%) as compared to portlandite (13.6%) in M4 specimens. It is postulated that the addition of the AG in an appropriate amount, causes effective dissolution of the cementitious material by consuming the portlandite, and formation of more gel products which fill the micro-cracks and micropores, improves the elemental bonding, and strengthens the interfacial transition zone (ITZ leading to a dense and compact matrix.

Numerous modifications and variations of the present disclosure are possible in light of the above teachings. It is therefore to be understood that within the scope of the appended claims, the invention may be practiced otherwise than as specifically described herein.

What is claimed is:

1. A mortar composition, comprising:
an ordinary Portland cement, an Arabic Gum in the amount of 0.75% by weight of the ordinary Portland cement, a sand in the amount of from 125% to 175% by weight of the ordinary Portland cement, and water in the amount of from 30% to 50% by weight of the ordinary Portland cement;
wherein the mortar composition comprises calcium (Ca) and silicon (Si), present in a Ca:Si molar ratio of 6.

2. The mortar composition of claim 1, wherein a cured sample obtained by curing the mortar composition for at least 2 days is porous and has a range of micropores of from 1 μm to 200 μm diameter.

3. The mortar composition of claim 2, wherein the cured sample obtained by curing the mortar composition for at least 2 days further has a porous structure including one or more microcracks from 20 to 500 nm wide and 0.1 to 500 μm long.

4. The mortar composition of claim 3, wherein the cured sample obtained by curing the mortar composition for at least 2 days further has granules of from 1 μm to 20 μm diameter comprised of bundles of 20 to 1,000 microfilaments in the form of cylinders with a length of from 0.2 μm to 5 μm.

5. The mortar composition of claim 1;
wherein the mortar composition has an initial setting time of 107% greater than a comparative mortar composition that is the same as the mortar composition but does not contain Arabic Gum;
wherein the mortar composition has a final setting time of 106% greater than the comparative mortar composition that is the same as the mortar composition but does not contain Arabic Gum; and wherein the mortar composition has a mortar flow of 28% greater than the comparative mortar composition that is the same as the mortar composition but does not contain Arabic Gum.

6. The mortar composition of claim 1, wherein the mortar composition has an initial setting time of 280 min.

7. The mortar composition of claim 1, wherein the mortar composition has a final setting time of 320 min.

8. The mortar composition of claim 1, wherein and mortar composition has a mortar flow of 218 mm.

9. The composition of claim 1,
wherein a cured sample obtained by curing the mortar composition for at least 2 days has a compressive strength value at 56 days of 31% greater than a comparative sample obtained by curing a comparative mortar composition that is the same as the cured sample but does not contain Arabic Gum,
wherein the cured sample obtained by curing the mortar composition for at least 2 days has a flexural strength value at 56 days of 30% greater than the comparative sample obtained by curing a comparative mortar composition that is the same as the cured sample but does not contain Arabic Gum,
wherein the cured sample obtained by curing the mortar composition for at least 2 days has a volume of permeable voids at 56 days that is 20% less than the comparative sample obtained by curing a comparative mortar composition that is the same as the cured sample but does not contain Arabic Gum.

10. The composition of claim 1, wherein a cured sample obtained by curing the mortar composition for at least 2 days has a compressive strength value at 56 days of 53 MPa.

11. The composition of claim 1, wherein a cured sample obtained by curing the mortar composition for at least 2 days has a flexural strength value at 56 days of 6.5 MPa.

12. The composition of claim 1, wherein a cured sample obtained by curing the mortar composition for at least 2 days has a volume of permeable voids at 56 days of 14%.

13. The composition of claim 1, wherein a cured sample obtained by curing the mortar composition for at least 2 days has a compressive strength value at 56 days of 53 MPa, a flexural strength value at 56 days of 6.5 MPa, and a volume of permeable voids at 56 days of 14%.

14. The mortar composition of claim 1, wherein the mortar composition has an initial setting time of 280 min, wherein the mortar composition has a final setting time of 320 min, and wherein and mortar composition has a mortar flow of 218 mm.

15. The mortar composition of claim 1;
wherein the Arabic Gum comprises sodium in an amount of 0.4 to 0.8 mg, calcium in an amount of 0.1 to 0.4 g, magnesium in an amount of 5.5 to 6.0 g, potassium in an amount to 3.0 to 3.5 g, iron in an amount of 0.01 to 0.1 mg, dietary fiber in an amount to 88 to 90% by weight, total ash in an amount to 2 to 4% by weight, and reducing sugar in an amount to 0.5 to 1% by weight based on a total weight of the Arabic Gum; and
wherein the ordinary Portland cement comprises CaO in an amount of 64.3 to 64.8% by composition, $SiO_2$ in an amount of 21.5 to 22.5% by composition, $Al_2O_3$ in an amount of 5.6 to 5.8% by composition, $Fe_2O_3$ in an amount of 3.6 to 3.8% by composition, $K_2O$ in an amount of 0.25 to 0.45% by composition, MgO in an amount 1.8 to 2.3%, and $Na_2O$ in an amount of 0.15 to 0.25% by composition based on a total composition of the ordinary Portland cement.

16. The mortar composition of claim 14 , wherein a cured sample obtained by curing the mortar composition for at least 2 days has a compressive strength value at 56 days of 53 MPa, a flexural strength value at 56 days of 6.5 MPa, and a volume of permeable voids at 56 days of 14%.

17. The mortar composition of claim 16;

wherein the Arabic Gum comprises sodium in an amount of 0.4 to 0.8 mg, calcium in an amount of 0.1 to 0.4 g, magnesium in an amount of 5.5 to 6.0 g, potassium in an amount to 3.0 to 3.5 g, iron in an amount of 0.01 to 0.1 mg, dietary fiber in an amount to 88 to 90% by weight, total ash in an amount to 2 to 4% by weight, and reducing sugar in an amount to 0.5 to 1% by weight based on a total weight of the Arabic Gum; and wherein the ordinary Portland cement comprises CaO in an amount of 64.3 to 64.8% by composition, $SiO_2$ in an amount of 21.5 to 22.5% by composition, $Al_2O_3$ in an amount of 5.6 to 5.8% by composition, $Fe_2O_3$ in an amount of 3.6 to 3.8% by composition, $K_2O$ in an amount of 0.25 to 0.45% by composition, MgO in an amount 1.8 to 2.3%, and $Na_2O$ in an amount of 0.15 to 0.25% by composition based on a total composition of the ordinary Portland cement.

18. The mortar composition of claim 14;

wherein the Arabic Gum comprises sodium in an amount of 0.4 to 0.8 mg, calcium in an amount of 0.1 to 0.4 g, magnesium in an amount of 5.5 to 6.0 g, potassium in an amount to 3.0 to 3.5 g, iron in an amount of 0.01 to 0.1 mg, dietary fiber in an amount to 88 to 90% by weight, total ash in an amount to 2 to 4% by weight, and reducing sugar in an amount to 0.5 to 1% by weight based on a total weight of the Arabic Gum; and wherein the ordinary Portland cement comprises CaO in an amount of 64.3 to 64.8% by composition, $SiO_2$ in an amount of 21.5 to 22.5% by composition, $Al_2O_3$ in an amount of 5.6 to 5.8% by composition, $Fe_2O_3$ in an amount of 3.6 to 3.8% by composition, $K_2O$ in an amount of 0.25 to 0.45% by composition, MgO in an amount 1.8 to 2.3%, and $Na_2O$ in an amount of 0.15 to 0.25% by composition based on a total composition of the ordinary Portland cement.

* * * * *